United States Patent
Altberg et al.

(10) Patent No.: US 8,924,880 B2
(45) Date of Patent: *Dec. 30, 2014

(54) METHODS AND SYSTEMS TO FACILITATE REAL TIME COMMUNICATIONS IN VIRTUAL REALITY

(71) Applicant: YP Interactive LLC, Wilmington, DE (US)

(72) Inventors: Ebbe Altberg, Mill Valley, CA (US); Scott Faber, San Francisco, CA (US); Ron Hirson, San Francisco, CA (US); Ben Harris Lyon, San Francisco, CA (US); Paul G. Manca, Oakland, CA (US); Sean Van der Linden, Berkeley, CA (US); Virginia Hong-Jia Yang, Foster City, CA (US)

(73) Assignee: YP Interactive LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/066,438

(22) Filed: Oct. 29, 2013

(65) Prior Publication Data

US 2014/0058807 A1    Feb. 27, 2014

Related U.S. Application Data

(63) Continuation of application No. 11/738,235, filed on Apr. 20, 2007, now Pat. No. 8,601,386.

(51) Int. Cl.
*G06F 3/048* (2013.01)
*H04N 7/15* (2006.01)
*H04L 12/66* (2006.01)

(52) U.S. Cl.
CPC ........... *H04N 7/157* (2013.01); *G06Q 30/2041* (2013.01); *H04L 12/66* (2013.01)
USPC .......................... 715/771; 715/757; 715/706

(58) Field of Classification Search
CPC combination set(s) only.
See application file for complete search history.

(56) References Cited

U.S. PATENT DOCUMENTS

| | | | |
|---|---|---|---|
| 4,850,007 | A | 7/1989 | Marino et al. |
| 4,963,995 | A | 10/1990 | Lang |

(Continued)

FOREIGN PATENT DOCUMENTS

| | | |
|---|---|---|
| JP | 8087489 | 4/1996 |
| WO | 9847295 | 10/1998 |

(Continued)

OTHER PUBLICATIONS

"AtOnce Talks Up E-mail Marketing Campaigns with ITXC Push to Talk Service," Business Wire, Feb. 26, 2001.

(Continued)

*Primary Examiner* — Phenuel Salomon
(74) *Attorney, Agent, or Firm* — Kilpatrick Townsend & Stockton LLP

(57) ABSTRACT

Methods and systems for connecting people for real time communications via a virtual reality environment. One embodiment includes: receiving a call for a real time communication session at a virtual object presented in a virtual reality world; indicating to a plurality of residents of the virtual reality world that the virtual object is being called; and responsive to an input from one resident of the plurality of residents, connecting the call to the resident for a real time communication session.

20 Claims, 40 Drawing Sheets

(56) References Cited

U.S. PATENT DOCUMENTS

| | | | |
|---|---|---|---|
| 5,057,932 A | 10/1991 | Lang | |
| 5,164,839 A | 11/1992 | Lang | |
| 5,262,875 A | 11/1993 | Mincer et al. | |
| 5,440,334 A | 8/1995 | Walters et al. | |
| 5,524,146 A | 6/1996 | Morrisey et al. | |
| 5,696,965 A | 12/1997 | Dedrick | |
| 5,710,970 A | 1/1998 | Walters et al. | |
| 5,751,956 A | 5/1998 | Kirsch | |
| 5,774,534 A | 6/1998 | Mayer | |
| 5,793,851 A | 8/1998 | Albertson | |
| 5,850,433 A | 12/1998 | Rondeau | |
| RE36,111 E | 2/1999 | Neville | |
| 5,870,546 A | 2/1999 | Kirsch | |
| 5,880,731 A | 3/1999 | Liles et al. | |
| 5,884,029 A | 3/1999 | Brush et al. | |
| 5,937,390 A | 8/1999 | Hyodo | |
| 5,963,202 A | 10/1999 | Polish | |
| 5,963,861 A | 10/1999 | Hanson | |
| 5,964,660 A | 10/1999 | James et al. | |
| 5,974,398 A | 10/1999 | Hanson et al. | |
| 5,978,567 A | 11/1999 | Rebane et al. | |
| 5,995,705 A | 11/1999 | Lang | |
| 5,999,965 A | 12/1999 | Kelly | |
| 6,023,270 A | 2/2000 | Brush et al. | |
| 6,029,141 A | 2/2000 | Bezos et al. | |
| 6,046,762 A | 4/2000 | Sonesh et al. | |
| 6,054,996 A | 4/2000 | Bardon et al. | |
| 6,108,704 A | 8/2000 | Hutton et al. | |
| 6,119,101 A | 9/2000 | Peckover | |
| 6,189,030 B1 | 2/2001 | Kirsch et al. | |
| 6,208,713 B1 | 3/2001 | Rahrer et al. | |
| 6,208,724 B1* | 3/2001 | Fritzinger et al. | 379/201.01 |
| 6,216,111 B1 | 4/2001 | Walker et al. | |
| 6,219,045 B1* | 4/2001 | Leahy et al. | 715/757 |
| 6,243,684 B1 | 6/2001 | Stuart et al. | |
| 6,269,361 B1 | 7/2001 | Davis et al. | |
| 6,275,490 B1 | 8/2001 | Mattaway et al. | |
| 6,298,374 B1 | 10/2001 | Sasaki et al. | |
| 6,327,572 B1 | 12/2001 | Morton et al. | |
| 6,329,986 B1 | 12/2001 | Cheng | |
| 6,337,858 B1* | 1/2002 | Petty et al. | 370/356 |
| 6,397,080 B1 | 5/2002 | Viktorsson et al. | |
| 6,438,124 B1 | 8/2002 | Wilkes et al. | |
| 6,466,966 B1 | 10/2002 | Kirsch et al. | |
| 6,470,079 B1 | 10/2002 | Benson | |
| 6,470,181 B1 | 10/2002 | Maxwell | |
| 6,484,027 B1 | 11/2002 | Mauney et al. | |
| 6,510,417 B1 | 1/2003 | Woods et al. | |
| 6,516,057 B2 | 2/2003 | Meek et al. | |
| 6,529,878 B2 | 3/2003 | De Rafael et al. | |
| 6,560,576 B1 | 5/2003 | Cohen et al. | |
| 6,731,736 B2 | 5/2004 | Meek et al. | |
| 6,760,537 B2 | 7/2004 | Mankovitz | |
| 6,769,020 B2 | 7/2004 | Miyazaki et al. | |
| 6,850,965 B2 | 2/2005 | Allen | |
| 6,856,809 B2 | 2/2005 | Fostick | |
| 6,859,833 B2 | 2/2005 | Kirsch et al. | |
| 6,941,273 B1 | 9/2005 | Loghmani et al. | |
| 6,954,728 B1 | 10/2005 | Kusumoto et al. | |
| 6,968,174 B1 | 11/2005 | Trandal et al. | |
| 6,981,220 B2* | 12/2005 | Matsuda | 715/706 |
| 6,988,127 B2* | 1/2006 | Matsuda et al. | 709/204 |
| 7,036,082 B1* | 4/2006 | Dalrymple et al. | 715/757 |
| 7,076,037 B1 | 7/2006 | Gonen et al. | |
| 7,086,005 B1* | 8/2006 | Matsuda | 715/706 |
| 7,092,901 B2 | 8/2006 | Davis et al. | |
| 7,103,010 B2 | 9/2006 | Melideo | |
| 7,139,796 B2 | 11/2006 | Rekimoto et al. | |
| 7,181,415 B2 | 2/2007 | Blaser et al. | |
| 7,187,761 B2 | 3/2007 | Bookstaff | |
| 7,200,413 B2 | 4/2007 | Montemer et al. | |
| 7,212,615 B2 | 5/2007 | Wolmuth | |
| 7,227,936 B2 | 6/2007 | Bookstaff | |
| 7,231,405 B2 | 6/2007 | Xia | |
| 7,240,110 B2 | 7/2007 | Haitsuka et al. | |
| 7,240,290 B2 | 7/2007 | Melideo | |
| 7,363,254 B2 | 4/2008 | Skinner | |
| 7,434,175 B2 | 10/2008 | Melideo | |
| 7,797,168 B2 | 9/2010 | Kusumoto et al. | |
| 8,601,386 B2 | 12/2013 | Altberg et al. | |
| 2001/0018667 A1 | 8/2001 | Kim | |
| 2001/0048737 A1 | 12/2001 | Goldberg et al. | |
| 2002/0003867 A1 | 1/2002 | Rothschild et al. | |
| 2002/0010616 A1 | 1/2002 | Itzhaki | |
| 2002/0026457 A1 | 2/2002 | Jensen | |
| 2002/0038240 A1 | 3/2002 | Kondo | |
| 2002/0057776 A1 | 5/2002 | Dyer | |
| 2002/0090985 A1* | 7/2002 | Tochner et al. | 463/1 |
| 2002/0095331 A1 | 7/2002 | Osman et al. | |
| 2002/0107697 A1 | 8/2002 | Jensen | |
| 2002/0113820 A1 | 8/2002 | Robinson et al. | |
| 2002/0120554 A1 | 8/2002 | Vega | |
| 2002/0122547 A1 | 9/2002 | Hinchey et al. | |
| 2002/0193094 A1 | 12/2002 | Lawless et al. | |
| 2003/0026397 A1 | 2/2003 | McCroskey | |
| 2003/0046161 A1 | 3/2003 | Kamangar et al. | |
| 2003/0055984 A1 | 3/2003 | Shimakawa et al. | |
| 2003/0083042 A1 | 5/2003 | Abuhamdeh | |
| 2003/0105824 A1 | 6/2003 | Brechner et al. | |
| 2003/0195787 A1 | 10/2003 | Brunk et al. | |
| 2003/0212600 A1 | 11/2003 | Hood et al. | |
| 2003/0220866 A1 | 11/2003 | Pisaris-Henderson et al. | |
| 2003/0223565 A1 | 12/2003 | Montemer | |
| 2003/0225682 A1 | 12/2003 | Montemer | |
| 2003/0231754 A1 | 12/2003 | Stein et al. | |
| 2004/0003041 A1 | 1/2004 | Moore et al. | |
| 2004/0006511 A1 | 1/2004 | Montemer | |
| 2004/0010518 A1 | 1/2004 | Montemer | |
| 2004/0030787 A1 | 2/2004 | Jamdel et al. | |
| 2004/0076403 A1 | 4/2004 | Mankovitz | |
| 2004/0174965 A1 | 9/2004 | Brahm et al. | |
| 2004/0174974 A1 | 9/2004 | Meek et al. | |
| 2004/0193488 A1 | 9/2004 | Khoo et al. | |
| 2004/0234049 A1 | 11/2004 | Melideo | |
| 2004/0235524 A1 | 11/2004 | Abuhamdeh | |
| 2004/0247092 A1 | 12/2004 | Timmins et al. | |
| 2004/0248649 A1 | 12/2004 | Arai et al. | |
| 2004/0249649 A1 | 12/2004 | Stratton et al. | |
| 2004/0254859 A1 | 12/2004 | Aslanian | |
| 2004/0260413 A1 | 12/2004 | Melideo | |
| 2005/0015725 A1 | 1/2005 | Matsuda | |
| 2005/0018829 A1 | 1/2005 | Baker | |
| 2005/0041647 A1 | 2/2005 | Stinnie | |
| 2005/0074100 A1 | 4/2005 | Lederman | |
| 2005/0076100 A1 | 4/2005 | Armstrong | |
| 2005/0080878 A1 | 4/2005 | Cunningham et al. | |
| 2005/0086605 A1* | 4/2005 | Ferrer et al. | 715/745 |
| 2005/0096980 A1 | 5/2005 | Koningstein | |
| 2005/0100153 A1 | 5/2005 | Pines et al. | |
| 2005/0105881 A1 | 5/2005 | Mankovitz | |
| 2005/0125416 A1 | 6/2005 | Kirsch et al. | |
| 2005/0135387 A1 | 6/2005 | Rychener et al. | |
| 2005/0209874 A1 | 9/2005 | Rossini | |
| 2005/0216346 A1 | 9/2005 | Kusumoto et al. | |
| 2005/0240432 A1 | 10/2005 | Jensen | |
| 2005/0245241 A1 | 11/2005 | Durand et al. | |
| 2005/0261964 A1 | 11/2005 | Fang | |
| 2005/0286688 A1 | 12/2005 | Scherer | |
| 2005/0289015 A1 | 12/2005 | Hunter et al. | |
| 2006/0003735 A1 | 1/2006 | Trandal et al. | |
| 2006/0004627 A1 | 1/2006 | Baluja | |
| 2006/0069610 A1 | 3/2006 | Rossini | |
| 2006/0075055 A1* | 4/2006 | Littlefield | 709/206 |
| 2006/0106711 A1 | 5/2006 | Melideo | |
| 2006/0130095 A1 | 6/2006 | Willis et al. | |
| 2006/0136310 A1 | 6/2006 | Gonen et al. | |
| 2006/0159063 A1 | 7/2006 | Kumar | |
| 2006/0166655 A1 | 7/2006 | Montemer | |
| 2006/0171520 A1 | 8/2006 | Kliger | |
| 2006/0173827 A1 | 8/2006 | Kliger | |
| 2006/0173915 A1 | 8/2006 | Kliger | |
| 2006/0182250 A1 | 8/2006 | Melideo | |
| 2006/0247999 A1 | 11/2006 | Gonen et al. | |
| 2007/0038507 A1 | 2/2007 | Kumer | |

(56) References Cited

U.S. PATENT DOCUMENTS

| | | |
|---|---|---|
| 2007/0038559 A1 | 2/2007 | Jung et al. |
| 2007/0100956 A1 | 5/2007 | Kumer |
| 2007/0101276 A1 | 5/2007 | Yuen |
| 2007/0121843 A1 | 5/2007 | Atazky et al. |
| 2007/0129054 A1 | 6/2007 | Andronikov et al. |
| 2007/0174777 A1 | 7/2007 | Finley et al. |
| 2007/0179867 A1 | 8/2007 | Glazer et al. |
| 2007/0269038 A1 | 11/2007 | Gonen et al. |
| 2008/0059570 A1* | 3/2008 | Bill .............................. 709/203 |
| 2008/0070690 A1 | 3/2008 | Van Luchene et al. |
| 2008/0091692 A1 | 4/2008 | Keith et al. |
| 2008/0134055 A1 | 6/2008 | Satchell |
| 2008/0214253 A1 | 9/2008 | Gillo et al. |
| 2008/0235582 A1 | 9/2008 | Zalewski et al. |
| 2008/0262910 A1 | 10/2008 | Altberg et al. |
| 2008/0262911 A1 | 10/2008 | Altberg et al. |
| 2008/0263446 A1 | 10/2008 | Altberg et al. |
| 2008/0263458 A1 | 10/2008 | Altberg et al. |
| 2008/0263459 A1 | 10/2008 | Altberg et al. |
| 2008/0263460 A1 | 10/2008 | Altberg et al. |

FOREIGN PATENT DOCUMENTS

| | | |
|---|---|---|
| WO | 0057326 | 9/2000 |
| WO | 0127825 | 4/2001 |
| WO | 0128141 | 4/2001 |

OTHER PUBLICATIONS

"ITXC Corp and Doubleclick Energize Banner Ads with Web Telephony; Companies Voice-Enable Banner Advertisements Using ITXC Push to Talk Service," Business Wire, Dec. 12, 2000.

ADS-Click, "ADS-click Adds Skype-Based Pay-Per-Call Advertising Capabilities to Its Private-Labeled Solution, which will be Unveiled at ad:tech New York," Market Wire, Oct. 10, 2005.

Greenberg, Ken, "Jambo Launches to Connect People and Businesses from the Internet to the Phone," Market Wire, May 3, 2005.

Greenberg, Ken, "Jambo Names Netzero Co-founder Stacy Haitsuka to New Post of Chief Information Officer," Business Wire, Jul. 5, 2005.

Greenberg, Ken, "Jambo Receives $5 Million in Financing from Kline Hawkes & Co., Westlake Venture Partners, Others," Business Wire, Oct. 17, 2005.

Ingenio, Inc., "FindWhat.com Enters Agreement with Ingenio to Offer Pay Per Call Advertising Platform," press release available at http://www.ingenio.com, Apr. 7, 2004.

Jambo, "Welcome to Jambo—The Leader in Pay-Per-Call Solutions," company information retrieved from http://www.jambo.com, available at least by Oct. 17, 2005.

Jingle Networks, Inc., "1-800-FREE411 Provides Two Great Opportunities to Acquire New Customers," available at least by Oct. 20, 2005.

Jingle Networks, Inc., "Introducing 1-800 FREE411: First Nationwide Free Telephone Directory Assistance Service," Sep. 20, 2005.

Dalton, Gregory, "Rent-An-Expert on the Web," Information Week, p. 75, Sep. 6, 1999.

Expertcity.Com, "About Us," company information retrieved from http://www.expertcity.com, available at least by Apr. 9, 2000.

Wieland, Heidi et al., "Expertcity.com Launches Premier Online Marketplace for Expert Services," PR Newswire, Aug. 30, 1999.

International Application No. PCT/US04/15238, Written Opinion and International Search Report, Aug. 29, 2005.

Greenblatt, Ellen, "Have You Ever Wondered . . . ," Datamation, p. 126, Oct. 1997.

International Application No. PCT/US00/06849, International Search Report, May 16, 2000.

International Application No. PCT/US00/10730, International Search Report, Jan. 3, 2001.

International Application No. PCT/US2008/059686, Written Opinion and International Search Report, Aug. 20, 2008.

Seitz, Steven M. et al., "View Morphing," Proceedings of the 23rd Annual Conference on Computer Graphics (SIGGRAPH 96), pp. 21-30, Aug. 4, 1996.

\* cited by examiner

421

Define a Deal  [?] Help

You pay for your advertisement for each deal you get. You can define what you deem as a deal.

Deal Event:
- ☐ The customer talks to me for at least [ ] minutes
- ☐ The customer agrees to pay
- ☐ The customer places an order
- ☐ The customer places a bid
- ☐ The customer visits my web page at this URL: [ ]
- ☐ The customer presses the submit button in the above web page
- ☐ The customer agrees to provide an address to me
- ☐ The customer answers the following question(s)
  - Question 1: [ ]   > More Questions
- ☐ I/We say there is a deal by dialing this sequence: [ ]

Your Offer of Advertisement Fee     [?] Help

You pay for your advertisement for each deal you get from the customer's call generated from your advertisement. You can define how much you offer to pay for each deal.

Advertisement Fee:

- ☐ This percentage of what the customer pays: [ ] %
- ☐ A lump sum of: [$ ] per deal
- ☐ This percentage of what I pay the customer: [ ] %
- ☐ A subscription fee of: [$ ] per month if I/we get more than [ ] deals per month

Overview | Bids | Call Date

For Listing: [All Listings ▼]

Time Period: ○ [Month to Date ▼]

⦿ from [10/3/2003] to [11/10/2003]  Please enter date in mm/dd/yyyy format

Calls: [Charged Calls ▼]  [View calls]

Calls for All Listings for Oct 3, 2003 – Nov 10, 2003

| Call ID | Bid ID | Listing Title | Call Date | Amount Charged | Next Highest Bid | Amount Bid |
|---|---|---|---|---|---|---|
| 5717848 | 428566 | Jim's Professional Plumbing | Oct 29 2:24 PM | $13.01 | $13.00 | $15.00 |
| 5717656 | 428566 | Jim's Professional Plumbing | Oct 29 2:14 PM | $14.01 | $14.00 | $15.00 |

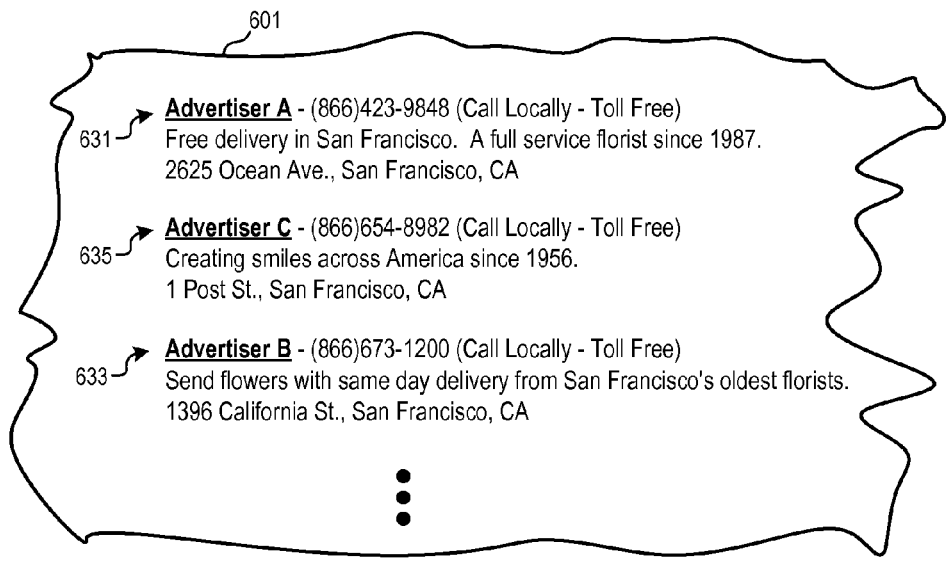
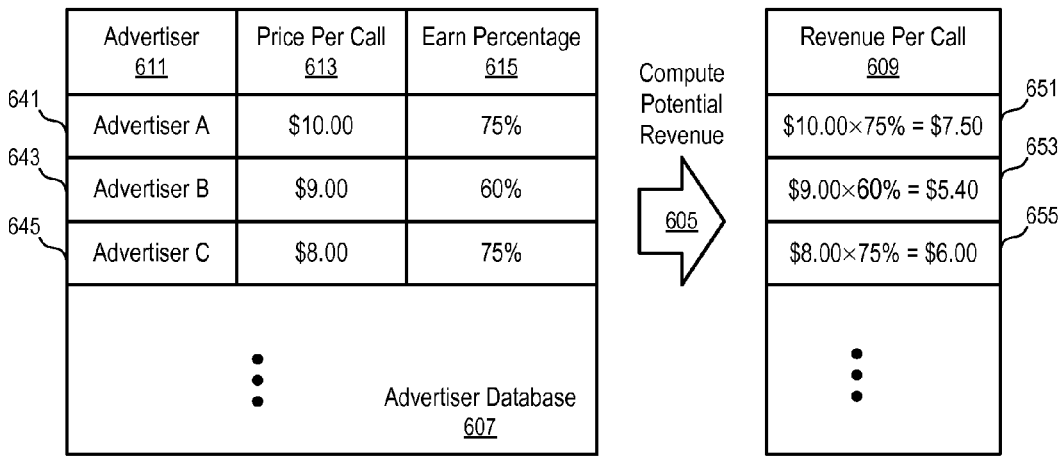
FIG. 17

We're going to call Bill now and tell him that you would like to talk. We'll let him know that you're available to start a call sometime in the time window you selected below.

Time window: [4 Hours ▽]  — 861

Your Phone number: ( [415] ) [731] – [0277]  — 863

Your comments to this person in requesting this connection: [I'm Bob Stanley. Remember we met at the golf conference last weekend.]  — 865

[Submit] [Cancel]

FIG. 22

Hide Blocked Callers

| Caller | Call Within | Status | Past Purchase | Comment | |
|---|---|---|---|---|---|
| Bob37 | 4 Hour | New ▾ | 0 | I'm Bob Stanley. Remember we met at the golf conference last weekend. | △ ⩑ ▽ ⩒ |
| unknown | 3 Hour | New ▾ | 0 | | △ ⩑ ▽ ⩒ |
| Smith Lee | 1 Hour | VIP ▾ | $237 | | △ ⩑ ▽ ⩒ |
| Tod | 1 Hour | Preferred ▾ | $37 | I need a quick answer. | △ ⩑ ▽ ⩒ |
| SSX | 4 Hour | Block ▾ | 0 | | △ ⩑ ▽ ⩒ |

We're going to call Bill now and tell him that you would like to talk. We'll let him know that you're available to start a call sometime in the time window you selected below.

Time window: [4 Hours ▼] 973

975

Voice/Text Connection
- ● Via my phone number: ( [415] ) [731] – [0277]
- ○ Via SIP address [　　　　　　]
- ○ Via IM [　　　　　　]
- ○ Via Virtual Reality Visual Environment 977
- ● Teleport me to Bill's location
- ○ Teleport Bill to my location
- ○ Teleport us to this location: [　　　　　　]
- ○ None

[Submit]  [Cancel]

FIG. 33

METHODS AND SYSTEMS TO FACILITATE REAL TIME COMMUNICATIONS IN VIRTUAL REALITY

RELATED APPLICATIONS

The present application is a continuation application of U.S. patent application Ser. No. 11/738,235, filed on Apr. 20, 2007 now U.S. Pat. No. 8,601,386 issued Dec. 3, 2013, entitled "Methods and Systems to Facilitate Real Time Communications in Virtual Reality," the entire disclosure of which application is incorporated herein by reference.

TECHNOLOGY FIELD

At least some embodiments of the disclosure relate to communication connections in general and more particularly but not limited to connecting people via virtual reality for real time communications.

BACKGROUND

Virtual reality (VR) can be used to create an illusion of reality or imagined reality. For example, a data processing system can be used to simulate a real or imaginary system and provide an environment for a user to interact with the simulated system. A user can perform operations on the simulated system, explore the simulated system and receive feedback in real time.

A virtual reality environment may primarily provide visual experiences, displayed on a computer screen or through stereoscopic display devices, such as head-mount displays (HMD), liquid crystal display (LCD) shutter glasses, polarized glasses, anaglyph glasses, etc. A three-dimensional (3D) system can be simulated such that the visual experience of the user depends on the viewpoint of the user; and the user may continuously adjust his or her viewpoint to obtain a personal view of the simulated system in real time. Some virtual reality environments provide additional sensory experiences, such as sound, touch, etc., (e.g., through speakers or headphones for audio, haptic systems for motion or force feedback, etc.).

A virtual reality environment can offer users immersion, navigation, and manipulation. A virtual reality environment can make the users feel that they are present in the simulated world and their visual experience in the virtual world more or less matches what they expect from the simulated environment, a sensation sometime referred to as engagement or immersion.

Examples of virtual reality environments include various interactive computer environments, such as text-oriented on-line forums, multiplayer games, and audio and visual simulations of a system. For example, a personal computer can be used to simulate the view of a three-dimensional space on a computer screen and allow the user to virtually walk around and visually inspect the space; and via a data communication network many users can be immersed in the same simulation, each perceiving it from a personal point of view.

Some virtual reality worlds support a Massively Multiplayer Online Role Playing Game (MMORPG), in which a user represented by an avatar can interact with other users who are also represented by their corresponding avatars. Controlled by an input device such as a keyboard, an avatar can move in the virtual reality world and even fly around to explore, meet people, engage in text chat, etc. To simplify the navigation process, an avatar may also be teleported directly to a specific location in the virtual reality world. When an avatar representing a different person is in the view, this person/avatar can be selected to start a conversation (e.g., text chat).

An avatar includes an image that represents a user. The appearance of an avatar may or may not resemble the user. An avatar may be in the shape of a human being, a cartoon character, or other objects. An avatar may be based on one or more photographs of the user. For example, a photo image of a user may be mapped to generate an avatar that simulate the look and feel of the user. Alternatively, an avatar may not have any resemblance with the actual appearance of the user, to allow the user a complete different virtual life in a virtual community.

Some virtual reality worlds have a virtual currency to support economical activities. A residence of the virtual world may provide services to earn moneys in the virtual currency and use the virtual currency to purchase virtual objects. For example, residences may buy land and build their own objects, create and interact as if they were living another life. The virtual currency may or may not be exchangeable with any real world currency.

In the real world, people can use telephone systems to conduct real time two-way voice communications without having to be at the same physical location. Traditional landline based telephone systems connect one telephone set to another through one or more switching centers, operated by one or more telephone companies, over a land-line based telephone network which was typically a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form of discrete packets rather than in the traditional circuit-committed protocols of the public switched telephone network (PSTN).

Cellular communication networks allow a cellular phone to connect to a nearby cellular base station through an air interface for wireless access to a telephone network. Recent developments in wireless telephone systems allow not only voice communications but also data communications. For example, cellular phones can now receive and send messages through a Short Message Service (SMS), a Multimedia Message Service (MMS), or data communication connections. For example, web pages can be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone systems are frequently used in conducting business. Telephone numbers are typically provided in advertisements, web sites, directories, etc., as a type of contact information to reach businesses, experts, persons, etc.

The Internet provides another communication media that can also be used as an advertisement media to reach globally populated web users. For example, advertisements can be included in a web page that is frequently visited by web users. Typically, advertisements included in web pages contain only a limited amount of information (e.g., a small paragraph, an icon, etc.); and links in the advertisements are used to direct the visitors to the web sites of the advertisers for further detailed information. For certain arrangements, the advertisers pay for the advertisements based on the number of visits directed to their web sites by the links in the advertisements, or based on the number of presentations of the advertisements.

Performance based advertising generally refers to a type of advertising in which an advertiser pays only for a measurable event that is a direct result of an advertisement being viewed by a consumer. For example, paid inclusion advertising is a form of performance-based search advertising, in which an advertisement is included within a result page of a keyword search. Each selection ("click") of the advertisement from the results page is the measurable event for which the advertiser pays. In other words, payment by the advertiser is on a per click basis in such paid inclusion advertising.

SUMMARY OF THE DESCRIPTION

Methods and systems for connecting people for real time communications via a virtual reality environment are described here. Some embodiments are summarized in this section.

In one embodiment, a method includes: receiving a call for a real time communication session at a virtual object presented in a virtual reality world; indicating to a plurality of residents of the virtual reality world that the virtual object is being called; and responsive to an input from one resident of the plurality of residents, connecting the call to the resident for a real time communication session.

The present disclosure includes methods and apparatuses which perform these methods, including data processing systems which perform these methods, and computer readable media which when executed on data processing systems cause the systems to perform these methods.

Other features will be apparent from the accompanying drawings and from the detailed description which follows.

BRIEF DESCRIPTION OF THE DRAWINGS

The disclosure is illustrated by way of example and not limitation in the figures of the accompanying drawings in which like references indicate similar elements.

FIG. 13 shows an example of a user interface which allows an advertiser to define a deal for a pay per deal advertisement process according to one embodiment.

FIG. 14 shows an example of a user interface which allows an advertiser to specify an offer of an advertisement fee for a pay per deal advertisement process according to one embodiment.

FIG. 15 illustrates an example of a user interface to track call activities according to one embodiment.

FIG. 17 illustrates a list sorting process to increase revenue for a media channel in a seller network according to one embodiment.

FIG. 22 shows a user interface to collect comments on a request for a communication connection according to one embodiment.

FIG. 23 shows a user interface to manage a queue of requesters of phone connections to a callee according to one embodiment.

FIG. 33 illustrates an interface to connect users to an advisor for real time communications in a virtual reality environment according to one embodiment.

DETAILED DESCRIPTION

Figure 1:
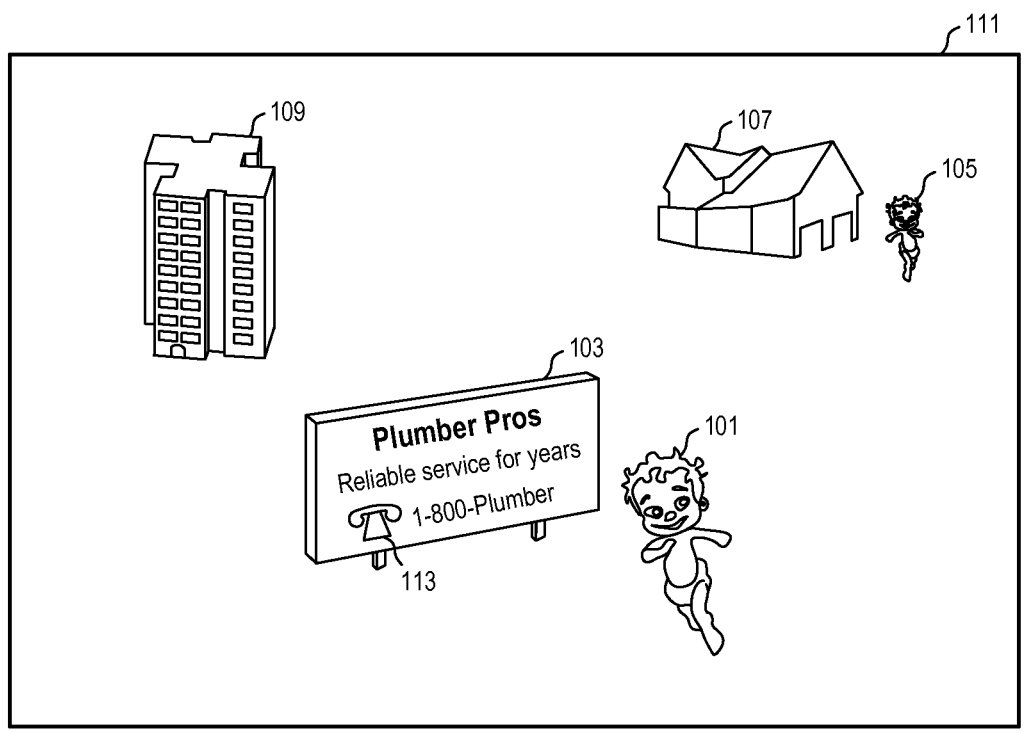
FIG. 1 illustrates an example of advertising a telephone reference in virtual reality to connect customers with an advertiser according to one embodiment.

In the following description, for purposes of explanation, numerous specific details are set forth in order to provide a thorough understanding of the description. It will be apparent, however, to one skilled in the art that embodiments of the disclosure can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In the disclosure, the term "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may accept user input through voice recognition or through keypad input generated Dual Tone Multi-Frequency (DTMF) signals), or others.

In one embodiment, an advertisement is presented in a virtual reality environment. The advertisement includes a communication reference which can be used to request a connection provider to provide a connection for real time communications with the advertiser.

In one embodiment, the communication reference is embedded in the advertisement to represent an address or identifier of the connection provider in a telecommunication system. When a call to the reference is made via the telecommunication system for a real time communication session, the call is connected to the connection provider. The connections provider may associate different communication references with different advertisers and/or advertisements so that the advertiser can be identified via the communication reference used to call the connection provider. After identifying the contact information of the advertiser based on the communication reference used to call the connection provider, the connection provider can further forward, bridge, conference or connect the call to the advertiser.

The connection provider can thus track the connections for real time communications with the advertiser, made via the communication reference embedded in the advertisement that is presented in the virtual reality environment. The connections provided by the connection provider can be considered as communication leads provided to the advertiser via the advertisement; and the advertiser can be charged based on the delivery of leads to real time communications with customers.

In one embodiment, advertisers may specify bid prices for the communication leads received; and the presentation of the advertisement and the connection of calls can be prioritized based on the bid prices of the advertisers. In one embodiment, the advertisers may specify the rules or limits for the bid prices to allow the system to automatically determine the actual bid prices for the advertisers based on the bids of their competitors.

Examples of calls for a session for real time communications include but not limited to telephone calls made via a circuit switched network, a packet switched network, or a combination of circuit switched networks and packet switched networks, calls for a text-based chat sessions, calls for instant messaging sessions which may support communications in text, voice, and/or video, calls for an application sharing session such as common whiteboarding, screen sharing, file sharing, calls for teleporting to a meeting location in the virtual world, etc.

In some embodiments, the connection provider can also provide a channel for non-real-time communications between an advertiser and a customer, in addition to the real time communication connection, or as an alternative to the real time communication connection. In one embodiment, the connection provider can provide multiple concurrent connections for communications in multiple types of media or formats.

In one embodiment, a real time communication between two persons includes one person providing information and the other person receiving information substantially in the same time as the person providing the information, as if the two person were in a face to face communication. Examples of communication media that support real time communications between two persons include telephone connections, instant messaging connections, etc. Alternatively, a communication from one person may be stored on a communication system until the other person is ready to obtain it, such as an email communication.

FIG. 1 illustrates an example of advertising a telephone reference in virtual reality to connect customers with an advertiser according to one embodiment.

In FIG. 1, a display (111) of the virtual reality includes an advertisement (103) which shows a phone number of a connection provider. The phone number is presented as if it were a phone number of the advertiser. When a customer calls the phone number, the call is connected to the connection provider. The connection provider identifies the phone number of the advertiser based on the phone number that was called by the customer to reach the connection provider. The connection provider then forwards the call to the phone number of the advertiser, or makes a separate call to the advertiser and bridges/conferences the calls to connect the customer and the advertiser, or further connects the call to the advertiser.

In FIG. 1, an avatar (101) represents the user to whom the display (111) of the virtual reality is presented. The user may control an input device (e.g., a keyboard, a mouse, a track ball, a touch pad, a joystick, a data glove, etc.) to move the avatar (101) in the virtual reality. For example, the avatar (101) can walk or fly into the building (109) or the house (107) to meet other avatars who are currently in those areas of the virtual world and participate in activities taking place there.

In one embodiment, what is displayed to the user is rendered based on a virtual camera that has a defined relation with respect to the 3D avatar (101) that represents the user. For example, the user may set the virtual camera a distance away from the avatar (101), such that the user represented by the avatar (101) can also see the avatar (101) to control its movement and activity in the virtual reality. The user may move the virtual camera and the avatar separately or together.

Alternatively, the virtual camera may be set on the head of the avatar, having the same viewing direction as the avatar. When the virtual camera is set on the head of the avatar (or in the eye of the avatar), the scene displayed to the user may not include the avatar that represents the user, although the avatar can be seen by other nearby avatars (e.g., 105).

In some embodiments, an avatar may be set to be invisible to a predefined group of avatars or all other avatars. The avatar may be selectively visible to a predefined group of avatars (e.g., friends).

In another embodiment, the users of the virtual reality environment do not have a representation visible to others (e.g., the users are not presented as avatars in the virtual reality environment). The view of the virtual reality provides the visual environment but not the participants in the environment.

In one embodiment, the display (111) of the virtual reality is a 2D image of a 3D model of a virtual world, rendered from the point of view of the virtual camera. A stereoscopic view of the 3D model of the virtual world can be displayed to provide an improved sense of depth. The virtual world may include avatars (e.g., 105) that represent other people who are there with the user as the user is experiencing the virtual world. The virtual world can provide an environment for a user to socialize with others. The presence of others and the immersive 3D environment allows people to communicate on a deep level. Since the user sees the virtual world from the point of view selected by the user, the user can have an unique experience of the virtual world, which is typically different from the experiences of others.

In FIG. 1, the advertisement (103) is presented on a virtual bulletin board in the virtual world. The virtual bulletin board may show a static advertisement (103) that does not change during an extended period of time (e.g., as the avatar (101) passing by the virtual bulletin board). Alternatively, the virtual bulletin board may be configured to update the content periodically as the avatar (101) passing by the virtual bulletin board, or in response to the events surrounding it.

In one embodiment, the avatar (101) may interact with the virtual bulletin board by selecting the virtual bulletin board, providing a text query, selecting options presented by the virtual bulletin board, providing feedback to the virtual bulletin board to obtain customized information/advertisement from the virtual bulletin board.

A variety of virtual objects can be created in the virtual world to provide the advertisement. For example, a virtual computer, a virtual bulletin board, a virtual magazine or newspaper, a virtual book, a virtual television, a virtual robot, etc., can be used to present advertisements with or in addition to other information. For example, an advertisement can be painted on a wall of a building in the virtual world, or be presented on a screen of an exhibition room in the virtual world.

In one embodiment, a virtual object can sense (see or listen) the surrounding conditions and present advertisements that may be of interest to the nearby avatars. For example, a virtual world may be configured to broadcast public conversations of avatars to nearby objects and/or avatars (e.g., in voice and/or text). Thus, a virtual object can be configured to listen to, or observe, the conversations of nearby avatars, determine topics of interest to the avatars, and present relevant advertisements.

In one embodiment, the set of nearby avatars are determined based on a distance in the virtual world. Since the avatars may move dynamically in the virtual world, the avatars in the listening range of the virtual object may change dynamically as the positions of the avatars in the virtual world are changed continuously. Alternatively or in combination, a virtual object may be designed to listen to a group of avatars. An avatar may explicitly enter or leave a group with or without changing the position of the avatar in the virtual world.

In one embodiment, a virtual object (e.g., an exhibition hall, a virtual screen, etc.) is configured to present information and/or advertisement relevant to the activities taking place in the vicinity. For example, when a virtual conference room is hosting a forum or demonstration related to a product, relevant advertisements can be presented on a wall or a screen of the virtual conference room.

In one embodiment, a user can chat with another avatar/user or a virtual robot (e.g., via an instant messaging system integrated with the virtual reality environment). A virtual robot typically does not have a human behind its operation. A computer software program is used to control the virtual robot to provide automated response. An avatar is typically control by a human user. The avatar or robot may provide the service of introducing products and/or services for advertisers. For example, an avatar may serve as an advisor in the virtual world; and an advertisement may be presented as part of the advice. For example, a virtual robot may be used to provide directions in the virtual world and help avatars navigating around an area of the virtual world. The user may start a conversation with a nearby advisor avatar or robot, which then performs a search for the user and provides an advertisement as part of the conversation, or direct a nearby object (e.g., a virtual bulletin board, a virtual screen, etc.) to present advertisements which might be of interest to the user.

In one embodiment, a traditional telephone number is presented in the advertisement, such that a user may call the advertiser outside the virtual reality environment. For example, in FIG. 1, the telephone number of the connection provider (1-800-Plumber) is presented in the advertisement in the virtual reality. The user may call the phone number to reach the advertiser with or without further interaction with the virtual reality. For example, the connection provider can connect the call of the user to the advertiser which may not be part of the virtual world.

In another example, the connection provider can connect the call of the user to the advertiser avatar, which is a residence of the virtual world. Thus, the advertiser avatar may receive calls from various different types of customers in a unified way, such as from users of the virtual world and users who have no access to the virtual world.

In one embodiment, the advertisement is presented for a virtual service provided in the virtual world. For example, after a customer is connected to an advertiser avatar in the virtual world for real time communications, the customer may obtain services and/or products in the virtual world from the advertiser via the real time communications. For example, the customer may purchase a virtual object over the real time communication connection provided by the connection provider. For example, the customer avatar may be teleported to a location in the virtual world to visit a virtual store of the advertiser for purchasing a virtual item (or a real world object based on a virtual representation of the object). For example, the customer may be provided with access to an adviser avatar who provides advice, information, entertainment, consultation over the real time communication connection. The advertiser avatar and the customer avatar may or may not be teleported to the same location in the virtual world to provide/receive advice, information, consultation which may be related to the virtual world.

In one embodiment, the phone call to the advertised telephonic reference can be initiated via a VoIP (Voice over Internet Protocol) application, which can be integrated with the virtual reality environment. For example, in FIG. 1, the avatar (101) may select the virtual bulletin board (103), or the telephone icon (113), to initiate a VoIP based telephone call to the connection provider. After the VoIP based call is connected, the audio experience of the virtual reality includes the voice communications channeled from the VoIP based telephone call. For example, the advertiser may be an avatar currently at a different part of the virtual world, in the vicinity of the bulletin board, or currently offline.

Alternatively, the user may leave the virtual reality environment, dial the telephone number (e.g., 1-800-Plumber) on a plain old telephone set (POTS) (or, a cellular phone, a Bluetooth phone, a cordless phone, a USB (forum) phone, a softphone, etc.) to start a conversation with the advertiser.

In one embodiment, when the avatar (101) selects the virtual bulletin board (103), or the telephone icon (113), a request is sent to the connection provider, which offers a callback to a telephonic reference specified by the avatar (101) to establish a telephone connection with the advertiser.

For example, the avatar (101) may be configured to have a telephone number of the user, which is accessible to a set of virtual objects, such as the telephone icon (113). When the avatar (101) selects the telephone icon (113) to request a connection, the telephone icon (113) obtains the telephone number from the avatar (101) and causes the connection provider to call back the telephone number of the avatar to initiate the telephone connection.

Alternatively, the telephone icon (113) may prompt the avatar (101) for a preferred callback phone number for the telephone connection. For example, the telephone icon (113) may start a private chat with the avatar (101) to obtain the callback number.

In one embodiment, the avatar (101) may accept voice-enabled instant messaging calls. When the avatar (101) selects the telephone icon (113), the telephone icon (113) initiates a voice-enabled instant messaging session, which is further connected to the advertiser via the connection provider. Alternatively, the avatar (101) may initiate the call to the connection provider via the instant messaging capability of the virtual reality application.

In one embodiment, a virtual telephone can be provided near the virtual bulletin board (103) which can be used to call avatars who are nearby the virtual bulletin board (103), or be used by an avatar to call the advertiser, or by an avatar to call a destination specified by the avatar (via a phone number provided by the avatar). In one embodiment, the virtual telephone provides the opportunity for the avatar (101) to be teleported to the location of the other party of the call in the virtual world.

In FIG. 1, the advertisement (103) illustrates an example of providing telephone connections between an advertiser and an avatar/user. In similar ways, advertisements can also be used to provide connections for other types of communications, such as text-based chat, instant messaging with text, voice, and/or video, etc.

In one embodiment, the virtual world is entirely based on the 3D models of a set of objects. Alternatively, the virtual world may include a portion of the reality. For example, a camera (or a stereo camera set) can be used to obtain the real time scene of a part of the real world; and the 3D models of a set of objects can be used to generate virtual objects to augment the reality based scene. For example, in FIG. 1, the scene including the building (109) and the house (107) may be the reality captured on a video camera; and the virtual bulletin board (103) and the avatars (e.g., 101 and 105) are rendered based on their 3D models and the view points of the virtual camera of the user.

In one embodiment, a set of cameras are used to capture a portion of the reality from a number of predefined view points. When the view point of the virtual camera is different from any of the predefined view points, image morphing or view morphing techniques can be used to generate interpolated images or views based on the output of the cameras, the predefined view points, and the view point of the virtual camera. Alternatively, a camera may be arranged to move according to the viewing direction and/or the viewing position of the virtual camera; and the viewing angle and/or position may be limited based on the range of the camera.

In one example, the virtual bulletin board (103) includes an image of a real bulletin board with an image layer dynamically overlaid on an advertisement surface of the real bulletin board; while the real bulletin board may show a static advertisement, the image layer overlaid on the real bulletin board can be used to show a dynamic advertisement which can change over time, or based on the circumstance near the bulletin board in the virtual world.

In one embodiment, the definition of the appearance of the virtual bulletin board (103) includes a link to an advertisement server. At the time of the rendering of the virtual bulletin board, the advertisement server is accessed to retrieve information which defines the appearance of the virtual bulletin board. For example, the advertisement server may present an image including the advertisement to define the appearance. For example, the advertisement server may present a web page to define the appearance. In one embodiment, a two-dimensional document, such as an image or a web page which may include text and user interface elements for user interaction, can be overlaid on the virtual bulletin board to provide the dynamic advertisement.

In one embodiment, the dynamic advertisement presented on the same virtual object in the virtual world may provide different contents to different users/avatars. For example, two different avatars may look at the same bulletin board at the same time; and the two avatars are provided with different advertisements selected specifically for the two avatars. Alternatively, one advertisement can be overlaid on the same bulletin board in a way independent from the identities of the avatars.

For example, in one embodiment, a connection provider may intercept the visual feedbacks (e.g., a set of virtual objects with information described the appearance of the objects), dynamically modify the visual feedbacks to include personalized advertisements according to the needs of users who are presented by the individual avatars, and then forward the modified visual feedbacks to the browsers of the users.

In one embodiment, the avatar (101) can be configured to have information describing the interest or wish list of the avatar. The advertisements for the avatar can be dynamically selected based on the interest or wish list of the avatar. For example, when the avatar touches the bulletin board (e.g., when the input device associated with the avatar selects the bulletin board 103 in view of the display 111 of the virtual world), the pre-configured information describing the interest or wish list of the avatar can be transmitted to the bulletin board, which then selectively provides information and/or advertisement to assist the avatar.

Further, as the avatar (101) interacts with various different advertisements, the information describing the interest, personality and/or wishes can be automatically updated. Thus, information relevant to the avatar (101) can be provided subsequently when the avatar (101) interacts with the bulletin board (103) and/or other advertising objects of the virtual world.

In one embodiment, when the avatar touches the bulletin board, the display of the virtual world includes a visual feedback showing the interaction between the avatar and the bulletin board. For example, the avatar's hand can be displayed at a position pointing at the bulletin board; and a projection line from the avatar's hand to the bulletin board can be shown to indicate the location of the touch.

In one embodiment, a cursor may be used to indicate and/or select the point of the touch. An input device can be used to control a cursor on the display (111) of the virtual world; and the user can cause the avatar (111) to touch the point at the cursor by activating a switch (e.g., a mouse button, or a key on a keyboard) while the cursor is at the desired location of touch in the virtual world.

Alternatively, the user may use a data glove to interact with the virtual world; and an avatar, or a real time image of the user, may be used to represent the user in the virtual world for viewing by other users.

In one embodiment, the avatar may request a private display; and the selected advertisement is overlaid on the bulletin board displayed to the avatar (101) but not on the bulletin board displayed to other avatars (e.g., 105); and if allowed, the avatar may also request a public display so that the selected advertisement is also overlaid on the bulletin board for display to other avatars/users who are looking at the bulletin board.

In one embodiment, some virtual objects are configured to be in a private advertisement mode, in which the virtual objects render different advertisements privately for different avatars. Thus, such a virtual object in a private mode has the same geometric representation in the virtual world but different, simultaneous appearances to different avatars. The appearance of the virtual object to an avatar is based on the identity of the avatar.

Some virtual objects can be configured to be in a public advertisement mode, in which the virtual objects render the same advertisement for different avatars. In one embodiment, a virtual object provides a public advertisement in default; and when requested by an avatar, the virtual object replaces the public advertisement with a advertisement that is privately selected for the avatar for display to the avatar, without changing the view of the advertisements that have been provided to other avatars.

Figure 2:
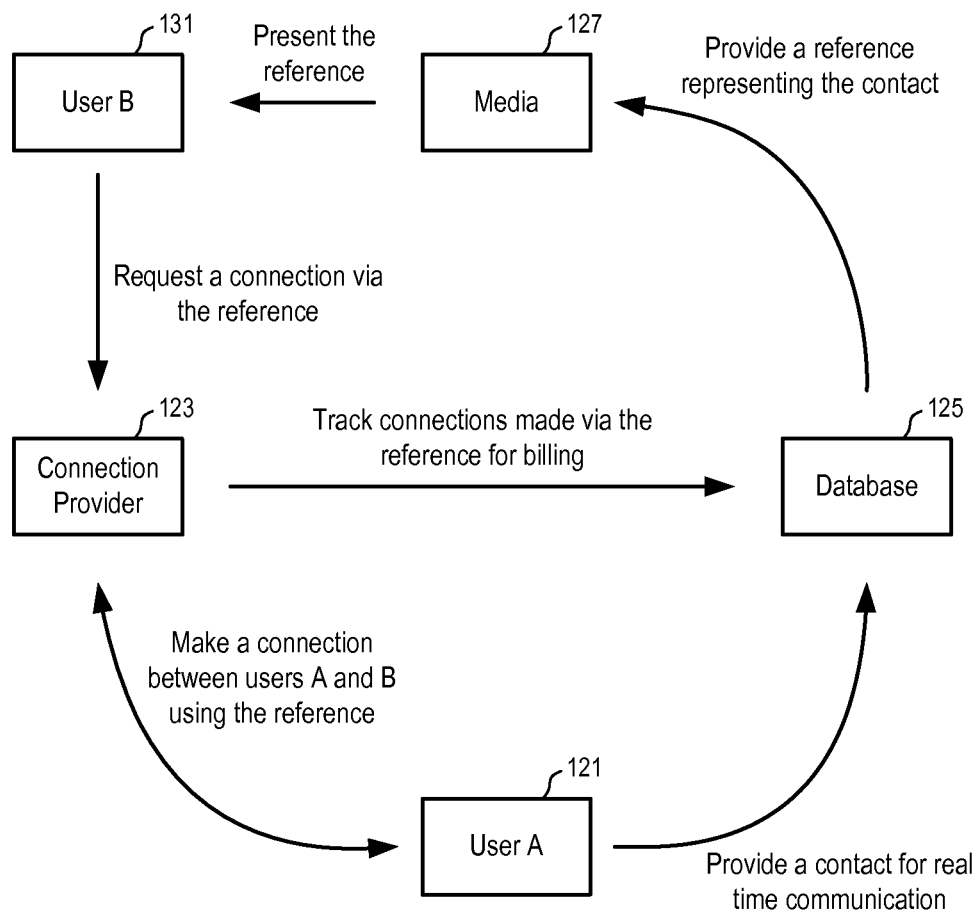
FIG. 2 shows a method to establish connections for real time communications according to one embodiment.

FIG. 2 shows a method to establish connections for real time communications according to one embodiment. In FIG. 2, user A (121) provides a contact for real time communication, such as a telephone reference of the user A. The contact can be used to establish a connection with user A (121) through a communication network. For example, the contact can be a telephone number of a landline, traditional analog telephone, a cellular phone number, a phone number with an extension, a Universal Resource Identifier (URI) such as a Session Initiation Protocol (SIP) URI, a user identifier of a VoIP application, a user identifier of an instant messaging system, etc.

The contact of the user A (121) is stored in the database (125); and a reference is assigned to represent the contact. Instead of providing the contact to customers, the reference representing the contact is provided through the media (127) to user B (131). Thus, when the user B (131) uses the reference to request a connection with the user A (121), the connections resulted from the advertisement can be tracked to evaluate the performance.

In one embodiment, advertisements can be distributed via a number of media channels operated by a number of demand partners. The reference can also be assigned to identify the demand partners and/or the media channels used to distribute the advertisements. In one embodiment, the information obtained from tracking the demand partners who are responsible for the delivery of a communication lead is used to compensate the demand partner for each delivered communication lead. Alternatively, the demand partners may be compensated according to the advertisement presentations made for the advertiser; and tracked information can be used to determine the performance and/or the cost effectiveness of the media channels.

In one embodiment, the reference is presented via a virtual reality environment. For example, the reference can be presented via a virtual bulletin board, a virtual screen, a virtual robot, an avatar, etc. The reference can be presented in virtual reality in a visual format, or in an audio format, or in combination. Alternatively or in combination, the reference can be presented via other media channels, such as newspaper, magazine, telephone directory, web search results, VoIP user terminals, interactive maps, banners, directory assistance service, online marketplace, mobile communication devices, radio, cable/satellite television, interactive television, web television, voice portal, web portal, online auction site, blog, email, bulletin board, refrigerate magnet, brochure, etc.

In FIG. 2, the user B (131) can use the reference obtained from media (127) to request the connection provider (123) to establish a connection or facilitate a communication channel for real time communications between the user A (121) and the user B (131). The connection provider uses the database (125) to determine the contact of the user A (121) and then make a connection between the user A (121) and user B (131) using the contact of the user A (121). Alternatively, the reference may include an encoded/encrypted version of the contact of the user A (121) which can be decoded/decrypted without relying upon the database (125).

In response to the user B's request for a connection, the connection provider (123) may establish two separate connections to the user A (121) and the user B (131) and then bridge the two connections to connect the user A (121) and user B (131). For example, the connection provider (123) may determine the reference from a connection established between the user B (131) and connection provider (123) and then further bridge the connection to the user A (121).

In one embodiment, the connection provider (123) may provide a separate reference to represent the user B (131) and allow the user A (121) to subsequently callback to the user B (131) via the reference that represents the user B (131), if the user A (121) is not currently available for real time communications. The connection provider (123) may schedule an appointment for the user A (121) and user B (131) for a real time communication session. The connection provider (123) may send a notification to the user A (121) to inform the user A (121) about the request for a real time communication.

In one embodiment, the connection provider (123) tracks the connections made via the reference for billing for the advertisement. For example, the connection provider (123) may charge the advertiser for each communication lead deliver to the user A (121).

A communication lead may be limited to a distinct, separate customer such that repeated calls from the same customer within a predefined time period may not be counted as separate communication leads. In one embodiment, the communication lead may also be limited by the duration of a communication session, such that a short session having a duration shorter than a predefined time period may not be counted as a communication lead, and/or a long session having a duration longer than a predefined time period may be counted as more than one communication lead.

In one embodiment, a number of communication leads may be bundled as a package for a subscription fee, or a bid price. Further, the delivery of communication leads may be bundled with an offer of a telecommunication service package. Alternatively, the advertiser may specify a bid price that is to be charged for each communication lead delivered, or a bid limit (e.g., maximum bid) which is to be resolved into an actual bid based on the bid prices of competitors in a category for a specific geographic service area.

Figure 3:
FIG. 3 illustrates a user interface for the creation of an advertisement according to one embodiment.

FIG. 3 illustrates a user interface for the creation of an advertisement according to one embodiment. The user interface may be presented via web in a web browser.

In FIG. 3, an interface (141) allows the advertiser to describe an offer (or a switch pitch, or a cross sell, or some advertising content). The advertiser can specify the business contact information for the advertisement, including the business name, street/mailing address, phone number and fax number. The advertiser/seller is encouraged to tell customers via concise marketing messages what is being offered and why the customers should call the advertiser/seller. For example, the advertiser is encouraged to include promotional offers in the marketing messages to get buyers to call the advertiser. Examples of promotional offers include: "Call today and get $5 off," "Free consultation—limited time," and "Call now and save 10%."

In one embodiment, an audio and/or visual advertisement is generated based at least in part on the information submitted by the advertiser via the user interface (141) (e.g., for presentation via virtual realty, directory assistance service, search result, etc.)

In one embodiment, a short audio advertisement is generated based on the concise marketing message (e.g., two sentences, each having a length limit, such as 35 characters). The concise marketing message can be read by a human to generated a recorded audio file for a short audio advertisement, or be converted into an audio message via a text-to-speech synthesizer. In one embodiment, the audio advertisement also includes the business name.

In one embodiment, a visual presentation of the advertisement may be used to supplement the audio advertisement. For example, the address of the advertisement can be presented in a visual advertisement, together with additional information that is specified in the business profile page of the advertisement. In response to a request from the customer, the visual component of the advertisement can be sent to the customer via an SMS message, via an email, via a custom application, via a web/WAP page, etc.

In one embodiment, the advertisement is sent to a user device in text according to a pre-determined format (e.g., in XML or a custom designed format) to allow a client application running on the user device to present the advertisement in a custom format. For example, the client application may present the short marketing advertisement in an audio form via a text-to-speech synthesize and the present a selected portion of the advertisement as an animation (e.g., present an electronic coupon via an animation). For example, a Java applet can be downloaded into the browser of the user to facilitate VoIP-based phone communication and perform at least part of the text-to-speech operations to enable improved compression in transmitting audio advertisements.

In one embodiment, when an advertisement is presented to the user via a web or a virtual reality environment, the short audio advertisement can also be included; and the audio advertisement can be played automatically or after the user selects the advertisement.

In FIG. 3, the interface (3401) may be implemented as a web page. Alternatively, an advertisement may submit the advertising content via a custom client application, or via a message gateway (e.g., an instant message, an email, an SMS message, etc.). In one embodiment, one or more advertisements can be uploaded into a server via a spreadsheet, or via a web service interface.

In one embodiment, the system converts the text input received from the advertiser into an audio advertisement. In one embodiment, the audio file for the advertisement is stored in the advertisement database; alternatively, the text input can be converted into the audio advertisement (e.g., via a text-to-speech synthesizer, or a human announcer) when the audio advertisement is needed. In one embodiment, the machine synthesized audio recording are stored in the database for a period of time and deleted if not used after a predetermined period of time, or when the usage of the audio advertisement is lower than a threshold.

Figure 4:
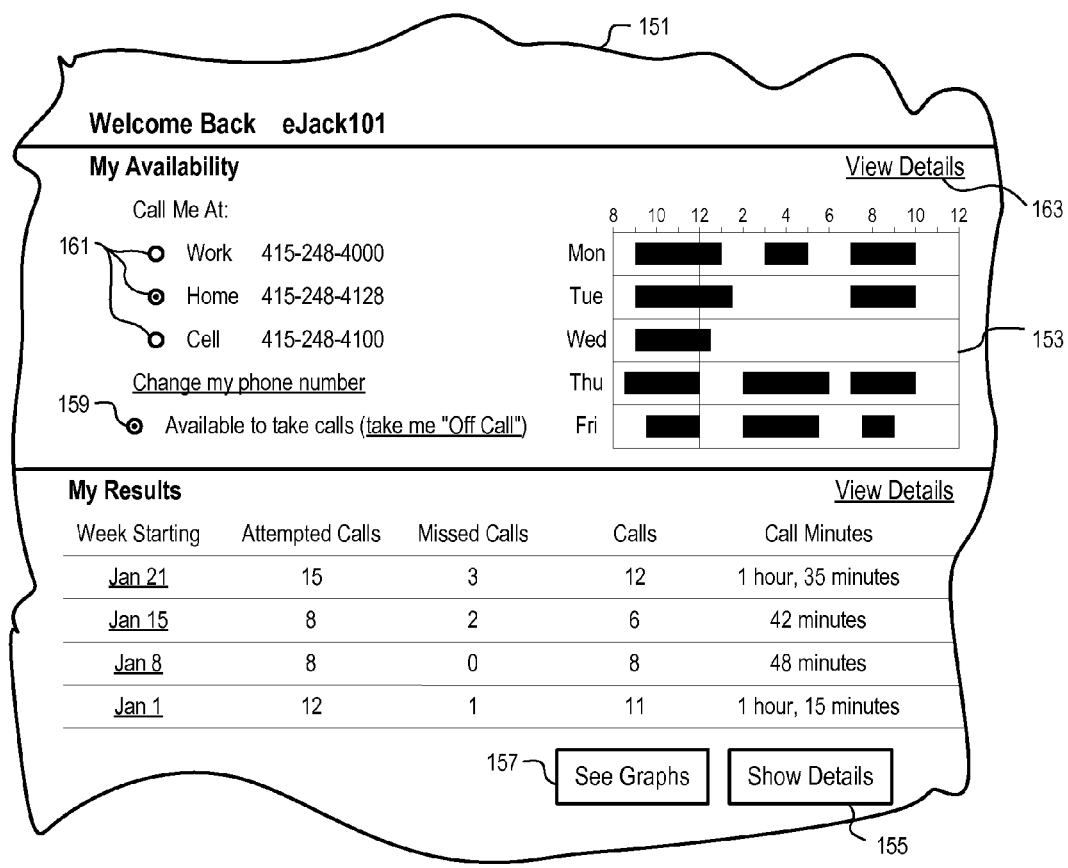
FIG. 4 illustrates an example of a user interface to manage availability for receiving phone calls according to one embodiment.

FIG. 4 illustrates an example of a user interface to manage availability for receiving phone calls according to one embodiment. An advertiser may specify the day and time of availability for accepting the calls for real time communications. Based on the availability, the system may schedule the presentation of the advertisement more effectively and block unwanted calls.

In one embodiment, the system can store multiple phone numbers of the seller. The system can intelligent route a call to the seller according to the preference of the seller. For example, in FIG. 4, the advertiser/seller may choose a preferred phone number from a set of phone numbers of the seller to receive incoming calls using the option group (161) in the user interface (151). The seller may indicate whether the seller is currently available to take calls or is to be taken "off call" (e.g., using the check box (159)).

In one embodiment, the system allows the seller to specify the schedule to receive calls; and the schedule (153) is displayed to the seller in a graphical way to help the seller to manage calls. In FIG. 4, the user interface (151) includes a link (163) which can be selected to display a user interface (not shown in FIG. 4) to manage the schedule (153).

In one embodiment, when the schedule or the check button (159) indicates that the advertiser/seller is currently not available to take calls for real time communications, the system can decrease the priority of the advertisement for this advertiser, or stop temporarily the presentation of advertisements for this advertiser. When there is a call intended for the advertiser at a time when the advertiser is not taking calls (e.g., according to the schedule), the system can block the call, or direct the call into a voice mail for the advertiser, or arrange a call at an alternative time, or obtain a callback number to allow the advertiser to initiate a callback to the customer.

In FIG. 4, the user interface (151) also includes a summary of call activities. Buttons (157 and 155) can be selected to show graphical representation of the call activities and further details of the call activities.

As the phone calls pass through the system, a wide array of information can be collected and tracked, including day/date/time of calls, duration of calls, call status (answered, no answer, busy), inbound phone numbers, etc. Such tracked information can be used in counting communication leads generated from advertisements. For example, when multiple calls are made from the same user to the same seller within a period of time (e.g., a day or a week), or in connection with the same offered or auctioned item, these multiple calls can be considered as one qualified call or a single lead.

In one embodiment, different types of communication references can be dynamically selected for advertisements to represent the contact information of the corresponding advertisers. A communication reference used to represent the contact of an advertiser may be a traditional phone number with or without an extension, a click-to-call reference, a SIP address for VoIP call, a click-to-reveal reference, etc. The communication reference can be embedded into an advertisement to count the communication leads generated from advertisements, to track the contributions of demand partners who operate media channels to present the advertisements to customers, and/or to track other aspects of advertising, such as partners who bring the advertisers/sellers to the system and the keywords responsible for the selection of the advertisement for presentation.

In one embodiment, the tracking mechanism used for a particular version of a particular advertisement is selected from a number of available mechanisms, based on one or more considerations such as the volume or frequency of calls generated from the advertisement, the conversion rate of the advertisement (e.g., the ratio between a count of presentations of the advertisement and a count of communication leads generated from the presentations), the price per communication lead that the advertiser is willing to pay for the advertisement according to a price bid specified by the advertiser, a potential revenue for a particular party in the advertising activity, a classification or category of the advertisement (e.g., the category of service or product advertised in the advertisement), a geographical area served by the advertisement, the demand partner who is going to present the advertisement (e.g., the success rate of the demand partner in reaching viable customers in comparison with other demand partners), etc.

Figure 5:
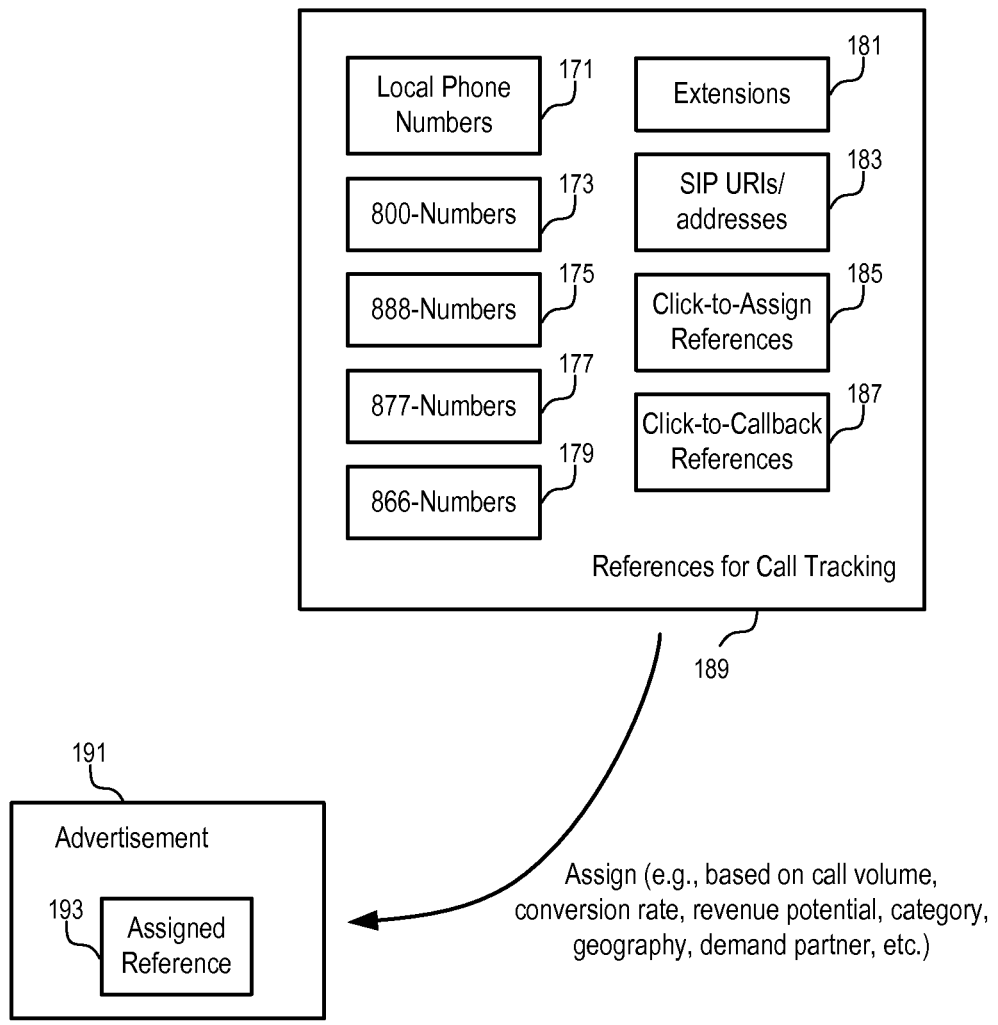
FIG. 5 shows a diagram illustrating a method to select a type of tracking mechanism with a corresponding reference for embedding in an advertisement according to one embodiment.

FIG. 5 shows a diagram illustrating a method to select a type of tracking mechanism with a corresponding reference for embedding in an advertisement according to one embodiment. In FIG. 5, multiple types of tracking mechanisms are used in the system. The tracking mechanism used for an advertisement or a version of the advertisement can be dynamically selected and changed. For example, different versions of an advertisement can be generated for delivery by different demand partners.

In FIG. 5, a pool (189) of different types of references are maintained, such as local phone numbers (171), 800-numbers (173), 888-numbers (175), 877-numbers (177), 866-numbers (179). Some of the references can be dynamically generated and used, such as extensions (181), SIP addresses (183), click-to-assign references (185) and click-to-callback references (187). In one embodiment, one or more of the references are selected and used as the assigned reference (193) that is embedded in the advertisement (191). In one embodiment, the assignment is based at least partially on factors related to the advertisement, such as call volume, conversion rate, revenue potential, category, geography, demand partner, etc.

In one embodiment, the reference of a particular type is selected and assigned to the advertisement when the advertisement is being requested for delivery. When the advertisement is subsequently requested, the previously assigned reference can be used. Alternatively, when the advertisement is subsequently requested, a different reference of a re-selected type can be selected and assigned to the advertisement, based on the considerations such as the call volume in a past time period, conversion rate, price bid, etc. After the new reference is assigned to the advertisement, the previous reference can be assigned to a different advertisement.

In one embodiment, before the expiration of the previously assigned reference for an advertisement delivered by a demand partner, a new reference can be assigned to the advertisement for delivery by the same demand partner. Thus, multiple references can be associated with a same set of parameters in a time period. Further, since some of the references can be re-assigned to a different advertisement, one reference may be associated with multiple sets of parameters (e.g., for different advertisements). In one embodiment, when a reference is associated multiple sets of parameters, the parameter set that is most recently assigned to and associated with an advertisement has the highest priority; and when the reference is used to request a communication connection with an advertiser, the customer can be prompted to confirm the set of parameters (directly or indirectly) before the set of parameters are used to connect the customer to the advertiser.

In one embodiment, a communication reference that is specific to a selected tracking mechanism is allocated or selected or generated for a particular advertisement. The communication reference is embedded into the advertisement to generate a particular version of the advertisement.

In one embodiment, the tracking mechanism is selected at a time when the particular version of the advertisement is needed for presentation (e.g., when the version of the advertisement is to be delivered to a media channel, a demand partner, or to a web browser of a customer). The corresponding communication reference is allocated or selected or generated when the tracking mechanism is selected.

In one embodiment, the selected tracking mechanism can be dynamically changed at a time when the particular version of the advertisement is needed for presentation (e.g., when the version of the advertisement is to be delivered to a demand partner, or to a web browser of a customer). For example, the tracking mechanism used in an advertisement that is to be presented via a particular demand partner can be upgraded or downgraded based on the statistical data collected from the past activities related to the advertisement.

In one embodiment, a version of an advertisement can have multiple assigned references corresponding to different types of tracking mechanisms. For example, a version of an advertisement may include a SIP address, a reference to arrange a callback and a reference to request an assigned phone number.

The SIP address may be presented in a click-to-call format via a VoIP application. When the customer has a VoIP application readily available, the customer may choose to make the phone call via the SIP address without requesting for a traditional telephone number.

The reference to arrange a callback can be implemented as a link or a button labeled as "Request a phone connection through calling me back". In one embodiment, a form to take the callback number is presented with the link or button. Alternatively, when the link or the button is selected, a further interface (e.g., a web page, a dialog box, etc.) can be displayed to guide the customer through the process of connecting the customer to the advertiser through calling back the customer.

The reference to request an assigned phone number can be implemented as a link or a button labeled as "Show me a phone number", which when selected, causes a phone number to be assigned to the version of the advertisement. After a phone number is assigned to the version of the advertisement, the advertisement can be subsequently displayed with the assigned phone number without showing the reference to request an assigned phone number.

Alternatively, when the "Show me a phone number" link or button is selected, the complete phone number of the advertiser can be shown to allow the customer to call the advertiser directly. In such an implementation, the number of times that the advertiser's phone number is clicked to reveal can be used as a performance indicator, based on which the advertisement is charged for.

In one embodiment, after a period of time of serving the advertisement, statistical data related to consumer responses to the advertisement can be collected and used to adjust the tracking mechanisms for the advertisement. For example, if it is determined that the majority of the phone calls in response to the advertisement is via the SIP address, other tracking mechanisms may be de-allocated from the advertisement, or re-allocated for a different advertisement. Alternatively, the reference may be phased out from the advertisement while the reference is allocated to a different advertisement.

For instance, if an advertisement has a high call volume (e.g., receives many calls), it may be upgraded for a more expensive method of tracking. An advertisement with an extension may be upgraded to a local phone number without an extension, or even a vanity toll-free number, if the performance of the advertisement is above a threshold (e.g., when its conversion rate or call volume is high). Conversely, advertisements that perform poorly may be downgraded in tracking methods used. For example, an advertisement tracked by a toll-free number without an extension may be downgraded to have a number with an extension, a click-to-call connection mechanism.

The tracking mechanism of an advertisement can be determined not only by the performance of an advertisement, but also by the quality of the demand partner or the quality of the customer viewing the advertisement. For example, one advertisement may use an expensive tracking mechanism on one demand partner but may be assigned a different, inexpensive tracking mechanism on a second demand partner who tends to have lower quality customers (e.g., customers who response less frequently to advertisements). The quality of a demand partner may be reflected upon on the difference in the conversion rate of a same advertisement presented via different demand partners, in the numbers of the potential customers the demand partners can reach, the quality of the customers of the demand partners, etc. In another embodiment, the tracking mechanism is directly determined by the quality of the customer himself/herself. For instance, information can be collected about the customer interacting with the advertisements; if the customer is a frequent buyer, an expensive tracking mechanism can be used for the customer. The quality of a customer may also reflected upon the preferences of the customer, the spending habit of the customer, the response rate of the customer to advertisements, the need of the customer, etc. In this case, different customers of different buying tendencies may see the advertisement using different tracking mechanisms at the same demand partners.

In one embodiment, the likelihood of an advertisement of being called is estimated based on the type of media channels used to present the advertisement, the demand partner responsible to deliver the advertisement, and/or the customer who views the advertisement. Any characteristics in advertising that have an impact on the likelihood of an advertisement of being called and thus the expected revenue/profit generated from the presentation of the advertisement can be used in selecting a tracking mechanism for the particular instance of the advertisement.

In one example, if it is determined that the number of communication leads generated from the assigned phone number is lower than a threshold, the assigned phone number may be reallocated to another advertisement. If the number of communication leads generated from the advertisement is higher than a threshold, the tracking mechanism used for the advertisement may be promoted to a phone number with a short or vanity extension, a phone number without an extension, a vanity phone number, a toll free phone number, a vanity toll free number, a local phone number, or a vanity local phone number. If the number of communication leads generated from the advertisement is lower than a threshold, the tracking mechanism may be downgraded, freeing up tracking resources for other advertisements.

In one example, when advertisements are provided to a demand partner that has a lower success rate in reaching viable customers than other demand partners, this demand partner may be represented using a long extension, leaving short extensions for other demand partners. Alternatively, the advertisements for presentation by the demand partner may be tracked using references for callback or SIP addresses.

In one example, the system may promote the advertisement activities in one geographic area; and the advertisements served in that geographic area receive upgrades in tracking mechanism.

In one example, the advertisements in certain categories of products and services use upgraded tracking mechanisms.

In one embodiment, the advertisements with a pay per communication lead price bid higher than a threshold receives an upgrade in tracking mechanism.

In one embodiment, the system determines weighting factors in various types of communication references (e.g., in terms of cost and benefit in promoting the advertisement), the success rate of the advertisement in various communication channel/demand partner, and the price bids of the advertisers. Based on the collected information, the system can select tracking mechanisms to optimize the potential revenue that can be generated from advertising. In one embodiment, the potential revenue includes the advertisement revenue and/or other revenue that can be generated from the advertisement. For example, when the system takes a commission from the transaction resulted from the advertisement, the potential revenue can include the expected commission from the presentation of the advertisement; and in such a case the system may further use the statistical data related to the successful rate of a call converting into a transaction, an average value of a transaction, the possibility of a repeated call, the average value of a repeated call, etc., in the determination of the potential revenue. In one embodiment, advertisements may qualify for better tracking mechanisms when their pay-per-call bid price reaches a certain value. Similarly, advertisements may qualify for better tracking mechanisms when their overall value reaches a certain threshold. Their overall value can be a function of their bid price, ordinal position, conversion rate, demand source, customer quality, etc.

Figure 6:
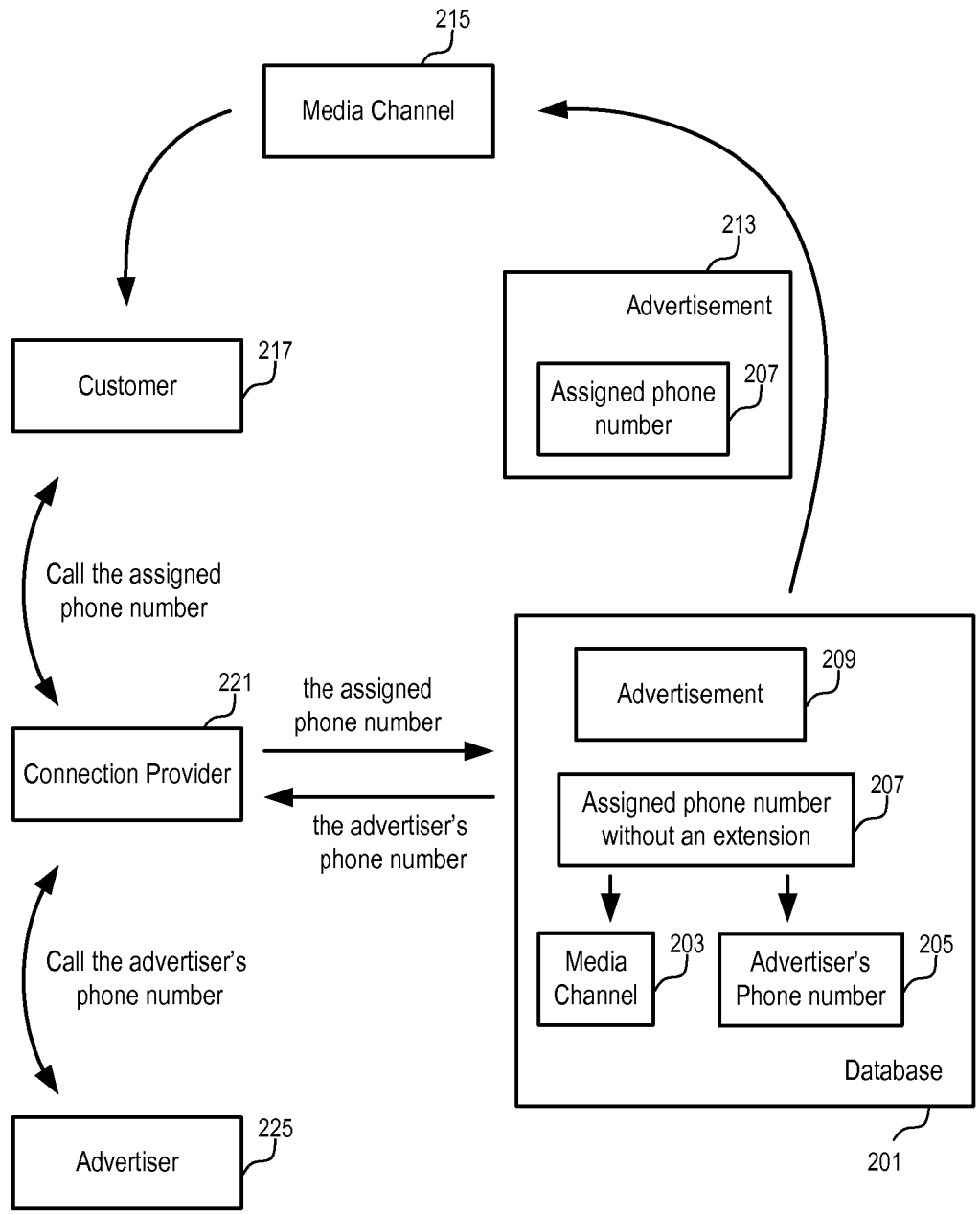
FIG. 6 illustrates an example of telephone call tracking mechanisms which can be selected according to one embodiment.

FIG. 6 illustrates an example of telephone call tracking mechanisms which can be selected according to one embodiment.

In FIG. 6, a phone number (207) without an extension is assigned for the generation a particular version (213) of an advertisement (209). In the database (201), the assigned phone number (207) is associated with the media channel (203) and the advertiser's phone number (205) (and/or other parameters to be tracked). Thus, the parameters to be tracked can be identified based at least partially on the assigned phone number (207). The particular version (213) of the advertisement (209) that has the assigned phone number (207) is provided to the customer (217) via the media channel (215). The advertisement may instruct or suggest the customer to call the assigned phone number (207) to reach the advertiser. In response to the advertisement, the customer may call the assigned phone number (207). When the connection provider (221) is called at the assigned phone number via a telephone carrier, the connection provider (221) can identify the assigned phone number (e.g., via a Dialed Number Identification Service (DNIS)) and determine the advertiser's phone number (205) based at least partially on the assigned phone number (207). Further, using the assigned phone number, it can also be determined that the phone call from the customer is a response to an advertisement that is delivered via the media channel (215) based on the association between the assigned phone number (207) and the media channel (203) in the database (201).

In one embodiment, after determining the advertiser's phone number from the assigned phone number that is dialed by the customer (217), the connection provider (221) makes a separate call to the advertiser (225) via a telephone carrier. When both the customer (217) and the advertiser (225) are on the line with the connection provider (221), the connection provider (221) can bridge or conference the calls to connect the customer (217) and the advertiser (225). Alternatively, the connection provider (221) may forward the calls from the customer (217) to the advertiser (225) after determining the advertiser's phone number.

In one embodiment, the assigned phone number can be a phone number that is local to the area to be served by the advertisement. Alternatively, the assigned phone number can be a toll free phone number, such as an 800- (888-, 877, or 866-) number. In one embodiment, the assigned phone number is a vanity number that spells one or more words on a dial pad on a phone, such as 1-800-PLUMBER for the advertisement of a plumber. Alternatively, the assigned phone number can be a plain phone number.

It is recognized that a local phone number is easy to dial manually, a vanity number is easy to remember, and an 800-number is easier to remember than other toll free numbers. Thus, there are different values in advertising in the different types of assigned phone numbers.

Since maintaining different phone numbers may increase the tracking cost, another type of tracking mechanism uses different extensions to differentiate tracked parameters. For example, different root phone numbers can be used to represent different media channels; and different extensions can be used to represent different advertisers. In another example, different root phone numbers are used to represent different advertisers; and different extensions are used to represent different media channels. In another example, the entire assigned phone number, including the root phone number and the extension, is used as a key to look up the media channel and the advertiser's phone number. In a further example, the root phone numbers are not used to differentiate tracked parameters; and the tracked parameters are represented by the extensions, which may be implemented as keys to look up the parameters or as encoded/encrypted version of the parameters.

In one embodiment, after the customer dials the root number, the customer is connected to an IVR system or a human operator of the connection provider/tracker. After the customer provides the extension to the IVR system or the human operator, the tracked parameters, such as the media channel and/or the advertiser's phone number, can be determined.

In one embodiment, the IVR system or the human operator can prompt the customer for the extension that is provided in the advertisement. When the dialed root number is sufficient to identify information about the media channel, the IVR system or the human operator may customize the prompt to include the information of the media channel and ask the customer to further provide the extension to reach the desired advertiser. When the dialed root number is sufficient to identify information about the advertiser, the IVR system or the human operator may customize the prompt to include the information of the advertiser and ask the customer to further provide the extension to reach the desired advertiser.

The extension can be a plain extension or a vanity extension that spells one or more words on a dial pad on a phone, such as extension PLUMBER for the advertisement of a plumber. In one embodiment, extensions used in the system can have different lengths. A shorter extension is easy to dial; and a vanity extension is easy to remember. In one embodiment, the extension includes an encoded/encrypted version of the associated parameter to allow an authorized data system to decode/decrypt at least some of the parameters without having to query the database. Thus, different types of extensions can have different values in advertising.

The tracking methods described can have different costs. A toll-free number with many extensions, for instance, is much cheaper than many vanity toll-free numbers. Therefore, the system uses the more expensive methods when it's worthwhile to do so. For instance, if an advertisement receives many calls, it may be selected for a more expensive method of tracking An advertisement with an extension may in the future be upgraded to a local phone number without an extension, or even a vanity toll-free number. Similarly, an advertisement may qualify for a more expensive method of tracking if its conversion rate is high (e.g., if it has a high ratio of the number of calls it receives to the number of times it is displayed). Conversely, advertisements that perform poorly may be downgraded in tracking methods used. For example, an advertisement tracked by a toll-free number may be downgraded to have a less expensive, click-to-call connection mechanism.

In one embodiment, the connection provider calls the customer instead of providing a phone number to receive a phone call from the customer. For example, the reference assigned to represent the contact of the advertiser may not be used to make a call via a traditional telephone carrier. The reference can be submitted to the connection provider via a data communication, such as an email, an SMS message, a web request, or other types of data communication. The reference can be used as a key in the database to look up the associated parameters, such as the media channel and the advertiser's phone number. In one embodiment, the reference is an encoded/encrypted version of the associated parameters, such that an authorized data system can decode/decrypt the information without having to look up from the database. After the reference is provided to the connection provider with the request for a connection, the connection provider can callback to the customer to establish the connection between the customer and the advertiser. The request may include a callback phone number of the customer. Alternatively, a customer may be prompted to provide the callback phone number in response to the request. The connection provider can connect the customer and the advertiser by calling the customer and the advertiser separately and bridge/conferences the calls, or by forwarding one call (e.g., the call to the customer) to another (e.g., to the advertiser).

In one embodiment, a telephone number assigned to a version of an advertisement includes a SIP address for the initiation of a VoIP-based telephone call. The SIP address can be used for a manually dialed call on a SIP-enabled phone, or be used in a click to call format. In one embodiment, the SIP address includes an encoded/encrypted version of the contact of the advertiser such that the connection provider can decode/decrypt the contact of the advertiser from the SIP address without having to look up from database.

In one embodiment, the allocation of a telephone number to an advertisement is deferred to a stage when a customer is interested in the advertisement and ready to make a phone call. A reference embedded in the advertisement can be used to specifically request for the telephone number that is assigned to the advertiser by the connection provider. The request can be sent as a web request in response to a click on a link, or as an email, an SMS message, or an instant message. The assigned telephone number may be a toll free phone number without extension, a local phone number with an extension, a SIP URL, etc. Alternatively, the reference can be used to request the actual phone number of the advertiser.

Figure 7:
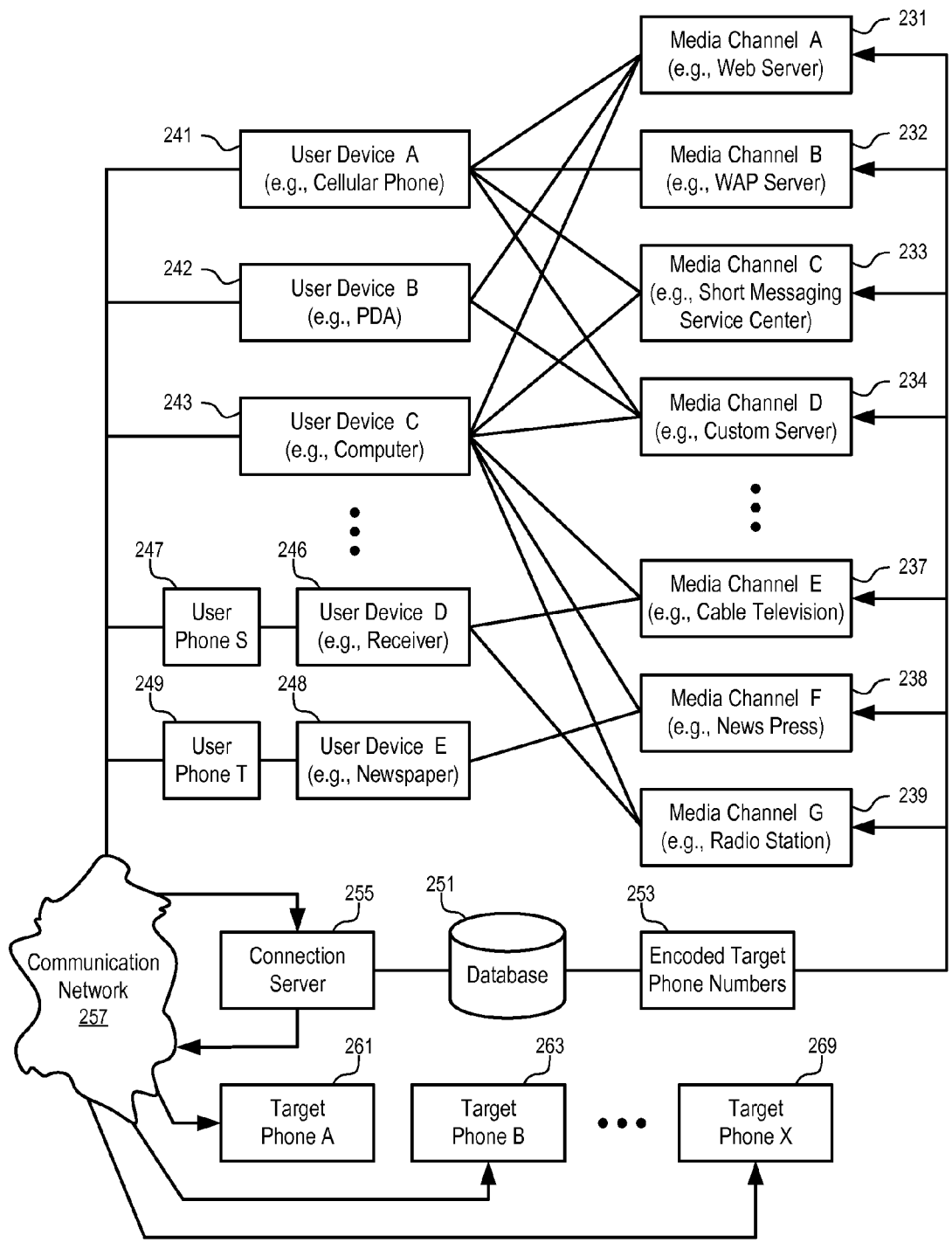
FIG. 7 shows a diagram of a system to make and track phone connections according to one embodiment.

FIG. 7 shows a diagram of a system to make and track phone connections according to one embodiment. In FIG. 7, a database (251) may contain the phone numbers of target phone A (261), target phone B (263), . . . , target phone X (269), etc. Typically, the target phones belong to the institutions, businesses, individuals, etc., which seek for publicity through various media channels, such as media channel A (231) (e.g., web server), media channel B (232) (e.g., WAP server), media channel C (233) (e.g., short messaging service center), media channel D (234) (e.g., custom server), media channel E (237) (e.g., cable television), media channel E (238) (e.g., news press), media channel G (239) (e.g., radio station), and others such as virtual reality, directory assistance service, interactive maps, etc.

In one embodiment, the phone numbers of the target phones are not directly publicized over the media channels. Instead, encoded target phone numbers (253) are used. Using the encoded target phone numbers (253), a user cannot reach target phones directly. The encoded target phone numbers (253) allow the association of additional information with the target phone numbers, such as the media channels used, special promotions, etc.

The encoded target phone numbers are delivered with content information (e.g., web page, WAP page, short message, television programs, news articles, virtual reality, etc.) to user devices, such as user device A (241) (e.g., cellular phone), user device B (242) (e.g., personal digital assistant (PDA)), user device C (243) (e.g., computer), user device D (246) (e.g., receiver), user device E (248) (e.g., newspaper).

In one embodiment, a user device can include a USB phone, a Bluetooth wireless phone, or one or more speakers or headphones with one or microphones for the implementation of a software based phone (softphone).

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. In one embodiment, the user devices/phones support the display of virtual reality.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (247) or user phone T (249).

In one embodiment, dialing at least a portion of an encoded target phone number connects the phone call to a connection server (255) first. According to the encoded target phone number dialed, the connection server (255) determines the corresponding target phone number using the database (251) and connects the phone call to the corresponding target phone (e.g., one of target phones 261-269) through the communication network (257).

Note the communication network (257) may be circuit switched, packet switched, or partially circuit switched and partially packet switched. For example, the telephone network may partially use the Internet to carry the phone call (e.g., through VoIP). For example, the connection between the user phone/device and the connection server (255) may be carried using VoIP; and the connection between the connection server (255) may be carried using a land-line based, circuit switched telephone network.

In one embodiment, the information associated with the encoded target phone number, such as the media channel used to provide the encoded target phone number to the users, is also decoded/retrieved using the database (251). Thus, the information associated with the encoded target phone number can be tracked/stored.

In one embodiment, the connection server (255) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment, an encoded target phone number has the same number of digits as a standard phone number (e.g., a typical telephone number assigned by a telephone company). Thus, dialing the encoded target phone number is as easy as dialing the target phone number; and dialing the target phone number reaches the connection server (255). In such an arrangement, a large number of encoded phone numbers are generally required to differentiate the different target phones and different media channels.

In one embodiment, an encoded target phone number has more digits than a standard phone number. A first portion of the encoded target phone number has the same number of digits as a standard phone number to reach the connection server (255) through the communication network (257); and a second portion of the encoded target phone number is to be decoded by the connection server (255). For example, the Dual Tone Multi-Frequency (DTMF) decoder can be installed in the connection server (255) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment, a single telephone number is used to reach the connection server (255) for different target phone numbers; and the portion of the encoded target phone number that is used to reach the connection server (255) is not used in determining the information associated with the encoded target phone number.

Alternatively, multiple telephone numbers can be used to reach the connection server (255); and the entire encoded target phone number can be used to determine the information associated with the encoded target phone number.

In one embodiment, the encoded target phone numbers can have different numbers of digits. The advertisers may be arranged to bid for shorter encoded target phone numbers.

In one embodiment, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (251) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the connection server (255). When such a mapping scheme is used, a look up table is not necessary. For example, an encoded target phone number may include a first portion that is the phone number of the connection server (255), a second portion that is the target phone number appended with a number mapped from an identifier of the media channel. To prevent the user from dialing the target phone number directly, an encryption/scrambling scheme can be used to encode the second portion, which is decoded at the connection server (255).

In one embodiment, the connection server (255) determines the target phone number from the encoded target phone number dialed by the user and then dials the target phone number for the user and joins/bridges the phone calls so that the user can talk to the target phone.

In one embodiment, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number.

In one embodiment, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment, the encoded target phone numbers are formatted so that the user device dials a first portion of the encoded target phone numbers to access the connection server (255), pauses for a short period of time for the connection server (255) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 7, the user device initiates the phone call. Alternatively, a connection server may be used to initiate phone calls both to the user device (or a separate user phone) and the target phone and then join/bridge the phone calls to connect the user to the target phone. For example, when the user selects the encoded target phone number, the selection of the target phone number is transmitted to the connection server with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the connection server. Alternatively, the content information can be formatted so that the selection is sent directly to the connection server.

When the connection server starts the phone calls, the encoded target phone number can also include alphabetic characters (and/or other characters). The connection server can decode the encoded target phone number to recover/retrieve the target phone number and other associated information, such as the identity of the media channel that is creditable for providing the encoded target phone number to user.

In one embodiment, an advertisement is presented to end users around the globe without geographical area limitations. For example, an advertiser may provide services and/or products to customers around the globe. The advertisement may be delivered to the worldwide users of the Internet.

In one embodiment, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment, an advertisement presented in a media channel is for a single advertiser. The end user selects an advertiser according to the advertisements presented on behalf of individual advertisers; and the connection server connects the end user and the selected advertiser according to the encoded target phone number individually publicized in the advertisement for the advertiser. When the user views the online advertisements, the selection of the advertiser is based on the online information.

In one embodiment, an advertisement is presented in a media channel for a group of advertisers, such as a group of mortgage brokers. The advertisement contains an encoded target phone number which is reachable to the group of mortgage brokers. When the encoded target phone number is selected or used, the selection of a particular advertiser is performed at the connection server.

For example, a toll-free number is published to advertise mortgage brokers in a particular geographic area. When a consumer dials the toll-free number, the call is routed to the highest bidding mortgage broker who is available in that market.

The connection server may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

Figure 8:
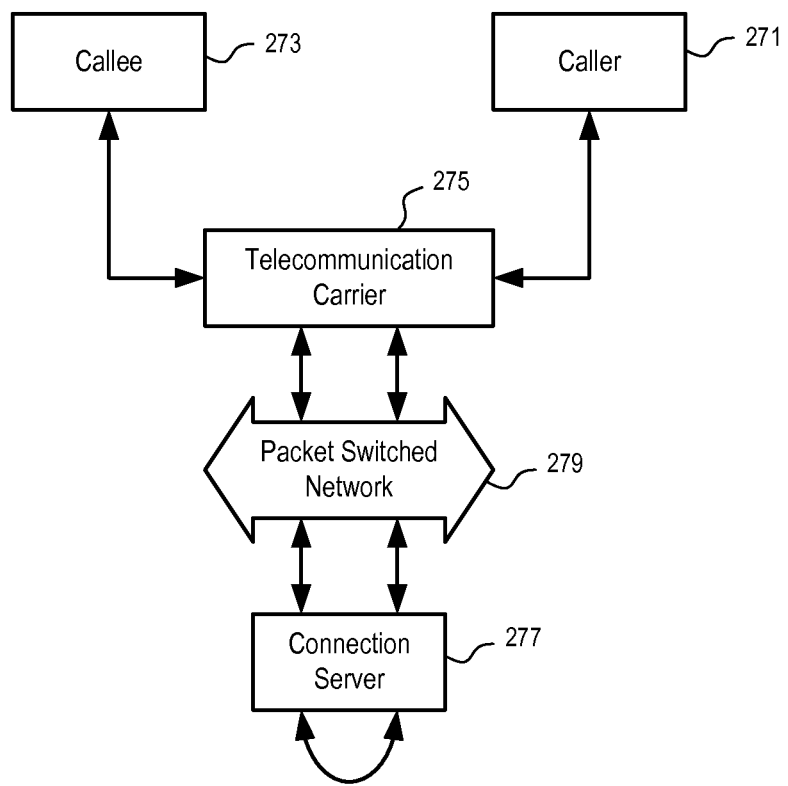
FIG. 8 shows a system including a connection server configured on a packet switched network according to one embodiment.

In one embodiment, a connection provider uses a connection server configured on a packet switched network to provide telephone connections between callers (e.g., customers) and callees (e.g., advertisers), as illustrated in FIG. 8. In FIG. 8, the connection server (277) receives and/or places telephone calls via the telecommunication carrier (275) over the packet switched network (279). The telecommunication carrier (275) further routes the telephone communications towards the caller (271) and the callee (273).

Since the telecommunication carrier (275) can route a call from a packet switched network to a variety of destinations (e.g., a traditional analog telephone set, a mobile phone, a cellular phone, a WiFi phone, a Bluetooth phone, a softphone running on a computer, etc.), the connection sever (277) can use one type of communication connection with the telephone carrier (275) to facilitate the communication connections with variety of devices used by the customers (e.g., callers and callees). Thus, the implementation of the connection server (277) can be simplified. In one embodiment, the connection server (277) can also place and/or receive direct VoIP calls to/from the caller (or callee).

For example, to make a voice connection in response to a click-to-call request, the connection server can place separate VoIP calls, via the telecommunication carrier (275), to the caller (271) (e.g., the requester of the click-to-call) and the callee (273) (e.g., the destination of the click-to-call request).

If the caller (271) (or the callee 273) is on a public switched telephone network (PSTN), the telecommunication carrier (275) bridges the packet switched the network and the public switched telephone network (PSTN). The telecommunication carrier (275) routes the call from the packet switched network (279) to the caller (271) (or the callee 273) on the circuit switched network. Thus, the caller (271) (or the callee 273) can use a telephone set to receive the call via a Plain Old Telephone Service (POTS). The connection server (277) joins the separate calls that are placed via the packet switched network (279) to connect the callee (273) and the caller (271).

In one embodiment, call signaling and media content may use different network paths. While call signaling is arranged to go through the packet switched network (279) and the connection server (277), the media stream does not have to go through the connection server (277). For example, when the calls are joined, the media content may be redirected to flow over the communication carrier (275) without going through the packet switched network (279) to the connection server (277) for improved performance and efficiency. The connection server (277) can release the control over the media stream to allow the media stream to flow through the shortest path, without going through the connection server, while maintaining control to the connection for the call by staying on the path for call signaling.

In another example, when the caller (271) initiates a call over a PSTN to the connection server (277), the telecommunication carrier (275) converts the call for the packet switched network (279) for the connection server (277).

In one embodiment, virtual softphones on the telecommunication carrier (275) are assigned to the caller (271) and the callee (273) for interfacing with the connection server (277) over the packet switched network (279). The virtual softphones encapsulates the devices and networks used by the caller (271) and callee (273) to access the connection server (277); and the telecommunication carrier (275) shields the connection server (277) from the implementation details of the user devices and networks used by the caller (271) and the callee (273). The connection server (277) calls (or receives calls from) and connects the virtual softphones on the telecommunication carrier (275) to connect the caller (271) and the callee (273).

In FIG. 8, the telephone connection between the telecommunication carrier (275) and the connection server (277) is facilitated via a packet switched network (279). Thus, the connection server (277) can operate efficiently in a digital domain. The connection server (277) interfaces with the telecommunication carrier (275) using one type of Internet Telephony systems (e.g., SIP-based Internet telephony).

Alternatively, a connection server may include some or all of the functionality of the telecommunication carrier (275). For example, the connection server may be configured to bridge a packet switched network and a circuit switched network. The connection server may support multiple, different types of Internet Telephony systems.

In one embodiment, the connection server (277) and the telecommunication carrier (275) are operated by different, separate entities. Alternatively, the connection server (277) and the telecommunication carrier (275) may be operated by the same entity. In another embodiment, the telecommunication carrier (275) includes a set of facilities operated by a number of separate entities.

In one embodiment, the caller (271) and/or the callee (273) may also place/receive calls via a packet switched network. The telecommunication carrier (275) may route the calls between the caller (271) and the callee (273) without using a PSTN. In one embodiment, caller (271) and/or the callee (273) may place calls to or receive calls from the connection server (277) via Internet.

Figure 9:
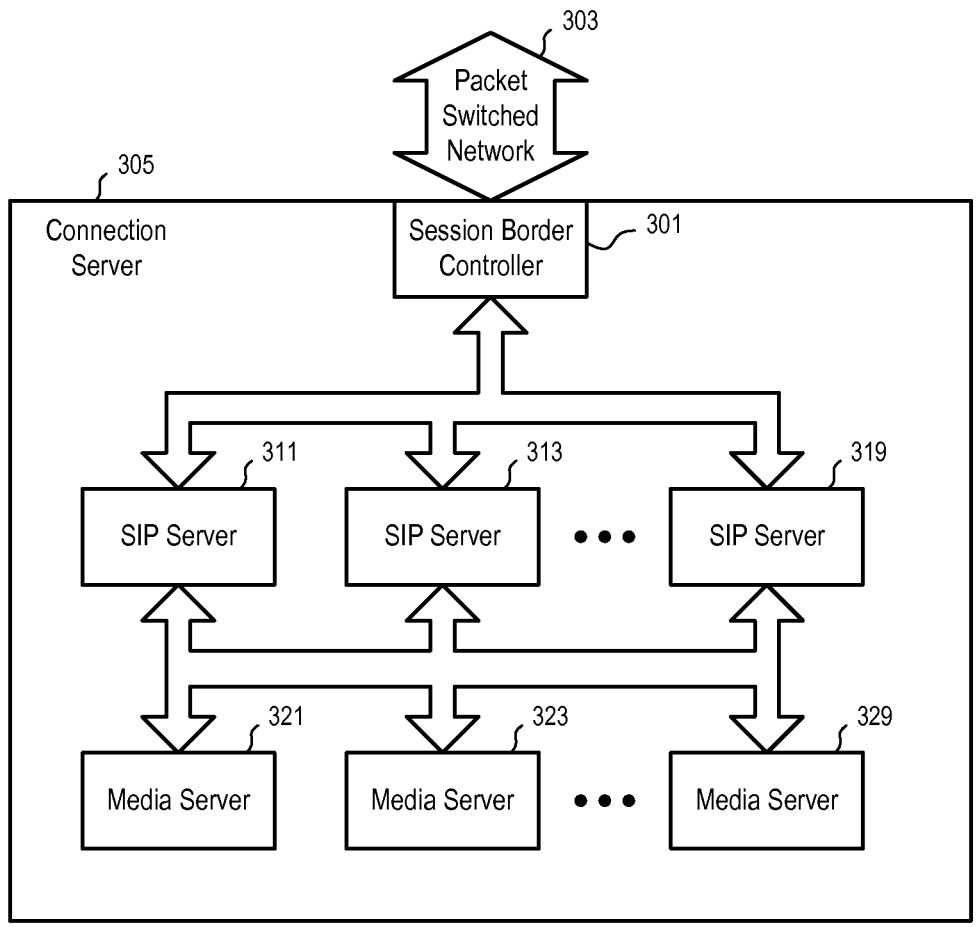
FIG. 9 shows a connection server according to one embodiment.

FIG. 9 shows a connection server according to one embodiment. In FIG. 9, the connection server (305) is configured to place and/or receive VoIP calls using Session Initiation Protocol (SIP). A session border controller (301) is used to interface with the packet switched network (303) and control the types of network traffic related to VoIP calls that might go into the connection server (305).

In one embodiment, the session border controller (301) is configured to control the signaling and media stream during the setting up, conducting and tearing down of VoIP calls to or from the connection server (305). In some embodiments, the session border controller (301) may pick up the call that comes to the session border controller (301), places a separate call from the session border controller (301), and joins the received call and the placed call to control both the signaling and media stream. In some embodiments, the session border controller (301) may perform signaling/encoding translation to allow the connection server (305) to process the VoIP calls in one standard, while receiving VoIP calls in a variety of standards (e.g., SIP, H.323, etc.). In one embodiment, the session border controller (301) is configured to perform one or more firewall functionalities, such as denial of service protection, call filtering, bandwidth management, etc.

In one embodiment, the session border controller (301) is configured to perform media releasing operation. When the session border controller (301) determines that the source and destination of a media stream is on the same side of the session border controller (301) (e.g., both the source and the destination of the media stream is outside the connection server 305), the session border controller (301) can release the hairpinning of the media stream and allow the media stream to flow without going through the session border controller (301).

In FIG. 9, a set of SIP servers (e.g., 311, 313, . . . , 319) are networked to the session border controller (301) to receive messages for incoming calls and to initiate outgoing calls. The session border controller (301) is configured to evenly distribute the calls for processing by the SIP servers.

For example, when an incoming message for the initiation of a call is received (e.g., a SIP INVITE message from the telecommunication carrier 275), the session border controller (301) may route it to a SIP server (e.g., 311) for processing. The INVITE message includes the phone number dialed by the caller and the contact information about the caller (e.g., the phone number of the caller 271 and/or the identity of the virtual SIP phone at the telecommunication carrier 275).

The SIP server may determine whether the phone number dialed by the caller (273) is sufficient to determine the phone number of the callee (e.g., 273). If the phone number of the callee (e.g., 273) can be determined from the phone number dialed by the caller (273) (e.g., via decoding the phone number dialed by the callee, or looking up the phone number of the callee from a table using the phone number dialed by the caller as a key), the SIP server can place a separate SIP call to the callee via the packet switched network (303) and then connect the caller and the callee. Alternatively, the SIP server can further route the SIP INVITE message (e.g., to the telecommunication carrier (275) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identifies a media server (321) (or a virtual softphone on SIP server) as the initiator for a separate call. The SIP server then connects the calls for the media stream.

In one embodiment, the caller is first connected to a media server (e.g., 321, 323, or 329). For example, the SIP server may forward the SIP INVITE message to one or more of the media servers for answering the call. When a media server (e.g., 321) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (303) (e.g., by sending a SIP INVITE message to the telecommunication carrier 275, which further bridges the call to the callee 273). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (301) into the connection server (305). For example, the media stream can go through the telecommunication carrier (275) in FIG. 8 without going to the connection server (277) after the SIP server connects the caller and the callee.

However, the SIP server stays on the signaling path to monitor the progress and termination of the call. The SIP server can also break the connection between the caller and the callee, or force the media stream to come through the connection serve (305). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (303) for a connection to the caller. The SIP call may be bridged onto a circuit switched network (e.g., by a telecommunication carrier 275). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (311, 313, . . . , 319) and media servers (321, 323, . . . , 329) are implemented on separate computers connected via a local area network (and/ or intranet or Internet). Alternatively, at least the some of the servers can be implemented on a same computer. In one embodiment, the SIP servers and the media servers are also integrated with the session border controller (301) on a same data process system having multiple processors coupled with a data bus. In one embodiment, the SIP servers are coupled to the media servers via a network; and a SIP server may use any of the available media server for interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (305) may further include a database server (305) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

Figure 10:
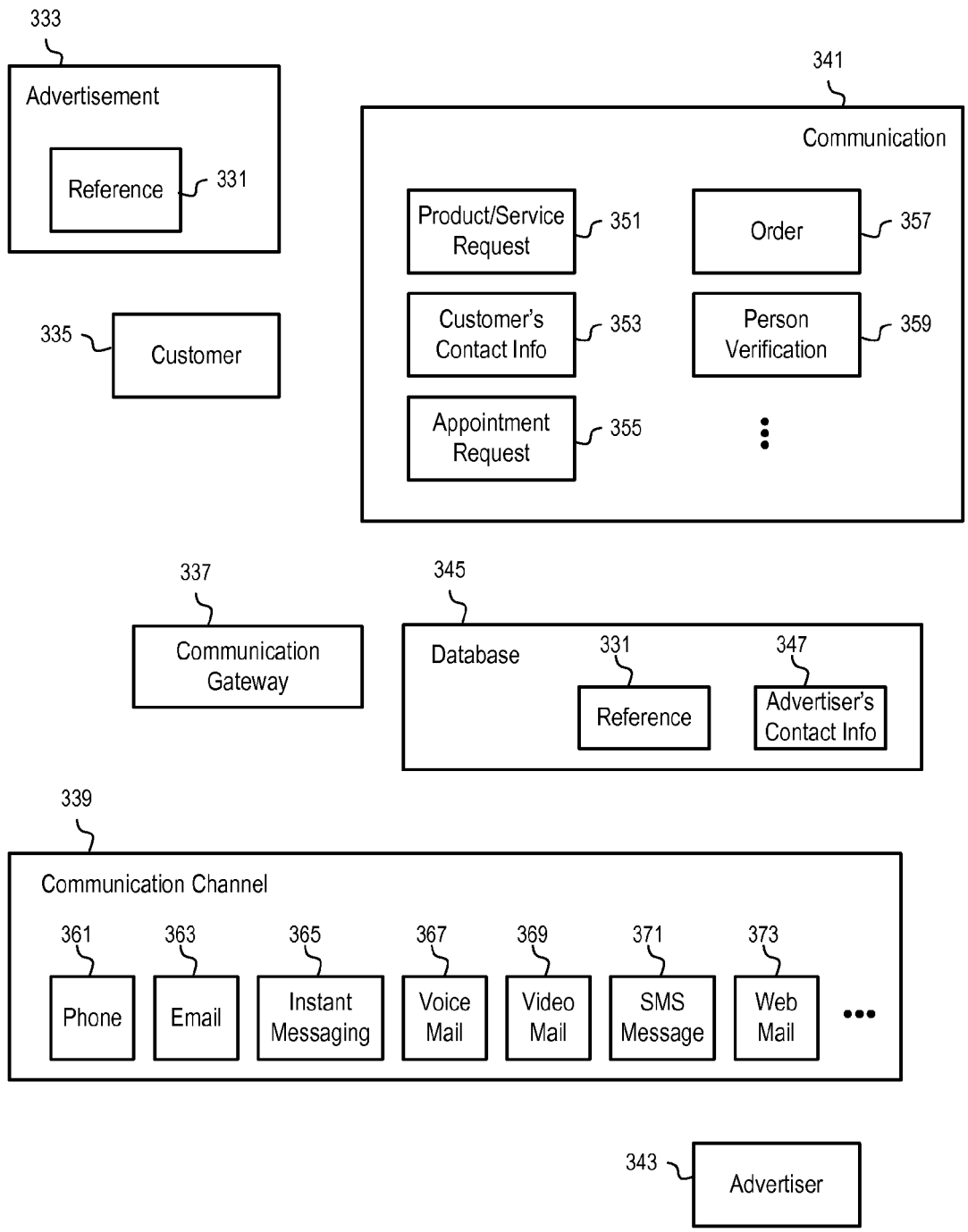
FIG. 10 shows examples of delivering communication leads according to some embodiments.

FIG. 10 shows examples of delivering communication leads according to embodiments. In FIG. 10, an advertisement (333) is provided, on behalf of the advertiser (343), to the customer (335) together with a reference (331) which is used to facilitate the tracking of communication leads generated via the advertisement (333). In one embodiment, the advertisement is specific for the advertiser (343); and the identity of the advertiser (343) is presented in the advertisement. In one embodiment, the advertisement is exclusively for the advertiser (343); alternatively, the advertisement may explicitly include the identities of more than one advertiser.

In one embodiment, the communication (341) that is responsive to the advertisement (333) is transmitted from the customer (335) to the advertiser (343) via the communication gateway (337). Since the communication request is made via the reference (331), the communication gateway (337) can look up advertiser's contact info (347) from the database (345) based on the reference (331) to facilitate the transmission of the communication to the advertiser (343). Alternatively, the reference (331) may include an encoded or encrypted version of the advertiser's contact info, which can be decoded or decrypted without having to perform lookup from a database.

In one embodiment, the reference (331) is at least part of a phone number (e.g., a toll free number, a local number, a phone extension, a SIP URI (Universal Resource Identifier), a VoIP address, etc.), which can be used to request a phone connection. In other embodiments, the reference (331) may be a portion of a parameter for an HTML link which can be selected to request the arrangement of a communication with the advertiser, a portion of an email for requesting a communication with the advertiser via email, a portion of an instant messaging identifier for requesting a communication with the advertiser via instant messaging, etc. In one embodiment, multiple references are provided in the advertisement to allow the customer (335) to select a communication media for reaching the advertiser (343).

In one embodiment, a communication lead includes the delivery of the communication (341) from the customer (335) to the advertiser (343). When the communication (341) is delivered from a distinct customer (335) to the advertiser (343), the communication lead is considered being delivered to the advertiser (343); and the advertiser (343) can be charged a fee for the advertisement (e.g., according to a price bid on communication lead).

In one embodiment, a communication lead includes a communication connection provided to facilitate the communication between the customer (335) and the advertiser (343). In one embodiment, when the communication connection is readily available to the advertiser (343), the communication lead is considered being delivered to the advertiser (343); and the advertiser (343) can be charged a fee for the advertisement (e.g., according to a price bid on communication lead). For example, after the connection between the communication gateway (337) and the customer (335) is established and the advertiser (343) is contacted for the completion of the connection between the communication gateway (337) and the advertiser (343), the communication connection between the customer (335) and the advertiser (343) can be considered being readily available to the advertiser (343). In another embodiment, a communication lead is considered being delivered to the advertiser (343) after the communication connection is established between the customer (335) and the advertiser (343).

In one embodiment, a connection for transmitting and receiving communications in real time is provided to facilitate the communication between the customer (335) and the advertiser (343). The connection may support full duplex, voice communication, video communication and/or text communication.

In one embodiment, the transmitting of the communication (341) from the customer and the receiving of the communication (341) at the advertiser (343) may not be in real time. The communication (341) may be stored or queued and then forwarded to or retrieved by the advertiser (343). In one embodiment, no connection is provided to support full duplex, real time communication; and the delivery of the initial communication (335) from the customer is considered as the communication lead.

In one embodiment, the advertisement (333) is charged for based on the delivery of a lead to a customer who has sufficient interest in the advertisement to initiate a request for an in person communication with the advertiser. Such a customer is more interested in the advertisement than a person who is simply browsing for information. Such leads can be more valuable than forwarding a web visitor to a web site of the customer.

In one embodiment, the customer (335) makes the request for an in person communication via a communication channel that is typically used for in person communications, such as a real time communication that supports voice. For example, the customer (335) may request a phone connection with the advertiser (343). For example, the customer (335) may request an instant messaging session with the advertiser (343). For example, the customer (335) may request for a video conference session, or a shared application session (e.g., common whiteboarding). For example, the customer (335) may request to send an email, instant message, voice mail, video mail, SMS message, web mail, etc., to contact the advertiser (343).

In one embodiment, the customer (335) makes the request for an in person communication via providing information that is specific to the customer and that is typically not apparent to a web site that is being visited. The provided information may or may not be forward to the advertiser (343).

For example, the customer may provide the customer's contact information (353) to request that the customer be contacted by the advertiser (343) via the communication gateway (337). The customer's contact information (353) may be used by the communication gateway to establish a connection between the customer (335) and the communication gateway, or be provided to the advertiser (343) who may then initiate the connection directly with the customer (335). The customer's contact information may be used by the communication gateway in receiving the initial communication from the customer and/or in delivering the initial communication to the advertiser (343).

For example, the customer can provide the phone number of the customer to request the communication gateway (337) to establish a phone connection with the advertiser (343) without providing the phone number of the customer to the advertiser (343). For example, the customer can provide an email address to request communications with the advertiser (343) via email without revealing the email address to the advertiser (343). For example, the customer may provide a postal address to request communications via postal services. For example, the customer (335) may send an appointment request (355), a product/service request (351), a purchase order (357), etc., to the advertiser (343) in the initial communication to the advertiser (343). Alternatively, the customer (335) may provide the phone number, email address, or the postal address to the advertiser (343) via the communication gateway (337) such that the advertiser (343) can subsequently contact the customer (335) without the communication gateway (337).

In one embodiment, the customer (335) is verified as being a person before the communication gateway (337) allows a communication flow between the customer (335) and the advertiser (343). For example, a human operator may talk to the customer to receive the customer's request and determine whether the communication is from a person. For example, the customer may be required to provide person verification information (359) so that the communication gateway (337) can determine whether the communication request is indeed from a viable customer. In one embodiment, the customer (335) is required to be authenticated as a registered member of the system. In one embodiment, the communication gateway uses Completely Automated Public Turing test to tell Computers and Humans Apart (CAPTCHA) to make a determination on whether there is a human behind the communication request. In one embodiment, a CAPTCHA test is designed such that most human users can pass the test, but it is very difficult to design a software program to pass the test. Since the system made the attempt to verify that there is a viable customer behind the communication request, the lead is valuable to the advertiser (343).

In one embodiment, a confirmation code is sent to the device at the callback phone number, or a device having a known relation with the callback phone number, to verify the callback request. For example, a confirmation code can be sent via an SMS message or an email to the phone or an address associated with the callback phone number; and the confirmation code is required to confirm the callback request. In one embodiment, the confirmation code can be used to associate the source device from which the callback request is initiated (e.g., a computer) with the callback phone number, such that subsequent requests from the same source device for calling back to the phone number can be authenticated based on the confirmed association relation.

In one embodiment, the callback is to be accepted by the customer before the connection provider initiates the call to the advertiser. For example, the customer may be required to explicitly accept the callback by pressing "#" key on the phone after picking up the callback, or implicitly accept the callback by picking up the call and hold the line while the connection provider delivering a message over the line to confirm the callback.

In one embodiment, the customer (335) makes the request for an in person communication via a communication in a form that is typically used for in person communication, such as voice communication. For example, the communication may include audio, video, image and/and text messages.

In one embodiment, the customer (335) makes the request for an in person communication via particularly requesting a communication contact of the advertiser. For example, a hidden portion of a communication reference is revealed when a request from the customer (335) is received; and the user interface is specifically designed to allow the user to specifically request the communication reference such that a majority of users would perform the action to request the communication reference only when specifically interested in the initiation of the communication with the advertiser. For example, a graphical user interface button or link may be designed to state "click here to see the phone number of this advertiser".

In one embodiment, the information provided by the customer (335) in making the request for an in person communication with the advertiser (343) is used by the communication gateway (337) to forward responsive communications obtained from the advertiser (343) to the customer (335).

In one embodiment, the information provided by the customer (335) is provided to the advertiser (343) without expecting an in person response from the advertiser (343). For example, a purchase order, an appointment or reservation request can be sent to the advertiser (343) without an in person reply from the advertiser (343). For example, the communication gateway (337) can use the data collected from the customer (e.g., via a web page) to file a request with the advertiser (343); and the request can be filed by the communication gateway (337) on behalf of the customer, via a web form, a voice message, an email, or an application program interface, etc.

In one embodiment, the communication channel used between the communication gateway (337) and the customer (335) has the same type as the communication channel used between the communication gateway (337) and the advertiser (343). The communications are relayed/forwarded by the communication gateway (343). Alternatively, the communication gateway (337) may perform format conversion; and thus, the communication channel used by the customer to provide the communications to the communication gateway (337) may not be the same as the communication channel the communication gateway (337) used to provide the communication to the advertiser (343). For example, the communication gateway may receive a requesting communication via a web page and transmit the request to the advertiser (343) via instant messaging, voice mail, email, a phone call, etc.

Further, the communication gateway (337) may perform language conversion. For example, the advertiser may communicate in one language (in text or voice) and the customer in another language. The system can perform translation (e.g., via a human translator and/or an automated translation system) while bridging the communication channels. In one embodiment, the translation service includes voice recognition and/or text to speech service.

A communication channel (339) used for the delivery of the communication lead may be phone (361), email (363), instant messaging (365), voice mail (367), video mail (369), SMS message (371), web mail (373), and/or other known types of communication channels.

In one embodiment, the advertiser is charged a fee for the advertisement when a deal is reached between the customer and the advertiser via the communication lead delivered by the connection provided through the advertisement.

Figure 11:
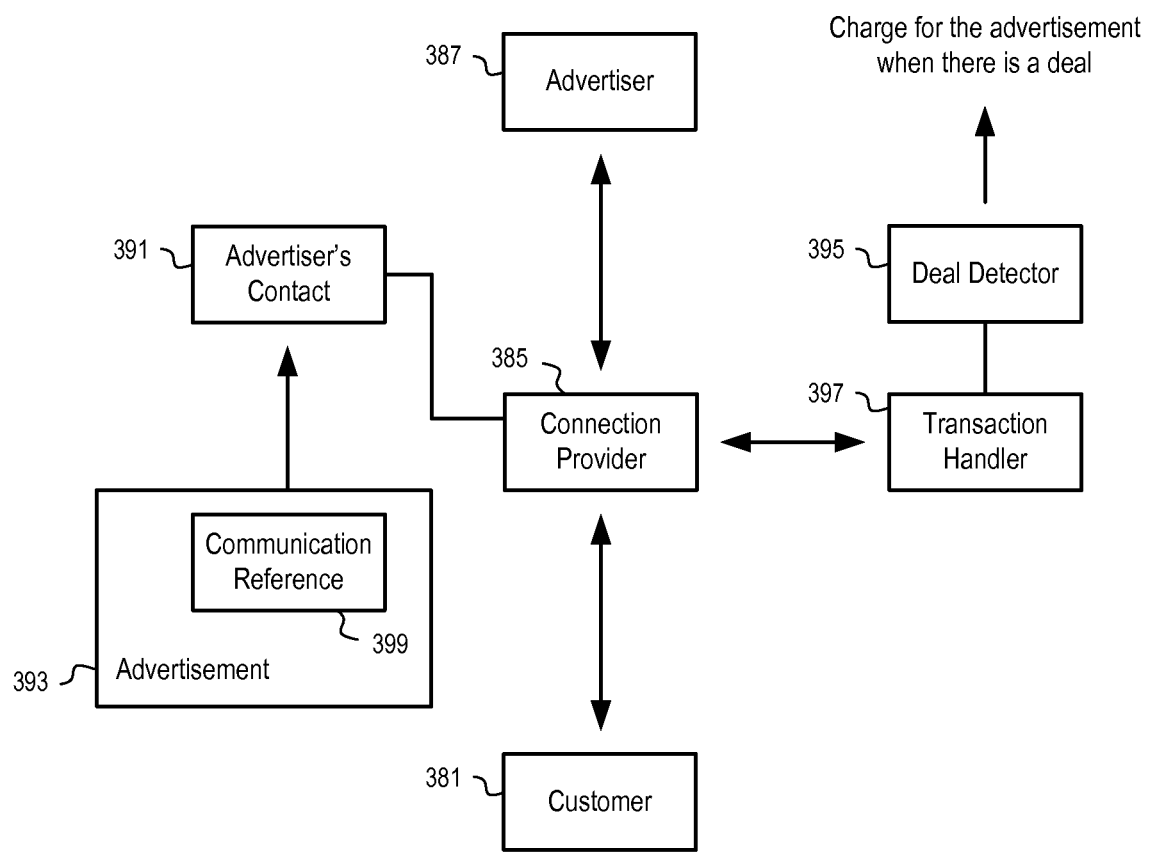
FIG. 11 shows a pay per deal advertisement process according to one embodiment.

FIG. 11 shows a pay per deal advertisement process according to one embodiment. In FIG. 11, a communication reference (399) is provided with the advertisement (393) to the customer (381). The customer (381) can response to the advertisement by using the communication reference (399) to request the connection provider (385) to provide a communication connection between the advertiser (387) and the customer (381). Based on the communication reference (399) used in the request, the connection provider (385) can determine the advertiser's contact (391) (e.g., through decoding/decrypting the communication reference or looking up the advertiser's contact using the communication reference as a key).

In FIG. 11, the connection provider (385) bridges the communications between the advertiser (387) and the customer (381). The connection provider (385) can monitor the communications to facilitate the transaction between the advertiser (387) and the customer (381). For example, the connection provider can provide the communications to a transaction handler (397) which performances the transaction on behalf of the customer (381) and/or the advertiser (387) based on the communications between the advertiser (387) and the customer (381).

For example, the advertisement (393) may present an offer from the advertiser to sell an item or service. Since the communication reference (399) can be used to request a voice connection to the advertiser (387) via the connection provider, the customer (381) can request a voice connection to talk to the advertiser (387) regarding the offer. After talking to the advertiser (387), the customer may decide to accept the offer. The customer can be instructed to provide a signal over the voice connection to indicate the acceptance of the offer. For example, the customer can press a key (e.g., "#") or dial a sequence (e.g., "*11") to indicate the acceptance, or provide a voice command (e.g., "accept" or "deal") after a voice prompt is provided by the transaction handler (397) via the connection provider (385) to the customer (381). The transaction handler (397) is configured to carry out the requests or deals made over the communication connection provided by the connection provider (385).

In FIG. 11, a deal detector (395) is coupled to the transaction handler (397) to detect a deal that is made via the communication connection provided by the connection provider (385) as a result of the advertisement (393). When there is a deal, the advertiser (387) is charged an advertisement fee for the advertisement (393).

In one embodiment, when there is no deal, the advertiser (387) is not charged an advertisement fee for the advertisement (393). For example, the connection provider (385) may charge the advertiser (387) for a communication service fee for the cost of the communication session between the customer (381) and the advertiser (387), regardless the result of the communication. The communication service fee may be based on the duration of the communication and/or the locations of the advertiser (387) and the customer (381). Alternatively, the communication service fee may be a monthly subscription fee, or a flat fee per communication session, or a flat fee per communication session having a duration less than a predetermined time limit (e.g., 3 minutes or 10 minutes). When there is a deal, the advertiser (387) is further charged an advertisement fee, according to a bid price of the advertiser or a flat fee price offered by the advertising network.

Alternatively, the communication service fee may be waive; and the advertising network may cover the communication cost using the advertisement revenue.

In one embodiment, the connection provider (385) includes a telecommunication service provider. The telecommunication service provider and the advertising network may share the advertisement income and/or the communication service fee.

For example, in one embodiment, the telecommunication service provider may charge the customer and/or the advertiser for a communication service fee for the connection made via the telecommunication service. The advertisement (393) can be presented to allow the customer (381) to particularly request the telecommunication service provide to provide the connection for the real time communications between the advertiser (387) and the customer (381). The advertising network and the telecommunication service provider can then share the revenue by compensating the advertisement network using a portion of the communication service fees resulted from the advertisements.

For example, when the advertisement is displayed on a mobile device of the customer (381) (e.g., a cellular phone), the advertisement can be presented in a format which allows the customer (381) to click on a link or icon to dial a number via the mobile device (e.g., the cellular phone) such that the phone call is made through a cellular communication network. For example, the advertisement can be presented in a format which allows the customer (381) to click on a link or icon to request the telecommunication service provider to call back the customer (381) for a connection to the advertiser (387). For example, the advertisement may present a telephone number dynamically assigned by the telecommunication service provider to the advertisement so that when the customer (381) call the dynamically assigned telephone number, the telecommunication service provider further connects the phone call to the advertiser (387).

Alternatively, the advertising network and the telecommunication service provider can share the revenue by compensating the telecommunication service provider using a portion of the advertisement fees resulted from the advertisements. For example, the telecommunication service provider may charge neither the customer nor the advertiser directly. Instead, the telecommunication service provider may charge the advertising network for the communication service; or the advertising network provides a percentage of the advertisement fee to the telecommunication service provider.

In one embodiment, the telecommunication service provider charges the customer and/or the advertiser for a communication service fee; and the advertising network charges the advertiser an advertisement fee. The advertising network compensates the telecommunication service provider by providing a portion of the advertisement fee to the telecommunication service provider; and the telecommunication service provider provides a portion of the communication service fee to the advertising network to compensate the advertising network for leading the customer to the services of the telecommunication service provider.

In one embodiment, the communication service fee is not charged; and the advertisement fee collected from the advertiser (387) is shared between the telecommunication service provider and the advertising network. In another embodiment, the advertisement fee is not charged; and the communication service fee collected from the customer (381) and/or the advertiser (387) is shared between the telecommunication service provider and the advertising network.

In one embodiment, the advertising network may instruct the telecommunication service provider to charge the advertisement fee. In one embodiment, the advertising network may instruct the telecommunication service provider to charge and/or credit the advertiser (387) and/or the customer (381) for the transaction made over the communication connection between the advertiser (387) and the customer (381). In one embodiment, the telecommunication service provider charges or credit the advertiser (387) and the customer (381) via credit card accounts (or other types of electronic payment methods). In one embodiment, the telecommunication service provider charges the advertisement fee via the telephone bill of the advertiser (387).

In FIG. 11, the transaction between the advertiser (387) and the customer (381) is facilitated via the transaction handler (397). For example, the transaction handler (397) may be configured to process payment from the customer (381) to the advertiser (387) for purchases made by the customer (381), to process payment from the advertiser (387) to the customer (381) for acquisition made by the advertiser (387), to process delivery of goods, information, etc. The customer (381) and/or the advertiser (387) can be instructed or guided to provide instructions to the transaction handler (397) over the communication connections provided via the connection provider (385).

For example, the transaction handler (397) may include an interactive voice response system, which may include business processing logic for conducting the transaction. When the advertiser and the customer reach an agreement, the advertiser and/or the customer may request the transaction handler to capture the agreement. For example, if the customer is ready to make the purchase, the advertiser (387) may request the transaction handle to take over the conversation with the customer (381), confirm the purchase price and payment information, and conclude the deal. For example, if the customer is ready to visit the advertiser (387), the advertiser (387) may request the transaction handler (397) to present a direction to the business location of the advertiser (387).

Alternatively or in combination, the advertiser (387) may be instructed to provide an indication of a deal to or via the connection provider whenever the advertiser (387) gets a deal from the communication connection provided by the connection provider (385).

In one embodiment, the advice, entertainment, information purchased or acquired in the deal is delivered via the communication channel provided by the connection provider. Alternatively, the purchased or acquired goods and/or services can be delivered without going through the connection provider (385) and/or the transaction handler (397).

In one embodiment, the advertisement (393) is delivered to the customer (381) before a communication connection between the connection provider (385) and the customer (381) is established; and the customer (381) requests the communication connection between the connection provider (385) and the customer (381) via the advertisement (393). For example, the customer (381) may perform a search on a mobile device using a browser, a WAP application, or an SMS message (or an instant message); and the advertisement (393) is provided with the search result. For example, the customer (381) may enter or leave an geographic region (e.g., a commercial district or the vicinity of a business); and in response to a determination of the position of the customer (381) (e.g., via a GPS unit or a cellular position determination system) the mobile device carried with the customer can receive an advertisement (393) that is location sensitive.

In one embodiment, the advertisement (393) is delivered to the customer (381) over the communication connection between the connection provider (385) and the customer (381). For example, the connection provider (385) may also provide directory assistance service; and the advertisement (393) may be provided in response to a directory assistance request received from the customer (381) over the communication connection between the connection provider (385) and the customer (381). For example, the advertisement (393) may be provided in an audio format to the customer over the phone connection, or in a visual format to the customer's devices that is also capable to receive data, such as a cellular phone, a smart phone, a PDA, a portable computer, etc.

In one embodiment, the directory assistance provider is an entity separate from the connection provider; and the directory assistance provider forwards or bridges the connection to the connection provider for a connection to the advertiser (387) if the customer (381) responses to the advertisement (393).

Figure 12:
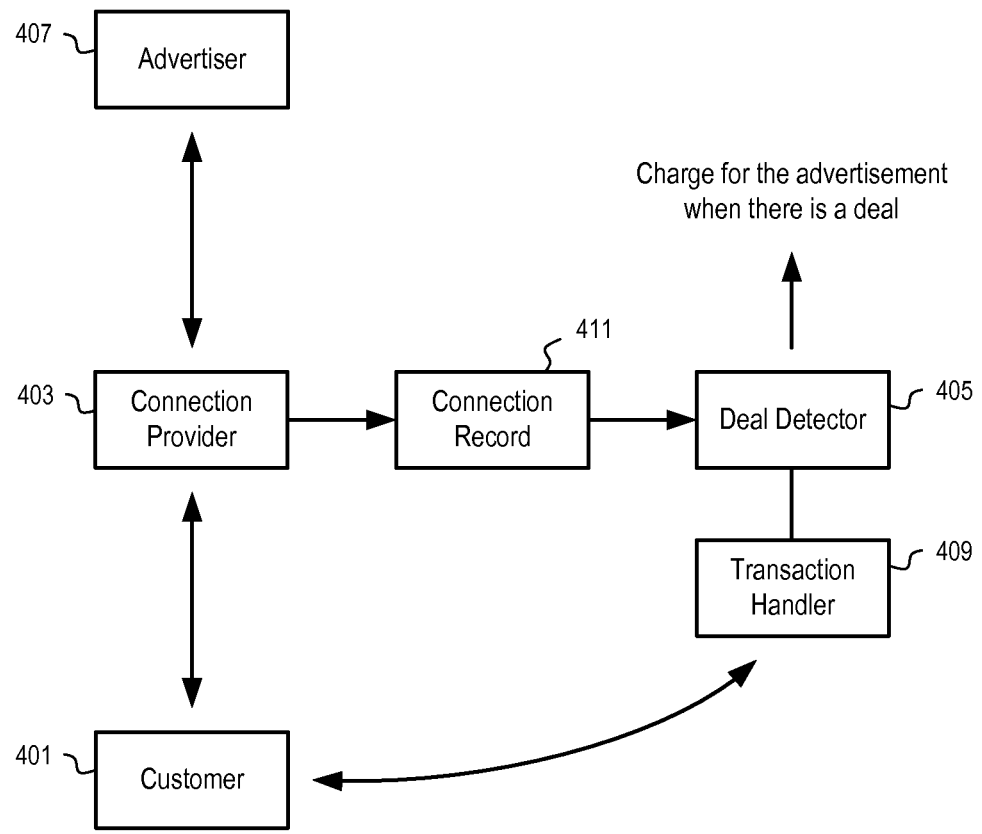
FIG. 12 shows a method to track a deal resulting from a real time communication connection provided in response to an advertisement according to one embodiment.

FIG. 12 shows another method to track a deal resulting from a real time communication connection provided in response to an advertisement according to one embodiment. In FIG. 12, the connection provider (403) provides a communication channel for real time communication communications between the advertiser (407) and the customer (401) via an advertisement. The customer (401) interacts with the transaction handler (409) separately to carry out a deal that is a result of the advertisement.

In FIG. 12, the connection provider (403) generates a connection record (411) which may include identification information of the customer (e.g., the IP address of the customer, the phone number of the customer, a user name of the customer, a credit card number of the customer, etc.), identification information of the advertiser (e.g., the advertisement for which the customer called, the phone number of the advertiser, an ID of the advertiser, etc.), the starting and ending time of the connection, etc. When the customer interacts with the transaction handler (409), the transaction handler (409) determines information about the transaction, such as identification information of the customer and identification information of the advertiser/advertisement. The information collected for the transaction can be matched against the connection record (411) by the deal detector (405) to determine whether the transaction is helped by any communication connections provided via the advertisement. In one embodiment, the matching process is further based on the time window of the transaction. For example, if there is overlap in time between the communication connection provided via the advertisement and the transaction, the communication connection may be credited for the deal. For example, if the transaction is performed before the expiration of a time window following the communication connection, the communication connection can be credited for the deal.

FIG. 12 illustrates an example in which the customer (401) interacts with the transaction handler (409) to close a deal. In other examples, the advertiser (407) may interact with the transaction handler (409) to close the deal. In further examples, both the advertiser (407) and the customer (401) may interact with the transaction handler (409) to close a deal.

FIG. 13 shows an example of a user interface (421) which allows an advertiser to define a deal for a pay per deal advertisement process according to one embodiment. In FIG. 13, the advertiser can define the "deal event". The occurrence of the deal event indicates that a deal, for the purpose of the advertisement, is closed; and the advertiser can be charged an advertisement fee for the deal achieved via the advertisement and/or the communication connection.

In FIG. 13, the advertiser may define the deal event as the customer talks to the advertiser for more than a predetermine period of time (e.g., 1 minute or 5 minutes, etc.).

In FIG. 13, the advertiser may also define the deal event as "the customer agrees to pay". For example, the system may provide payment processing for the advertiser. When the advertiser and the customer reaches an agreement over a phone connection, the advertiser can hand over the connection to the IVR system to process payment; and the IVR system may ask the customer for the payment information, such a credit card number, a bank account, a member ID, etc., and as the customer to confirm the acceptance of the charge. If the customer accepts the charge, the deal event "the customer agrees to pay" occurs; and the advertiser can be charged an advertisement fee for the deal delivered via the advertisement and/or the communication connection.

Alternatively, the advertiser may specify that the deal event occurs when the customer places an order, or the customer places a bid, or the customer agrees to be teleported into a specific location of a virtual reality environment.

In one embodiment, the advertiser may specify that the deal event occurs when the customer visits a web page at an URL specified by the advertiser. The system may present a link (e.g., in the advertisement or in a web page presented to guide the customer through the connection process and/or the business transaction related to the advertisement) to direct the customer to the web page specified by the advertiser. Alternatively, the system may require the advertiser to place a code in the web page at the specified URL to allow the tracking of the visits to the URL. For example, the code may include a link to the server of the system, which when receives a request made via the link forwards the link to the original server of the web page. For example, in response to a user selection/interaction, the code may make a remote procedure call to a server of the system to report the user selection/interaction.

In one embodiment, the advertiser may specify that the deal event occurs when the customer presses the submit button in the web page at the URL. The system can request the advertiser replaces a submit button provided by the system to allow the tracking of the customer selection of the submit button. For example, the submit button provided by the system can visit the web server of the system to report the selection of the customer and then forward data submitted with the selection of the submit button to the advertiser. In one embodiment, the system can provide an application programming interface to forward the data to the advertiser. In another embodiment, the web server redirects the web request resulting from the selection of the submit button to an URL specified by the advertiser (e.g., the original target URL of submit button of the web page).

In one embodiment, in response to the advertiser specifying the deal event as the customer pressing the submit button in the web page, the system may visit the web page the URL specified by the advertiser, determine the target URL of the submit button of the web page, and provide a replacement submit button to replace the submit button in the web page the URL specified by the advertiser.

In one embodiment, the advertiser may specify that the deal event occurs when the customer agrees to provide an address to the advertiser. For example, the system can collect the address information from the customers; when the address of the customer is needed to close the deal, the system may prompt the customer to authorize the release of the customer's address information to the advertiser. When the customer agrees to release his/her address, the system detects a deal; in response to the deal, the system can charge the advertiser a fee for the advertisement.

In one embodiment, the advertiser may specify that the deal event occurs when the customer agrees to provide answers to certain question (e.g., an advertisement for a survey). For example, the system may conduct the survey on behalf of the advertiser, while allowing the advertiser to supervise, monitor, or assist the survey process via the communication connection between the customer and the advertiser. The system closes a deal when the customer provides answers to a set of questions specified by the advertiser.

In one embodiment, the advertiser can specify that the deal event occurs when the advertiser is satisfied and dial a sequence specified by the advertiser to indicate there is a deal.

In one embodiment, when the advertiser specifies the deal event, the system arranges the detection of the deal event such that the advertisement can be charged according to the deals detected according to the deal event defined by the advertiser. In one embodiment, the system is designed to have the capability to detect a variety of events; and the advertiser can select one types of events or a combination of events as the deal event.

In one embodiment, the options for the definition of deal events can be offered based on the types of advertisements, or the category of advertisements, and/or the services provided by the system to assist the business transaction. For example, an advertisement may involve an auction, an acquisition, selling physical goods or digital goods, etc. Different types/categories of advertisements may be offered different choices for defining what the advertiser deems as a deal.

FIG. 14 shows an example of a user interface (431) which allows an advertiser to specify an offer of an advertisement fee for a pay per deal advertisement process according to one embodiment. In FIG. 14, the advertiser can specify the advertisement fee as a percentage of what the customer pays for a purchase made by the customer, a lump sum for each deal, and/or a percentage of what the advertiser pays the customer for an acquisition made by the advertiser, etc.

In one embodiment, the advertiser can group deals for the payment of advertisement fees. For example, the advertiser may offer to pay a subscription fee of a pre-defined amount per month under the condition that the system delivers at least a pre-defined number of deals via the advertisement. In one embodiment, the advertiser may specify subscription fees for a number different levels of deal amounts realized via the advertisement; and the system charges the subscription based on the actual level of deal amounts. For example, the advertiser may specify a first subscription when the deals resulting from the advertisement is below a first number, a second subscription when the deals resulting from the advertisement is between the first number and a second number, etc. In one embodiment, the advertiser may offer a basic subscription to the advertising network and an additional amount for deals achieved in a given increment (e.g., each deal, or each ten deals or each dozen of deal, etc.).

In one embodiment, the advertiser may specify the price for the advertisement fee as a maximum bid price; and the system can automatically determine the actual bid price based on the bid prices of the competitors of the advertiser.

In one embodiment, the advertiser may specify the price for the advertisement fee as a function of a bid price of the customer for the information, service, digital or physical products, or ownership interest offered by the advertiser. For example, the advertiser can offer information, service, digital or physical goods for sell via an auction; and the advertisement may be used to provide communication connections for communications between the advertiser and customers. When the auction is closed, the advertisement fee may be determined based on the largest bid price of the customers who have placed bids via the advertisement (or via the communication connections provided through the advertisement). Alternatively, the advertisement fee can be determined based on the winning bid independent of whether the winning bid is placed via a communication connection provided through the advertisement. Alternatively or in combination, the advertisement fee may also be charged for each distinct bid (or the highest bid from each distinct customer) received via the communication connection provided through the advertisement. In one embodiment, the advertisement fee can also be a function of the number of bids received over the communication connections provided via the advertisement, the level of the bid prices, and/or the quantities purchased by the customer. The function may be a continuous function, or a discontinuous function on a sliding scale. For example, an advertisement fee may be specified as $1.00 if the winning bid is above $10 but less then $20 and $2.00 if the winning bid is above $20. For example, an advertisement may be used to advertise the auction of a stock; and the advertisement fee can be different depending upon the amount of the bid for each share, the number of shares involved in the transaction, etc. In one embodiment, other conditions for the transaction can also be included in the computation of the advertisement fee, such as whether the purchase is in blocks, or odd lots, etc.

FIG. 15 illustrates an example of a user interface to track call activities according to one embodiment. In FIG. 15, a specific time period can be specified to view the call activities. In one embodiment, a seller can have multiple listings; and the user interface (441) allows the seller to view call activities related to a particular listing or call activities for all of the listings of the seller. The seller may choose a type of calls as a filter in viewing the call activities. In one embodiment, the displayed details of the call activities include call date, amount charged (445), the next highest bid (447), amount bid (449), etc.

In one embodiment, the seller can specify an amount of maximum bid for a listing to allow the system to automatically bid for the seller. For example, the system can automatically adjust the bid amount, in an individual opportunity to present listings, to increase the position of the listing of the seller without exceeding the amount of maximum bid.

In one embodiment, the seller may further specify a desired position for the automatic bid. For example, the seller may wish to be on the top five; and the system can automatically adjust the bid to attempt to move the seller to the top five in a search result, under the constraint of the amount of maximum bid.

Figure 16:
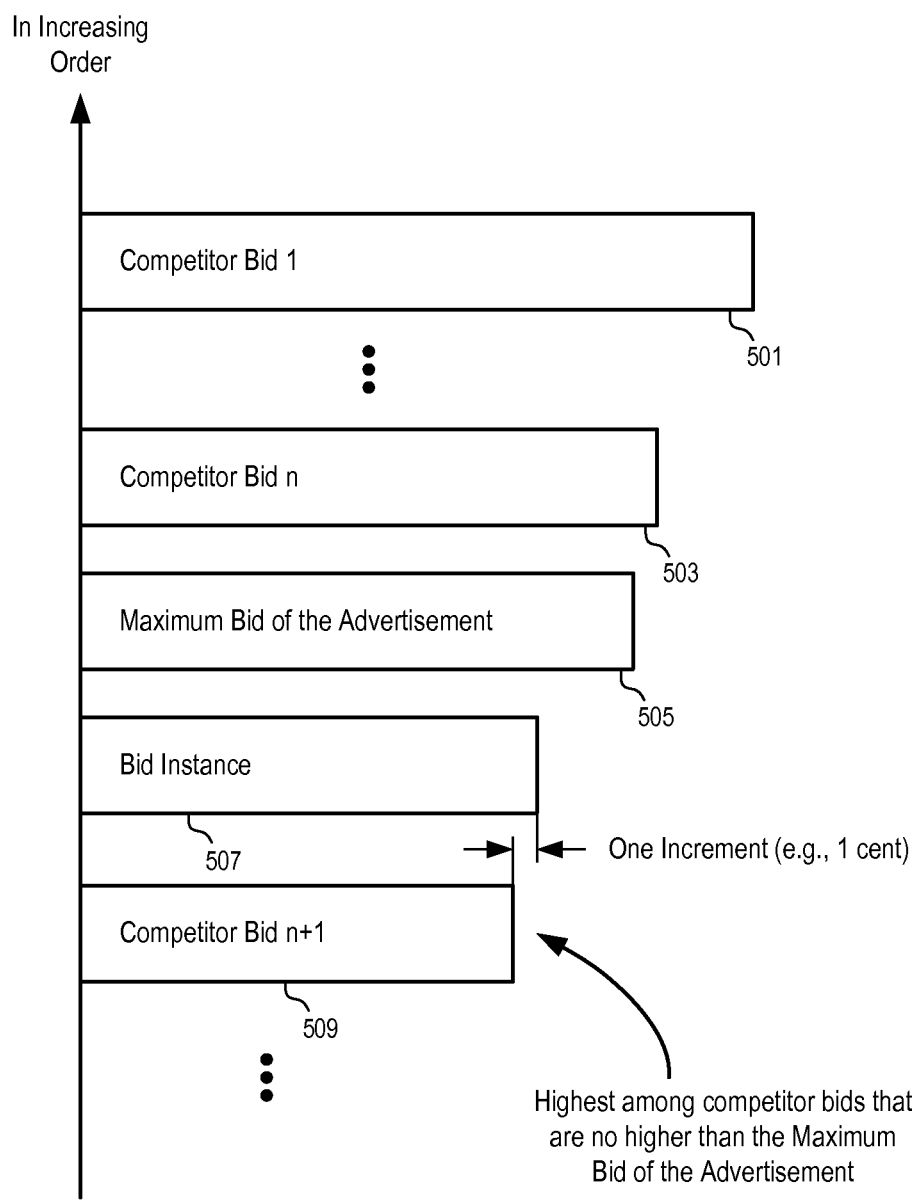
FIG. 16 illustrates a method to determine a bid instance based on a maximum bid.

FIG. 16 illustrates a method to determine a bid instance based on a maximum bid. In FIG. 16, the maximum bid (505) of the advertisement is illustrated together with competitor bids (e.g., 501, . . . , 503, 509, . . . ) in a sorted order. Since the maximum bid (505) of the advertisement is lower than some of the competitor bids (e.g., 501, . . . , 503), the actual bid will be lower than these competitor bids (e.g., 501, . . . , 503).

In FIG. 16, the competitor bid (509) is the highest among the competitor bids that are lower than or equal to the maximum bid of the advertisement (505). In one embodiment, the system is configured to set the actual bid for the advertiser such that the actual bid is higher than the bids of as many of the competitors as possible (e.g., to obtain a best possible rank, or other targeted ranks, in the list of competitors that are sorted according to the price bid); and the system optimizes the actual bid to the lowest possible bid to achieve the result. Thus, the system automatically calculates the bid instance (507) that is one increment above the highest one among the competitor bids that are no higher than the maximum bid of the advertiser. In one embodiment, the increment can be 1 cent, or 25 cents, or other values, such as one percent of the difference between the maximum bid of the advertisement and the next highest bid 509. Since the maximum bid (505) of the advertisement is the upper limit, the bid instance (507) is equal to the maximum bid (505) of the advertisement if the addition of the one increment would cause the bid instant to exceed the maximum bid (505) of the advertisement.

The advertiser may instruct the system to obtain the second best possible rank, or other targeted positions, in the list sorted according to the price bid. The ranking of the advertisements may not be strictly according to the price bids. The ranking of the advertisement may be a function of a plurality of parameters, including the price bid. In such a ranking scheme, the bid instance can be optimized as the lowest value that can achieve the desired rank position for the advertisement under the constraint of the maximum bid and other limits.

In one embodiment, the advertiser is provided with the option of receiving a notification (e.g., via phone, voice mail, email, instant message, SMS, etc.) when the maximum bid of the advertisement is outbid and cannot achieve a specific position target (e.g., top 5 in the ranked list).

In one embodiment, a bid instance is determined when the advertisement is selected or ranked for presentation to a customer. The advertisement may be ranked against competitors for selectively presentation to the customer, or for presenting the customer in a particular order or layout. The bid instance can be tracked and later identified as a price for a communication lead when the customer responses to the advertisement.

Alternatively, bid instances may not be precisely tracked; and a communication lead may be found to be associated with multiple bid instances. At the time of the communication lead which is generated as a response to the advertisement, one or more bid instances are selected (e.g., according to a time window, the demand partner who presented the advertisement, and/or other tracked parameters); and a price for the communication lead is determined based on the selected bid instances. For example, the price may be determined as an average (e.g. weighted average) of the selected bid instances. For example, the price may be determined to be the highest one of the selected bid instances.

In one embodiment, at the time of selecting or ranking the advertisements, the maximum bid is used without having to determine an actual bid instance. The advertisement is selected or ranked for presentation based on the maximum bid. At the time of a communication lead responsive to the advertisement, a bid instance is determined based on a set of rules to select competitors. For example, after a phone call from the customer is received in response to the advertisement, a bid instance can be determined based on known competition at the time of the phone call. The rules to select the competitors may be based on the keywords or categories of the advertisement, the geographic area of the advertisement, the query history of the advertisement, and/or other information, such as availability of the competitors to take the phone call.

FIG. 17 illustrates a list sorting process to increase revenue for a media channel in a seller network according to one embodiment. In FIG. 17, the advertiser database (607) includes a table of advertisers (611) with corresponding price per call (613) and earn percentage (615) for a media channel. The media channel may share with one or more partners the advertisement revenue generated from some advertisements and may not share the advertisement revenue generated from some other advertisements. To sort the advertisers, the potential revenue is computed (605). Revenue per call (609) indicates the amount that the media channel can earn out of the advertisements of the corresponding advertisers (611). For example, advertiser A (641) provides revenue per call of $7.50 (651), which is the product of the corresponding price per call and earn percentage.

In the example of FIG. 17, it is seen that the order of the revenue per call can be different from the order of price per call. For example, advertiser B (643) has a higher bid of price per call ($9.00) than advertiser C (645) ($8.00). However, advertiser B (643) has a lower earn percentage (60%) than advertiser C (645) (75%) for the media channel. As a result, the advertiser B (643) has lower revenue per call ($5.40) than advertiser C (645) ($6.00).

The list (601) illustrates the advertisements sorted/ranked (603) according to the potential revenue (e.g., 609) for presentation or selection. When the list is too long, only a top portion of the list is selected for presentation.

In the example of FIG. 17, the advertisers (631, 635 and 633) are listed in a decreasing order according to the revenue per call (609), instead of the price per call (613). For example, the advertiser C (635) is listed ahead of the advertiser B (633), because the advertiser C has higher revenue per call (655) than the advertiser B, although the advertiser C has a lower price per call (613) than the advertiser B.

In one embodiment, the potential revenue that is expected to be generated from presenting an advertisement is a function of a number of parameters, such as the price the advertiser is being charged to, the cost for presenting the advertisement, the likelihood of generating an event for which the price can be charged (e.g., a call through rate), and/or other related potential benefits that can be generated from the success of the advertisement, such as the value of a first phone call generated from the advertisement, the likelihood of repeated phone calls following the first phone call, the value of repeated phone calls, etc.

In one embodiment, the potential revenue includes the advertisement revenue and/or other types of revenues that are generated as a result of a successful advertisement. For example, as a result of a phone call from the customer in response to the advertisement, the customer may purchase services and/or products from the advertiser (seller); and the system may obtain a commission fee from the transaction performed while the customer and the advertiser (seller) are connected to each other via the system. For example, the seller may provide information, advise, entertainment, etc., over the phone connection provided by the system; the customer is charged based on the service time of the seller; and the service fee charged to the customer may be distributed among the seller, the connection system, a supply partner who bring the seller to the network, and/or a demand partner who brings the customer to the network.

In general, the potential revenue can be estimated using more or less parameters. For example, statistic data on the call through rate, the average amount of purchases resulted from a phone call and/or the subsequent repeated calls, the likelihood of repeated calls, etc. can be used to estimate the potential revenue.

For example, an adviser may advertise to sell advice over telephone connections established via the advertisement (or over other types of communication connections). The adviser may charge the customer based on a per-minute price for the communication time with the adviser. The seller network, the demand affiliate and/or the supply affiliate may deduct a portion of the advice fees as service charge. The likelihood of a sell resulting from a telephone lead generated from the advertisement can be used to estimate the portion of revenue that is a result of a purchase. Thus, the statistical data, such as average communication time, average sells, etc., can be used to estimate the revenue indicator for sorting the advertisements.

In one embodiment, an advertisement is presented on behalf of a group of advertisers; and one of the advertisers is to be selected for the customer after the customer initiates the call via the reference embedded in the advertisement. In one embodiment, a communication reference (e.g., a toll-free number) is shared among a group of advertisers; and the customer is prompted to enter the extension to reach a specific advertiser, or to provide voice input to select a specific advertiser (e.g., via an IVR system or a human operator). To facilitate the selection, a further advertisement specific for one of the advertisers can be presented to the customer, while the customer is connected to the connection provider or a directory assistance service.

Figure 18:
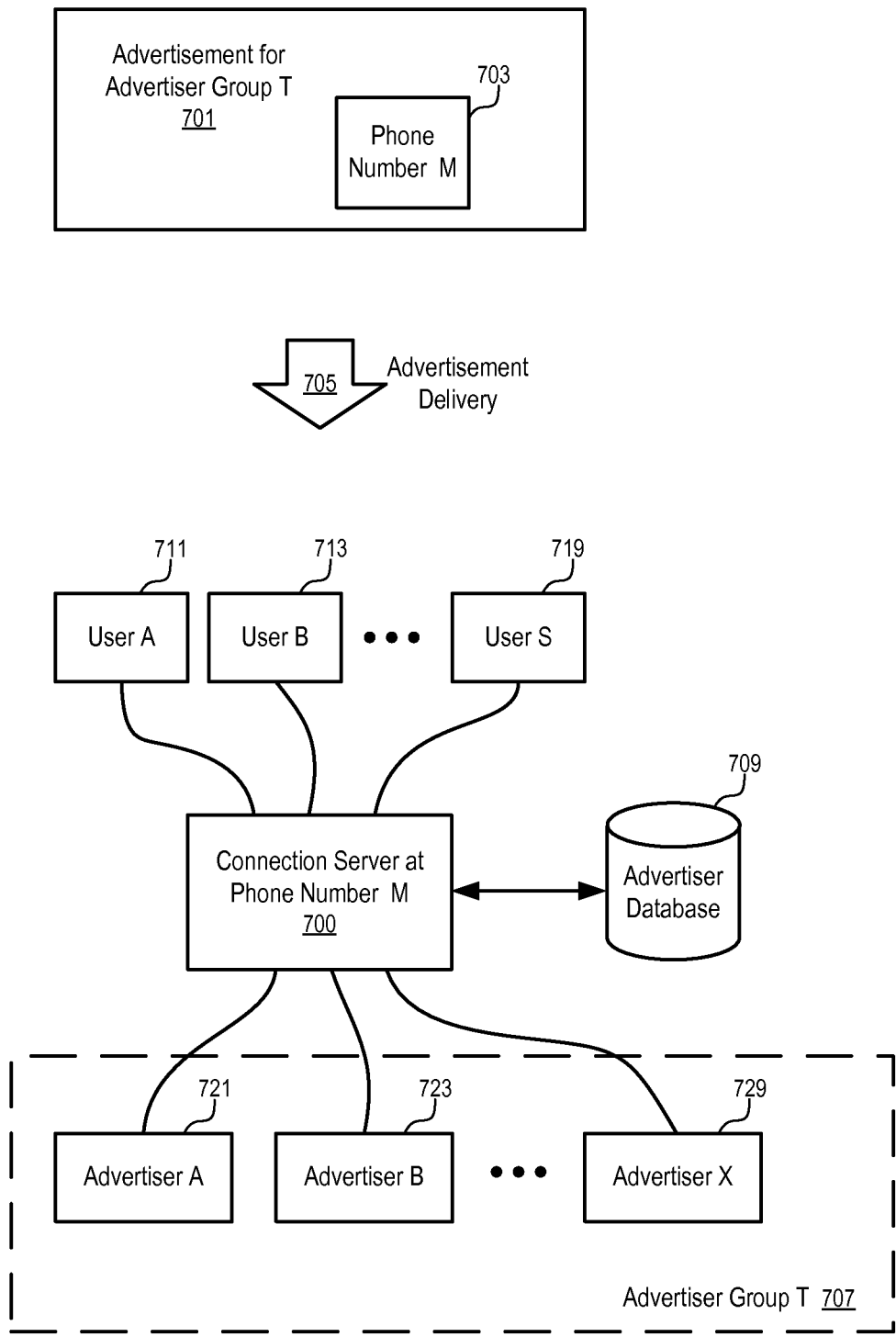
FIG. 18 shows a diagram of a system to make offline selection of advertisers according to one embodiment.

FIG. 18 shows a diagram of a system to make offline selection of advertisers according to one embodiment. In FIG. 18, the advertisement (701) is for an advertiser group T (707) which includes a number of different advertisers, such as advertiser A (721), advertiser B (723), advertiser X (729), etc. For example, the advertisers of the group may offer the same types of services or products under similar terms and/or prices. Thus, a unified advertisement can be presented on behalf of the entire group. The advertisement delivery (705) can be in any of the forms known in the art. For example, the advertisement can be delivered through newspaper, radio, television, yellow book, listing service, web search engine, web site banner, WAP, SMS, virtual reality, etc. The advertisement contains phone number M (703) for the users to initiate a phone call to reach one of the advertisers.

In one embodiment, the advertised phone number (e.g., 703) can also contain extension digits in addition to toll-free digits. In one embodiment, the extension digits are used to convey additional information such as geography, category, or the ability to trace specific advertising creative (e.g., the call resulted from the advertisement on the billboard on Second Street). In one embodiment, dialing of the extension digits (or some of the extension digits) is optional; if the extension digits are not dialed, the call goes through anyway; and the information corresponding to the extension digits is not collected (or, similar information is extracted/extrapolated from other data sources, such as the phone number from which the call is initiated, etc.).

In one embodiment, the advertisement is specific for an advertiser; the advertisement include a phone number for a group of advertisers having similar offers as this specific advertiser; and the advertisement further includes an extension to specifically identify the advertiser. If the customer does not provide the extension when making the call, the system may select an advertiser for the customer, or provide options for the customer to select one; in this case the system may consider the call of the customer a response to an advertisement for the group of advertisers.

In one embodiment, the phone number M (703) is not specifically for a particular advertiser at the time the advertisement is presented. Thus, at the time the user initiates the phone call, the target advertiser is yet to be determined. The selection of a particular target advertiser occurs after the initiation of the phone call.

In one embodiment, a connection server (700) at the phone number M is used to connect the users to the advertisers dynamically according to the information in the advertiser database (709). When a user, such as user A (711), user B (713), user S (719), etc., calls the phone number M (703), the user is connected to the connection server (700) first. With or without further user input, the connection server (700) connects the call to an advertiser, such as advertiser A (721), advertiser B (723), advertiser X (729), etc. The advertiser is charged based on the telephone calls generated for the advertiser. In one embodiment, the selection of the advertiser is made at the connection server after the user phone call is received. The connection server may operate via switching circuits or changing communication data packets.

In one embodiment, a winning advertiser is selected according to the bidding for advertisement. The highest bidder (or the bidder has the highest potential to generate revenue) wins the telephone call. The advertisers may adjust their bids anytime through any communication media to balance their chances to get a call resulting from the advertisement and the cost for the advertisement. For example, the advertisers may change their bids through a web site that is connected to the advertiser database, through an email to representatives or automatic email gateways of the advertiser database, through a phone call, a fax, a letter, etc.

Alternatively, the set of highest bidders may be determined; and the calls resulting from the advertisement are distributed to the set of highest bidders in frequencies that are proportional to their bid amounts. Alternatively, one from the set of highest bidders is further selected according other criteria, such as the geographic distance from the advertisers to the callers. Alternatively, other criteria, such as the matching of geographic service area to the location of the callers, are used to select a set of candidates; and the candidates are then ranked according to the prices specified by the advertisers for the pay for performance advertisement, where the performance is measured in terms of phone calls resulting from the advertisement.

In one embodiment, the availability of the advertisers to answer the call is also considered. In one embodiment, if the top-ranking (e.g., according to the bidding) advertiser receives a call and doesn't pick up after a certain amount of time (e.g. 30 seconds), the call is automatically routed to the second-highest ranking advertiser, and so on. In another embodiment, the missed call is routed to a human concierge who transfers the call to the appropriate available advertiser or information source.

In one embodiment, the customer is prompted to specify a subcategory to narrow the search and then allow the system to automatically select a top ranking advertiser for the customer, or present the ranked advertisers one after another (if the customer rejects the presented advertisers one after another).

The advertisers may be ranked according to the bid prices for the communication leads, the yield potential from the communication connection, etc.

Figure 19:
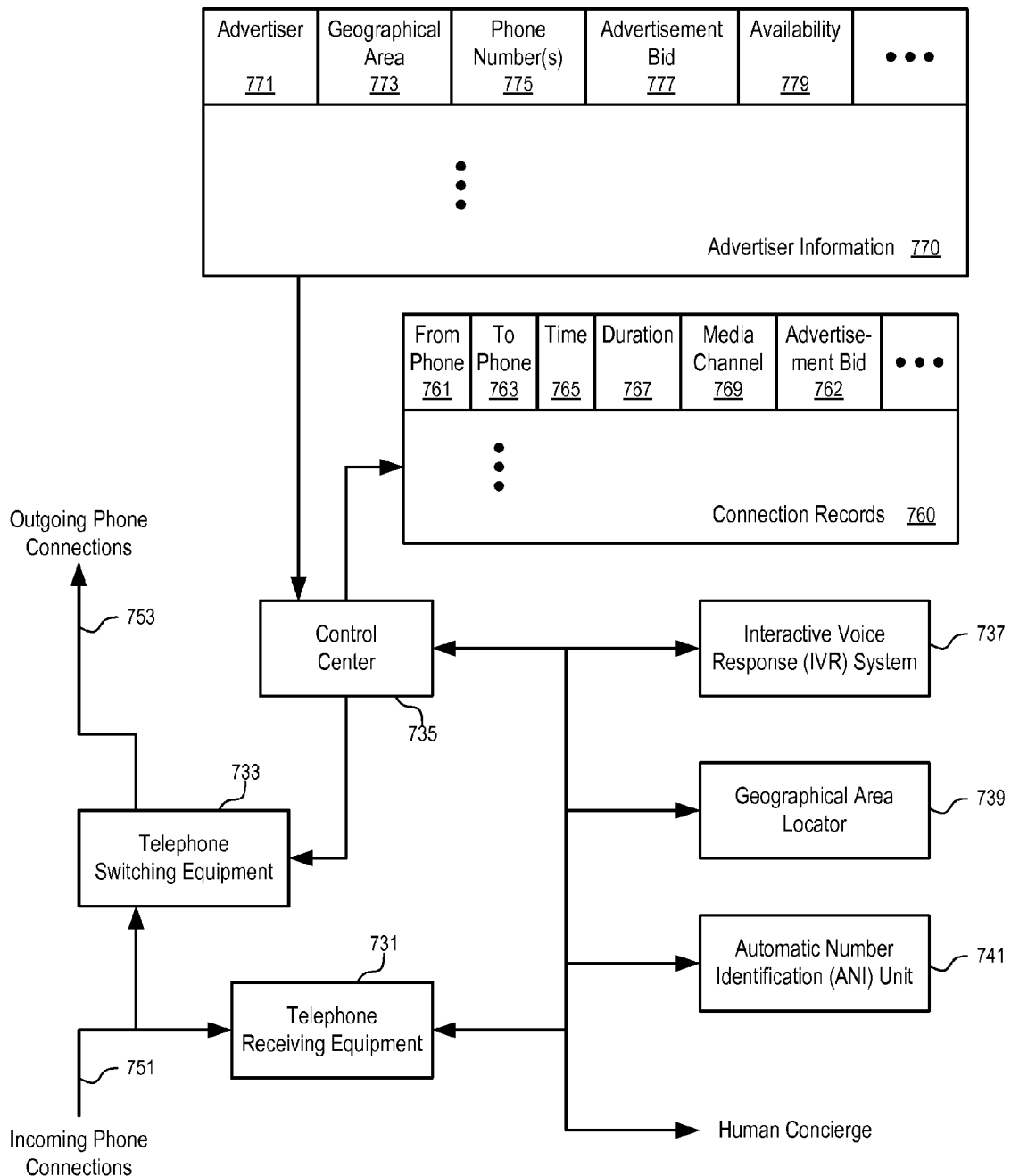
FIG. 19 shows a diagram of a telephone connection system for offline selection of advertisers according to one embodiment.

FIG. 19 shows a diagram of a telephone connection system for offline selection of advertisers according to one embodiment. In FIG. 19, when a user calls an advertised telephone number, the phone call is connected to the telephone receiving equipment (731). The telephone receiving equipment (731) is connected to the control center (735) to operate the telephone switching equipment (733), which selectively connects incoming phone connections (751) from the users and outgoing phone connections (753) to the winning advertisers.

In one embodiment, the telephone receiving equipment (731) and the telephone switching equipment (733) are circuit switched, including Private Branch Exchange (PBX) and a dedicated voice network. Alternatively, the telephone receiving equipment (731) and the telephone switching equipment (733) may be packet switched, including Internet Protocol (IP) based PBX, a data communication network and a gateway. In general, various telephonic techniques known in the art can be used.

When the telephone receiving equipment (731) picks up a phone call, the control center (735) determines whether or not further information is needed and/or can be obtained from the caller. For example, to determine a geographical area of interest, the control center (735) can instruct the interactive voice response (IVR) system (737) to prompt the caller to key in the desired zip code. In one embodiment, Interactive Voice Response (IVR) is a telephony technology in which one may use a touch-tone telephone to interact with a database to acquire information from or enter data into the database without the help of a human concierge.

Further, the control center may direct the IVR system (737) to prompt the caller to specify further criteria based on the advertiser information (770). For example, when the phone number is for a group of mortgage brokers, the user may be directed to select loan sizes, loan types, etc.

Alternatively, the control center (735) may instruct the geographic area locator (739) to determine a geographic area from which the call is initiated. For example, the geographic area locator may use the cellular position system to determine the location of a cellular phone, or use a satellite/pseudolite positioning system to determine the location of a mobile device. Pseudolites are ground-based transmitters signals similar to a Global Positioning System (GPS). Pseudolites are useful in situations where signals from an orbiting satellite might be unavailable, such as tunnels, mines, buildings or other enclosed areas. A satellite/pseudolite signal receiver may determine its location and transmit the location through the cellular phone to a cellular communication system, or transmit the received signals to a location server which computes the location.

A cellular communication system may also determine the location of a cellular phone. For example, the location of a cellular phone can be determined using a method known as Time Difference of Arrival (TDOA) in which the reception times of a cellular signal from a mobile station are measured at several base stations to determine the position of the cellular phone. Alternatively, a method known as Advanced Forward Link Trilateration (AFLT), or Enhanced Observed Time Difference (EOTD), can be used, which measures the reception times of cellular signals from several base stations to the cellular phone. Alternatively, the cellular site, in which the mobile device can communicate to a based station, can be used to determine a rough position of the cellular phone. In general, any method used by a cellular phone provider to get location information (e.g., for emergency service) can be used.

The control center (735) may also instruct the automatic number identification (ANI) unit (741) to determine the phone number of the incoming call and look up the geographic area information from the database for the phone numbers.

Alternatively, the control center (735) may connect the phone call temporally to a human concierge who can help the caller to specify a selection criterion (or criteria).

In one embodiment, the control center (735) uses a number of different types of information to select the winning advertiser based on the advertiser information (770).

In one embodiment, the advertiser information (770) include the identities of the advertisers (e.g., 771), the geographic areas (e.g., 773) of the advertisers, the phone number(s) (e.g., 775) of the advertisers, the placement bids (e.g., 777) of the advertisers, the availability statuses (e.g., 779) of the advertisers, etc. In an alternative embodiment, more or less fields can be used for the advertiser information. For example, keywords of the advertisements and/or categories of the products and/or services advertised in the advertisements can be included in the database of advertiser information.

The availability may include the information about the projected waiting time for a caller to get through. The availability may also depend on the advertisement budget specified by the advertiser. For example, the advertiser may specify the advertisement budget in terms of the maximum number of calls in a day, the minimum time intervals between two calls, working hours, etc.

In one embodiment, in view of the caller's implicitly or explicitly specified requirements (e.g., the geographic area, the loan type, loan size, etc., if there is any), the control center ranks the advertisers according to the current advertiser information. For example, the control center may eliminate the advertisers that are not available or do not meet the caller's requirements and sort the remaining candidates according to the bid for advertisement. The highest bidder in the remaining candidates is the winner. Alternatively, other types of sorting criteria can be used. For example, an indicator of the degree of matching between the caller's requirements can be weighted according to the advertisement bid to generate an indicator for selecting the winner.

After the winning advertiser is determined, the control center (735) can instruct the telephone switching equipment (733) to connect the incoming phone call to the phone number of the winning advertiser. The control center (735) then creates a record entry in connection records (760) to indicate the connection made for the advertiser. For example, a record entry may include information such as the from phone number (761), the to phone number (763), the time the connection is made (765), the duration of the connection (767), the media channel (769) responsible for delivering the advertisement to the caller, the advertisement bid (762) of the advertiser at the time of the connection, etc. Other information, such as whether or not a human concierge is involved, can also be recorded. In an alternative embodiment, more or less fields can be used for the connection records.

In one embodiment, further advertisement information may be presented to the caller on behalf of the individual advertisers, after the phone call from the caller is received and before the phone call is forwarded/routed/connected/bridged to an advertiser, to assist the caller in selecting an advertiser from a set of candidates. In one embodiment, detailed, differentiating advertisements are delivered to the callers who are already in the process of making a telephonic connection to one of the advertisers (e.g., service providers).

In one embodiment, advertisements for the individual advertisers are to be presented as voice/audio messages transmitted over the telephonic connection between the server and the caller, before the server further connects the call to a selected advertiser. For example, one or more advertisements as in the form of a pre-recorded voice message, and/or the output of a speech synthesizer using a text-to-speech system, can be presented to the caller over the telephonic connection.

Alternatively, in one embodiment, advertisements for the individual advertisers are presented in a visual form to the caller through the telephone connection, or through a separate data connection. For example, the additional visual advertisements can be sent via SMS or MMS messages, email, instant messages, etc.

For example, through the telephone connection, a data stream can be provided from the server to the user device of the caller to present a document, or a user interface, that shows one or more listings of advertisers so that the user can select one to connect. For example, when the telephonic connection between the caller and the server is based on a Voice over Internet Protocol (VoIP) system, the server can provide the data stream to the terminal used by the caller to show advertisements, such as displaying the advertisements within a window of the VoIP client application, or within a separate web browser window.

In one embodiment, a VoIP phone is designed to display messages in additional to transmitting the voice/audio messages. For example, the VoIP phone is designed to receive and display video images or still images during the phone connection. Advertisements/listings can be presented as video images or still images. For example, the VoIP phone can be designed to receive and display data (e.g., text message, web page, WAP page, or data of a custom application). The server can stream the advertisement data to the VoIP phone over the connection for display.

In one embodiment, the selection of the caller is transmitted to the server as a voice/audio message. For example, according to the visual and/or the voice/audio presentation of the advertisements/listings, the caller can make the selection using a voice command (e.g., say an ID number of the advertisements/listings, or the name of the listings), or pressing a key to generate an audio signal (e.g., a Dual Tone Multi-Frequency (DTMF) signal) to indicate the selection.

Alternatively, in one embodiment, the selection of the caller is transmitted in a digital form, such as a text message, a web request, a WAP request, or a request in a custom communication protocol (e.g., SIP) when a custom application is used to display the advertisements/listings.

For example, a VoIP phone is designed to transmit data generated according to user input received at the input device of the phone (e.g., a touch screen, a keyboard, a keypad, etc.) After the caller views the advertisements/listings during the phone call, the caller can make a selection (e.g., click) to request the connection to the corresponding advertiser.

Further, a phone designed for a circuit switched network can also be designed to have at least some of the communications capabilities via the telephonic connection discussed above. For example, a phone for a circuit switched network can have a circuitry to detect audio signals that represents data transmitted over the phone connection and display the advertisements/listings according to the data received.

In one embodiment, the advertisements/listings are presented over a data connection separate from the telephonic connection. For example, a data-enabled phone (e.g., a cellular phone, a mobile phone, a Bluetooth phone, a software phone, etc.) can establish a separate data connection with the server to allow the display of the advertisements/listings. For example, the data-enable phone can have an application designed to display the advertisements/listings when the phone number of the server is dialed. The advertisements/listings may be pre-loaded, or downloaded after the dialing of the phone number of the server. In one embodiment, the data connection is a two-way communication channel, which allows the phone to transmit the user selection and/or other user input (e.g., search criteria) in a digital format.

In one embodiment, the server selectively determines one or more candidates. A representation of the candidates is then presented to the caller for selection/confirmation. The representation can be delivered for visual and/or audio presentation.

For example, after the caller calls the telephone number of the server, the caller may specify one or more criteria to search for a suitable advertiser/service provider. After the search is performed, the server presents one or more listings/advertisements of the candidates to the phone of the caller for display. The caller can select a desired one to connect or request more candidates. Alternatively, the candidates can be read out to the caller one at a time for the user to select. In one embodiment, the presentation sequence, or position, of the candidates are at least partially determined by the price bids of the candidates for the phone lead. The caller can use the telephone to select the advertisement for a connection to the corresponding advertiser.

In one embodiment, the advertisements are presented as a "switch pitch." For example, the customer may ask for "Hilton Hotel" (e.g., in a directory assistance request). The system determines whether it has other advertisements in this same category (e.g., hotel), and if so, presents one or more of the advertisements selected from this category. For instance, the presentation may include an offer, such as: "Sheraton Hotels is offering a 20% discount this week. Would you like to be connected to them instead?"

In one embodiment, such advertisements are triggered by certain keywords detected in the conversation, such as "hotel." Alternatively or in combination, the advertisements can be selected according to category. For example, the customer may have requested directory assistance in the category of travel accommodations.

In one embodiment, the voice request made by the customer and/or the response of a human concierge is converted into text via speech recognition; and based on the text, the system automatically determines the context of the conversation and selects one or more advertisements for presentation according to the determined context. In one embodiment, a number of advertisements are selected and presented to the human concierge (e.g., in a visual form on a display device in front of the human concierge); and the human concierge can then select one for presentation via the audio capable channel to the customer.

In one embodiment the advertisements are cross-sells. The system determines whether it has advertisements in a category related to the category of interest to the customer, and if so, presents one or more of the advertisements selected from the related category. For instance, if the customer asks for airlines, advertisements for rental cars can be selected for presentation. In one embodiment, the system determines the context of the conversation (e.g., based on text generated via speech recognition) and selects one or more related context for the selection of advertisements.

In one embodiment, the system automatically sets limits to the cross-selling or switch-pitch that may occur. For instance, if the customer asks for directory assistance in the category of "hotels," the system is configured not to play advertisements for a set of hotels that are not in the economic level indicated by the customer. The system can determine an economic level according to the explicit input from the user, or derived based on an example provided by the customer.

In one embodiment, the system can automatically exclude certain advertising partners. For example, if one audio capable portal has a relationship with Hilton Hotels, they may want to exclude advertisements for "Sheraton Hotels" from being played in their context when querying for advertisements from a database (e.g., a database maintained by a partner but not by the audio-capable portal). One or more filters can be applied when selecting from the advertisements that are received from the database as a query result.

In one embodiment, the system uses one or more pre-determined rules to select the advertisements based on one or more parameters derived specific from the context. The parameters may be explicitly specified by the customer (e.g., via an IVR tree), or implicitly derived from the communications received from the customer. For example, when the customer asks for a specific hotel, the system can implicitly derive the economic level based on the mentioned hotel (e.g., using a look up table that pre-categorize the economic level of known hotels); and the economic level determined based on the hotel can be applied to the selection of rental car advertisements in cross selling, or the selection of hotel advertisements in pitch switching.

Figure 20:
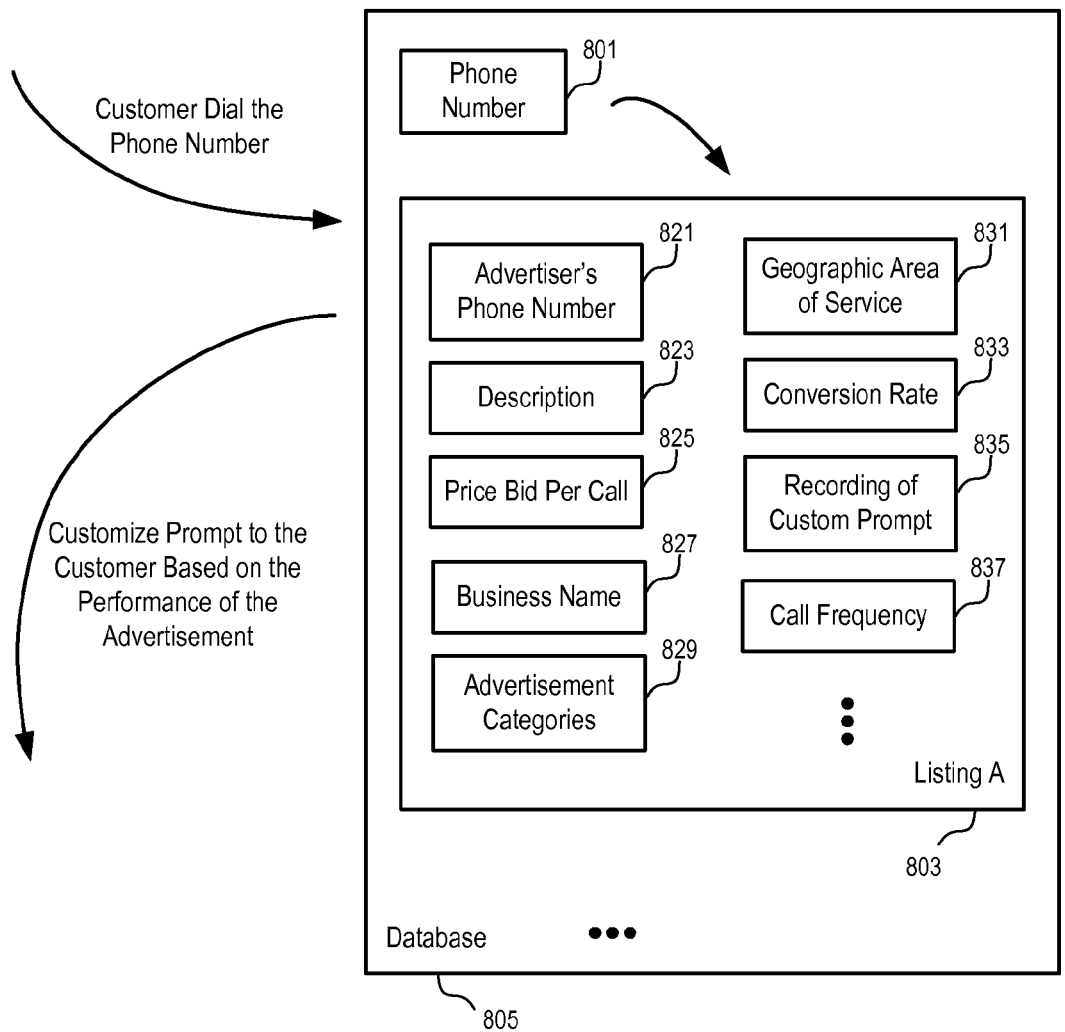
FIG. 20 illustrates a method to prompt a customer responding to an advertisement according to one embodiment.

FIG. 20 illustrates a method to prompt a customer responding to an advertisement according to one embodiment. In FIG. 20, a customer dials the phone number (801) that is associated with the advertisement listing (803) in the database (805). Before the customer is connected to the advertiser's phone number (821), the customer may be provided with a prompt for enhanced experience, based on the performance of the advertisement (e.g., conversion rate (833), call frequency (837)) and/or the price bid per call (825).

In one embodiment, the prompt is also played to reduce the number of misdirected calls, since a caller may misdial the phone number in calling the connection provider. The prompt may help the caller to confirm the connection to the desired advertiser.

In one embodiment, a prompt is also played when a phone number is potentially dirty in a sense that the phone number might be assigned to represent the contacts of different advertisers in a short period of time. The prompt can be used to obtain feedback from the customer to direct the call to the correct destination.

In one embodiment, when the performance of the advertisement, such as conversion rate (833), is above a threshold, a customized prompt can be provided to the customer for enhanced experience. The customized prompt may greet the customer with the business name (827), inform the customer the current status of connecting to the advertiser, provide the description (823) while the customer is waiting to be connected to the advertiser, etc. The customized prompt may optionally include the information about advertisement categories (829), geographic area of service (831), etc.

In one embodiment, whether to play a recording (835) of a custom prompt to the customer is based on the performance of the advertisement and/or the price bid of the advertisement. The custom prompt can be the recording of a human announcer, or the recording provided by the advertiser.

In one embodiment, the performance of the advertisement may be measured based on the number of phone calls and/or the revenue generated in a time period. An advertisement having a number of calls and/or revenue larger than a threshold can be provided with a customized prompt to enhance customer experience.

In one embodiment, whether to customize the prompt is at least partially based upon the price bid per call (827). For example, when the price bid per call (827) of the advertisement (803) is above a threshold value, the customers of the advertisement is provided with a customized prompt. The customization of the prompt can also be based upon the revenue potential for a specific party (e.g., the connection provider/tracker). In one embodiment, multiple levels of customization are provided based on the statistical data of customer calls that are in response to the advertisement and/or the price bid per call (825).

In one embodiment, the communication references used to facilitate the tracking of communication leads generated from advertisements are organized in a hierarchical structure, such that a portion of a communication reference can be used to identify at least one attribute of a set of advertisements.

For example, a root phone number can be used to represent a common attribute of a set of advertisements; and extensions to the root phone number can be used to uniquely identify the individual advertisements. When a phone call is received at the root phone number, the common attributes associated with the root phone number can be used to customize the prompt; and the customer is further prompted to dial the extensions.

In one embodiment, keywords are associated with advertisements to facilitate the identification of opportunities for presenting advertisements appropriate to the context and/or content of the media. The calls resulted from matching specific keywords can be tracked to determine the performance of advertisement under various conditions.

Figure 21:
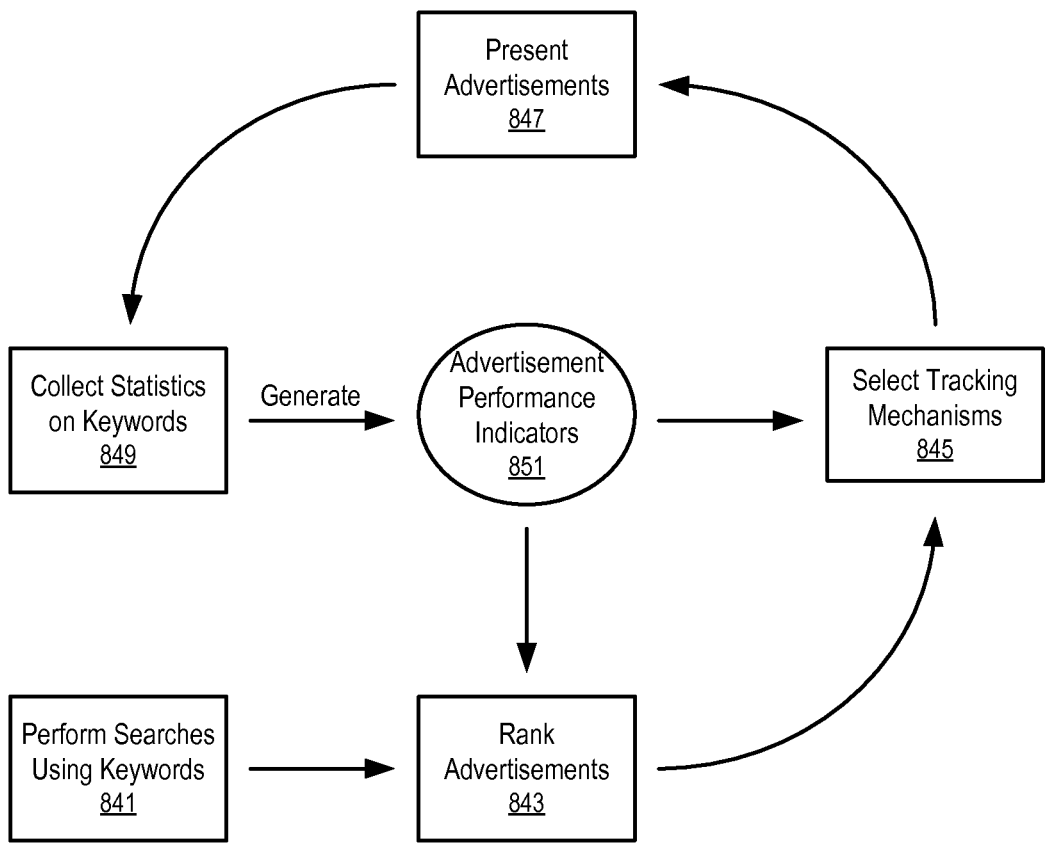
FIG. 21 shows a method to track calls for specific keywords according to one embodiment.

FIG. 21 shows a method to track calls for specific keywords according to one embodiment. In FIG. 21, searches of advertisements are performed (841) through matching a search term of a search request with keywords associated with advertisements. A keyword may include one or more words. When a keyword of an advertisement matches with a search term of a search request, the advertisement can be selected. A number of matching advertisements can be ranked (843) based on the advertisement performance indicators (851), such as the frequency of calls generated from the advertisement, the conversion rate of the advertisement, etc., and/or the bid price.

Once the advertisements are ranked, one or more top ranked advertisements can be selected for presentation, as a response to the search request. Communication references of selected tracking mechanisms are provided with the advertisements for presentation. The communication references can be used by the customers to call for connections for real time communication; and the use of the communication references enable the tracking of the calls. In one embodiment, the advertisement performance indicators (851) are used to select (845) tracking mechanisms for the advertisements presented under various different conditions.

For example, when the expected yield is high, a more user friendly method, such as a toll-free phone number or local phone number without an extension can be used, although such a method may be more expensive than other methods. For example, when a call frequency of an advertisement is higher than a threshold (or the volume of calls from the advertisement is larger than a threshold), a more user friendly method, such as a toll-free phone number or local phone number without an extension, can be used to promote the conversion.

The use of different tracking methods may affect the conversion of the advertisement. For example, a user friendly method, such as a toll-free phone number or local phone number without an extension, may improve the conversion rate for the advertisement under otherwise similar conditions.

The effect of the differences in tracking methods can be determined from statistic data. For example, the ratio between the conversion rates of the same advertisement presented in response to the same matching keyword can be determined for two tracking methods to determine the influence of the tracking methods on the conversion rate; and the ratio between the conversion rates of a set of advertisements presented in response to the same matching keyword can be determined for two tracking methods to show the average influence of the tracking methods on the conversion rate of advertisements. In one embodiment, some advertisements can be presented with more than one tracking references. For example, a local phone number with an extension and a click to call button can be presented together in an advertisement; and the tracking statistics can be used to determine the user preference for the use of communication methods associated with the tracking methods. Such as a local number with extension and a click to call button side by side and seeing which one gets chosen more In one embodiment, the cost for using different tracking mechanisms can also be tracked and/or estimated. Thus, based on the expected yield from the presentation of an advertisement, the estimated cost for tracking and the impact on conversion rate by the different tracking mechanisms, one tracking mechanism can be selected to optimize the performance system (e.g., in terms of profitability and user friendliness).

In FIG. 21, the advertisements are presented (847) with the references of the selected tracking mechanisms. The references are assigned to identify the advertisements and a set of parameters, including the keyword that is responsible for the selection of advertisement for presentation (or the search term). In one embodiment, the references can be used in a database to look up the associated parameters; alternatively or in combination, the parameters may be encoded/encrypted in the references, which can be decoded/decrypted without looking up in a database. When the references are used to call for connections for real time communications, the references can be used to determine the associated set of parameters; and thus statistics on the keywords can be collected (849) to determine the advertisement performance indicators (851).

In one embodiment, the billable bid amount is determined at the time the communication reference is provided for presentation with the advertisement; and the billable bid amount can be one of the parameters being tracked. Alternatively or in combination, the billable bid amount is determined at the time the call for a connection for real time communications is received.

In one embodiment, the set of tracked parameters also include the position of the advertisement in the ranked list of advertisements, the media channel that is responsible for delivering the advertisement, the partner who supplies the advertisement listing, the time of the search, and/or one or more identifiers of the search requester, etc.

In one embodiment, the circumstances in which an advertisement is presented can be classified into a plurality of conditions, based on the tracked parameters. A combination of values of the parameters can be used to define one condition, which characterizes a type of circumstances in which the advertisement is presented. Communication references are assigned to track the presentation of an advertisement and calls generated from the presentation under different conditions. Using the statistic data collected via the tracking of the different conditions, the performance and user experience can be optimized for the presentation of the advertisement under various different conditions.

In one embodiment, the connection provider can presented an advertiser with a list of currently pending connection requests to enable the advertiser to manage the queue of requests for real time communications.

FIG. 22 shows a user interface to collect comments on a request for a communication connection according to one embodiment. In one embodiment, when a request for a connection is submitted via a data connection (e.g., via a click on a link or an icon such as a call button that is assigned to the callee), the user interface as illustrated in FIG. 22 is displayed as a web page, an applet, or as a standalone application.

In FIG. 22, the user interface allows the caller to specify a time window (861) during which the caller is available to received a call back from the system to establish the requested phone connection with the caller. The caller can specify a call back phone number (863). Alternatively or in combination, the system may also allow the caller to specify a VoIP telephone reference (e.g., a Session Initiation Protocol (SIP) address, a user name of a VoIP telephonic service, a user name of an instant messaging network, etc.) to allow the system call back to the caller via VoIP.

In FIG. 22, the user interface allows the caller to optionally specify a comment (865) for the request. The comment can be displayed to the callee to assist the callee in managing the queue. The caller may also use the comment to get the attention of the callee, to set up the context of the call, etc.

In one embodiment, a telephone reference (e.g., a VoIP telephone reference, or a regular telephone number with or without extension) that is assigned to the callee is used by the caller to request the system to make a telephone connection with the callee. The system determines the callee based on the telephone reference that is used to reach the system to make the request. While the caller is connected to the system via a telephone link, an IVR system can prompt the caller to specify the call back time window and/or the call back reference. The caller may provide the call back information and the comments for the call via the IVR system.

Alternatively or in combination, the system may also determine whether a connection to the caller can be made for visual communications, in additional to the audio communication link established via the telephone reference assigned to the callee. For example, when the caller is using a communication device that also supports visual communication, such as a mobile phone or a computer, the system may present a visual interface to collect the call back information (e.g., via a short text message, a web page, an instant message, etc.) When the caller is a registered member, the system may determine that the caller is logged in on a separate communication device (e.g., a personal comber) and attempt to utilize both the web link and the telephone link to communicate with the caller (e.g., to provide additional advertisement information, to collect comments and call back information, to collection both text and audio versions of comments, etc.)

FIG. 23 shows a user interface to manage a queue of requesters of phone connections to a callee according to one embodiment. In FIG. 23, a visual presentation of the queue is provided to allow the callee to sort the list of requesters.

In one embodiment, the system identifies the callers and then presents the callers using their member names (user ID for the system) without revealing their real names for the privacy of the callers. A caller may provide a public profile to the system. The information specified in the public profile of the caller can be presented by the system to other members of the system. Thus, the caller can selectively provide information in the public profile for a desired level of privacy.

Alternatively, the system may present the callers using identifiers that are generated specifically for the callee, to avoid revealing the member names of the callers for enhanced privacy protection. For example, a caller for the callee may be identified as "caller12," while "caller12" for another callee may or may not be a reference to this caller and is generally not a reference to the same caller.

In one embodiment, the system also provides a tool to the callee to manage callee information. For example, in FIG. 23, when an identifier (e.g., 871) is selected by the caller, a further user interface (not shown) can be displayed to manage information about the caller as identified by the identifier. The callee may specify a name for the caller. For example, during the conversation with the caller, if the caller provides the name of the caller to the callee, the callee can record the name so that the caller can be subsequently identified using the name entered into the system by the callee. The callee may record a comment about the callee for subsequent viewing. The callee may provide a rank to the caller, load past transactions with the caller, and/or specify a status of the caller.

In one embodiment, the system identifies a first time caller to the callee as "new" (875). The caller may designated some callers as "VIP", some callers as "Preferred", some callers as "Blocked". The caller may sort the callers according to their status.

In one embodiment, the system uses a social network to identify the callers. For example, callers can be identified by whether they're a "friend" or a "friend of a friend" in a social network. For instance, a caller, Bob, might be identified as "2 degrees" away from a callee while Michael is "1 degree" away. Michael is a direct friend, whom the callee have certified as someone the callee knows, while Bob is a friend of a friend. For example, Bob might be a certified friend of Michael's. While the callee don't know Bob directly, Bob is in the extended network of the callee; and therefore the callee might want to talk to him. Cindy, on the other hand, might be "5 degrees" away. The callee might have little interest in communicating with someone so far outside the social network of the callee. In one embodiment, the system allows callees to individually certify friends, such that collectively the system maintains a social network, having data to identify friends of a friend, etc. Based on the social network, the system can compute the degrees of social separation between callers and the callee to allow the management of the caller queue using the degrees of social separation.

In one embodiment, the system also allows the callers to place bids to get priority in the queue. For example, when the caller requests the connection to the callee, the caller can also specify a bid amount for priority consideration. Thus, the order of callers in the queue can be at least partially determined by the amount that each caller is willing to pay for the priority. For instance, a first caller, Aaron, is in line. Then, a second caller, Billy, indicates he will pay a lump sum of an additional 10 cents to be in front of him. Billy is now first in line, and Aaron is second. Carol, a third caller, indicates she will pay 40 cents, and now she is first. Aaron decides to pay 20 cents and now he is in second place and Billy is in third. Thus, the queue can be dynamic changed according to a live auction for place in line. In one embodiment, the system can display a representation of the current queue to the callers to facilitate the auction of the priorities in the queue. For example, the system may inform a caller the current position of the caller and a list of current bids in the queue and allow the caller to modify his/her bid. The system may further provide estimated waiting times for the current queue to help the caller decide the bid. In one embodiment, the callee may sort the queue based on the bids for priority and other considerations, such as the comments/introductions submitted with the requests, the callee's personal relation with the callers, prior transactions, etc. For instance, a callee (advisor) could see the payments that each caller is willing to make for an earlier position in line, but the callee (advisor) may still decide to take the call from his best friend Michael first, or move his highest-spending caller Cynthia to the top position. In one embodiment, the system presents the information to facilitate the decision making by the callee in sorting the queue.

In one embodiment, the system allows a caller to specify an upper limit of the amount for the bid and automatically calculate the bid for the caller to improve the priority of the caller. For example, the system can determine the least amount of bid that can beat as many of the bids of other callers as possible without exceeding the upper limit.

In one embodiment, the bid for priority is charged as a lump sum once the connection between the caller and the callee is established. Alternatively or in combination, the bids can be in the form of additional price per minute for the communication time with the callee, if the callee delivers service to the caller over the communication connection. For example, the callee may specify that the communication time with the callee is at least at a given price (e.g., $1.5 per minute). A caller may bid above the price (e.g., additional $0.2 per minute) to seek for priority. In one embodiment, the callee may specify the allowable bid formats (e.g., as a lump sum for priority or as additional fees per minute for priority in the queue). When different forms of bids are allowed, the system can further compute an estimated effective bid (e.g., based on an estimated communication time) to assist the callee.

In one embodiment, a plurality of callers are in a group call with a callee (e.g., in a teleconference). The callers have listening-only privileges. The callers may request the privilege to be connected for speaking privileges also. A limited number of callers (e.g., one or two or more) may be granted the speaking privileges. A queue requesting the speaking privileges can be maintained.

For example, in a group call, there are a number of callers on the line all listening to a lecture given by the advisor. The callers may be paying a rate to be on the call, or not. In this case, the queuing criteria determine which of the callees get to have speaking privileges in addition to the listening privileges. For the speaking privileges, the callers may be identified and sorted according to various ways discussed, such as based on a best-customer criterion, a best-friend customer criterion, a highest-paying customer criterion, etc.

In another example, while a TV or radio show is in progress (e.g., in real world or in virtual reality), fans may listen and/or watch the show and want to be able to ask a live question and contribute to the show. The fans can request the connection (e.g., for the speaking privilege) via one embodiment of the system. The connection may be provided via a microphone, a telephone, or a videophone. The queue of requests may be sorted according to one or more criteria, such as the introduction/comment presented for the corresponding request, the bids for priority, the geographic location of the requesters, past experiences with the requesters, etc. Such a system can allow mass audience participation.

Alternatively or in combination, the caller may sort the queue manually via the interface as show in FIG. 23. For example, the caller may select the icon (885) to increase the priority of the caller (871), select the icon (887) to decrease the priority of the caller (871), select the icon (881) to assign top priority to the caller (871), select the icon (883) to assign bottom priority to the caller (871) (e.g., move the caller to the bottom position in the list of non-blocked callers).

In one embodiment, the user can selectively show or hide the callers with the blocked status. For example, in FIG. 23 the blocked callers are listed; and the link (889) can be selected to request a list that does not show the blocked callers, together with a link that can be used to request a list that shows the blocked callers.

In FIG. 23, the remaining call back windows as requested by the callers are also displayed, together with the amount of past purchases (e.g., 877) from the respective callers, comments (e.g., 879) from the callers for the respective requests, etc. The remaining call back window indicates the time period between the time the list is generated and the time when the requested call back window expires. The information specific to the callers and/or the requests are provided to assist the callee in managing the caller queue. More or less information can be displayed with the queue in different embodiments. In one embodiment, the items to be displayed with the queue is configurable by the caller (e.g., via a preference page).

The interface as illustrated in FIG. 23 can be used by the callee to manage the caller queue via a web connection or other types of data communication connection, using a web browser or a custom application.

In one embodiment, the callee can also manage a caller queue via an IVR system over a telephone connection. For example, when the callee is connected to the system via a telephone connection, the callee is presented with the caller queue. The callee can selectively reorder the queue, or select one from the queue for connection to the selected caller. In one embodiment, the system priorities the queue according to a set of rules specified by the callee and presents a number of top ranking callers for selection by the caller.

Figure 24:
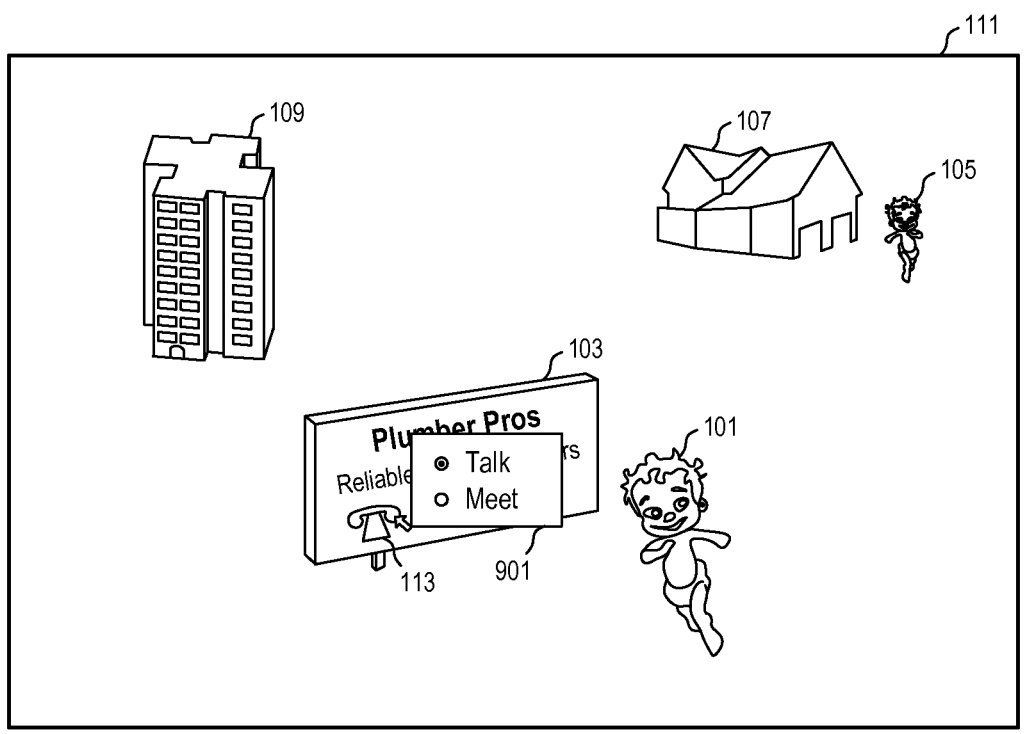
FIG. 24 illustrates a method to initiate a communication connection according to one embodiment.

FIG. 24 illustrates a method to initiate a communication connection according to one embodiment. In FIG. 24, the virtual bulletin board (103) includes an object/icon (113)

which is selectable via a cursor. When the object (113) is selected, an interface (901) is displayed to provide options for connecting the avatar (101) to the advertiser.

In one embodiment, the avatar (101) may be connected to the advertiser in a number of ways. For example, the avatar (101) (user) can talk to the advertiser over a voice connection and/or a text connection. The avatar (101) can be connected to the advertiser for real time communications without being teleported to a different location in the virtual world. The avatar (101) can be connected to the advertiser for voice, text and/or video chat while staying at the current area of the virtual world. The voice, text and/or video chat can be supported via an instant messaging system, a landline telephone network, a mobile phone network, and/or Internet.

For example, a text chat connection between the avatar (101) and the connection provider may be bridged to a telephone connection to the advertiser on a landline telephone. The connection provider converts the text input from the avatar (101) into voice via a text-to-speech unit and relay the voice information to the advertiser and converts the voice input from the advertiser (101) into text via a speech recognition unit and relay the text information to the avatar (101). Thus, the avatar (101) communicates in text; and the advertiser communicates in voice; and the connection provider performs the conversion and bridges the connections.

Further, the avatar and the advertiser may communicate using different languages; and the connection provider provides the translation service via an automated system or a human translator.

In one embodiment, the connection between the avatar (101) and the connection provider supports both text and voice; and the connection between the connection provider and the advertiser supports voice but not text. The text input from the avatar (101) is converted into voice by the connection provider for the advertiser; and the voice input form the advertiser can be transmitted to the avatar (101) directly. The connection provider may also optionally convert the voice input from the advertiser into text for the avatar (101).

In one embodiment, the voice output provided to the avatar (101) is generated from the text converted from the voice input received from the advertiser; and thus, the true voice of the advertiser can be shielded from the avatar (101). Further, in one embodiment, the voice output is generated from the text at the user terminal (e.g., a personal computer) that presents the virtual reality environment to reduce the amount of data to be transmitted and/or the requirement for communication bandwidth.

Similarly, when the connections are bridged by the connection provider, the avatar (101) may communicate in voice while the advertiser in text and/or voice. The connection provider can be used to bridge the differences in language, format, and/or media type, in a way that allows the avatar/user to communicate with the advertiser in real time.

In another embodiment, the connection provider bridges the connections to track the connections made via the connection provider, without performing conversions in language, format, and/or media type.

In one embodiment, the avatar (101) can be teleported to a location in the virtual world to meet the advertiser for a meeting in the virtual world. For example, the avatar (101) can be teleported to a location predefined by the advertiser (e.g., defined before the presentation of the advertisement). In another example, the avatar (101) is teleported to a location dynamically determined by the system, such as the vicinity of the current location of an avatar that represents the advertiser, a location in the virtual world specified by the advertiser at the time after the avatar (101) makes a request for a meeting in the virtual world, etc. Alternatively, the advertiser avatar can be teleported to the vicinity of the avatar (101), or a location in the virtual world specified by the avatar (101).

In one embodiment, the avatar (101) and/or the advertiser avatar is teleported to a location in the virtual world for a meeting, while a connection for real time communications in text and/or voice is already established, or in the process of being established. After the avatars are a same location in the virtual world, the avatars are ready to communicate with each other through text, voice, gestures and/or through manipulation of the virtual objects presented in the vicinity of the meeting location.

In one embodiment, an animated display of an avatar is used to show a gesture. A user can provide an input (e.g., via a keyword shortcut, a menu system, etc.) to the virtual reality system to cause the virtual reality system to play a pre-defined animation of the avatar to show the gesture. Alternatively, the movement of the hand, arm, and/or leg of a user can be tracked to generate input; and the movement can be mapped to the corresponding movement of 3D geometry model of the avatar, or be used to recognize predefined gestures.

In one embodiment, the avatar (101) can be teleported to a location specified by the advertiser without being connected to advertiser for voice and/or text communications. After the avatar (101) is teleported to the location specified by the advertiser, the avatar (101) may then optionally initiate a conversation with the advertiser via the virtual reality system, if the advertiser is also online in the virtual reality system and has an avatar representation in the virtual world near the location to which the avatar (101) is teleported. Alternatively, the advertiser avatar may initiate a conversation once the avatar (101) is teleported into the view of the advertiser avatar.

Alternatively, near the location to which the avatar (101) is teleported, the advertiser may arrange opportunities for the avatar (101) to request a communication connection with the advertiser. For example, the virtual telephones or robots can be arranged at or near the destination of teleporting to invite the avatar (101) to call the advertiser (e.g., for voice conversation or for text chat).

In one embodiment, the advertiser is charged for the advertisement when the avatar (101) is teleported to the location via the advertisement. In one embodiment, the advertiser is not charged for the advertisement if the avatar (101) is not teleported via the advertisement. In one embodiment, the advertiser pays an advertisement fee for each new customer teleported via the advertisement to the location(s) selected by the advertiser.

In one embodiment, the advertiser is charged an advertisement fee (e.g., for the advertisement) after the avatar (101) is teleported as a result of a communication connection provided via the advertisement. In one embodiment, the advertiser is not charged if the avatar (101) is not teleported via the connection provider (or the advertisement).

In one embodiment, the advertiser is charged an advertisement fee (e.g., for the advertisement) after the avatar (101) is connected to the advertiser for real time communications (e.g., via voice or text). In one embodiment, the advertiser is not charged for the advertisement if the avatar (101) is not connected to the advertiser for real time communications.

In one embodiment, the advertisement fee is based on a bid price specified by the advertiser. The bid price may be an actual bid, or a maximum bid which is to be reduced to an actual bid based on the bid price of competitors of the advertiser.

In one embodiment, the advertisement presented in the virtual reality environment (or via other media channels, such as a search result of a keyword search, a web page, a blog, etc.) indicates the availability of the advertiser to connect with the user for real time communications at the time the advertisement is presented. For example, when the advertiser is available for a connection for real time communications in voice and/or text, the object (113) may be animated to simulate a ringing telephone. For example, an icon or button may be displayed to show the label "call now" (or, "connect now", "meet now", etc.)

In one embodiment, if the avatar (101) picks up the ringing telephone in the virtual world, the avatar (101) is connected to the connection provider, which further connects the call to the advertiser who may or may not have an avatar representation in the virtual world.

Figure 25:
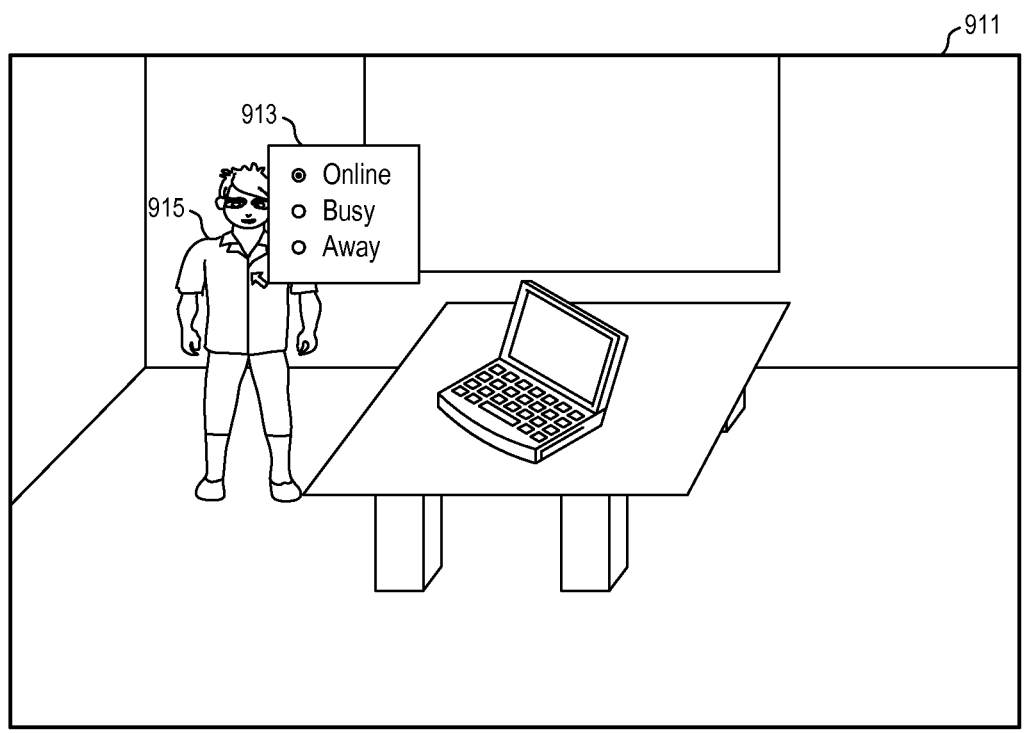
FIG. 25 illustrates a method to use online status of an avatar to manage communication connections to an advertiser according to one embodiment.

FIG. 25 illustrates a method to use online status of an avatar to manage communication connections to an advertiser according to one embodiment. In FIG. 25, the advertiser avatar (915) can select one online presence status from a plurality of options, such online, busy, away, etc. For example, the advertiser may use a cursor to select the avatar (915) to cause the display of the interface (913) which allows the advertiser to select online status for the advertiser avatar (915).

In one embodiment, the availability of the advertiser is determined based at least in part on the online status of the advertiser avatar (915). For example, the system may determine that the advertiser is not available for real time communication if the advertise avatar has a status of "Busy" or "Away".

In one embodiment, the availability of the advertiser is determined based at least in part on the location of the advertiser avatar (915) in the virtual world. For example, the system may determine that the advertiser is not available for real time communication connect if the advertise avatar (915) is outside an area of the virtual world (e.g., outside the virtual office of the advertise avatar (915)). For example, the system may determine that the advertiser is available for real time communication connect if the advertise avatar (915) is inside a specific area of the virtual world, as specified by the advertiser for the advertisement.

In one embodiment, the advertise avatar (915) is teleported into a region in the virtual world (or out of an area of the virtual world) to indicate that the advertise avatar (915) is ready for communicating with a customer (which may or may not have an avatar representation in the virtual world). For example, the advertise avatar (915) is teleported into an area of the virtual world, when the advertise avatar (915) is busy communicating with a customer (or busy with other tasks).

In one embodiment, the availability of the advertiser is determined based at least in part on the schedule of the advertiser. The advertiser can specify a working schedule for accepting real time communication connections, as illustrated in FIG. 4. For example, when the current time of the day falls outside the working schedule of the advertiser, the system may determine that the advertiser is not available for real time communication connects. In one embodiment, the schedule indicates that the advertiser will not accept requests for real time communication connections outside the scheduled time periods. Thus, even if the advertiser avatar might be available for a text chat directly through the instant messaging system of the virtual reality system, the advertiser is not callable via the connection provider.

In one embodiment, the availability of the advertiser is determined based on a number of considerations, such as the online status of the advertiser, the location of the advertise avatar (915) in the virtual world, the schedule of the advertiser, etc. For example, the system may determine that the advertiser is not available for real time communication connections if any of the considerations indicates that the advertiser is not available.

In one embodiment, the system collects statistic data to compute the likelihood of the advertiser being able to communicate with the user in real time based on a number of considerations, such as the online status of the advertiser, the location of the advertise avatar (915) in the virtual world, the time of the day relative to the working schedule of the advertiser. When the likelihood is above a threshold, the system indicates that the advertiser is available to communicate with the user in real time; otherwise, the system may indicate that the advertiser is not available to communicate with the user in real time.

In one embodiment, the availabilities of the advertiser for communicating with a user in real time via a number of different media types are individually determined. For example, when the advertiser avatar (915) is active in the virtual world during the scheduled hours, the advertiser may be considered available for communication via meeting in a location in the virtual world and/or via chatting in text, voice and/or video. When the advertiser avatar (915) is offline in the virtual world during the scheduled hours, the advertiser may be considered available for communication via a telephone connection. When the advertiser is online but not in the virtual world, the advertiser may be considered as being available for teleporting into a meeting location in the virtual world.

In one embodiment, the advertiser can explicitly specify the communication channel to be used for real time communications under various combinations of availability status indicators, such as the online status of the advertiser, the location of the advertise avatar (915) relative to one or more predefined regions in the virtual world, the time of the day relative to the working schedule of the advertiser, etc.

In one embodiment, one advertiser may have a number of avatars that can be used to interact with customers. For example, one advertiser may have a number of human representatives who can communicate with customers. A number of avatars can be statically or dynamically assigned to the correspond human representatives. One advertiser avatar may be permanently assigned to a human representative, or be dynamically assigned to a human representative at a time when a communication connection is requested by a customer. A human representative may operator more than one avatar. The availability of the advertiser is thus determined based on the online statuses of the set of advertiser avatars associated with the advertiser, the locations of the set of advertiser avatars in the virtual world, etc. When any of the advertiser avatar indicates that the advertiser is available for a real time communication connection, the advertisement can be provided with an indication that the advertiser is available for real time communications.

In one embodiment, one advertiser avatar may communicate with one or more customers and/or meet with one or more customers. For example, an advertiser may specify that one advertiser avatar is configured to have a private meeting with a particular customer avatar. In such a private meeting, other customer avatars are excluded from interacting with the customer avatar during the time period of the meeting with this particular customer avatar. For example, when a meeting is requested by the customer, the customer avatar and the advertiser avatar are teleported into a private meeting location, which prevents other customer avatars from entering the private meeting. The advertiser avatar may indicate the availability by entering the private meeting location and set the online status to "online" (or being outside the meeting location) and indicate the non-availability by set the online status to "busy" while in the private meeting location.

In another example, an advertiser may specify that one advertiser avatar is configured to have non-private meeting with a number of customer avatars. For example, up to a predefined number of customer avatars may attend a non-private meeting with the advertiser avatar. In the non-private meeting, the communication from the advertiser avatar is broadcast to the customer avatars in the meeting; and the communication from one customer avatar is sent to the advertiser avatar and the other customer avatars in the meeting. Alternatively, the text, voice and/or video communication from one customer avatar is sent to the advertiser avatar but not to the other customer avatars.

In one embodiment, the customer avatars in the non-private meeting generally have the privilege to receive/download communications from the meeting but not the privilege to transmit/upload communications into meeting. The privilege to transmit is selectively granted by the advertiser avatar or via an auction process. In one embodiment, the queue of the customer avatars who requested for the privilege to transmit/speak is prioritized based on their bid prices for the privilege and/or bid prices for getting a better position in the queue. For example, a customer may offer a bid price of $10.00 per minute for the privilege to speak in the meeting and a separate bid price of $2.00 for a prioritized position in the queue; the bid price for the prioritized position is charged in response to the customer being awarded the privilege to speak in the meeting; and the duration of the speech by the customer is charged separately according to the per minute price for the privilege to speak.

In one embodiment, the advertisement indicates whether a meeting available in the virtual world is a private meeting. In one embodiment, a customer may specifically request for a private meeting in the virtual world, or a non-private meeting.

In one embodiment, the connection provider is in control of the virtual reality environment and thus has access to the online statuses of the avatars, the locations of the avatars, etc. For example, the connection provider may host the geometric data of the virtual reality world, the online statuses information of the avatars, etc. When an avatar enters into a specific location of the virtual reality world, the location of the avatar is sent from the user terminal to the connection provider to retrieve virtual objects that are visible from the point of view of the avatar (or a virtual camera associated with the avatar). The user terminal (e.g., a personal computer, a personal digital assistant, a mobile computer, a workstation, etc.) then renders the virtual objects for display. Alternatively, the connection provider may render a display of the virtual world from the point of view of the avatar (or a virtual camera associated with the avatar) for the user terminal and transmit the display as a video image to the user terminal. For example, the user terminal may be an interactive television set which displays the virtual environment via an video stream transmitted via a satellite television system, a cable television system, an over-the-air television broadcast system, or an Internet connection.

In one embodiment, the connection provider cooperates with an operator of the virtual reality environment to obtain access to the information such as the online status of an avatar, the location of the avatar, etc. The operator of the virtual reality environment provides the connection provider a special privilege, or an application program interface, to allow the connection provider to access the status and location information of various avatars, as if the connection provider were part of the operator of the virtual reality environment. Without the special privilege, a typical user of the virtual reality has only restricted access to such information. For example, a typical user can obtain the statuses of his/her friends who have explicitly permitted the virtual reality environment to release the status and/or location information to the user but not the statuses of other avatars.

In one embodiment, the connection provider may access such information about an advertiser avatar via an application programming interface provided by the operator, such as a web based service. After the connection provider is authenticated, the connection provider can use the application programming interface to query the status and/or location of an advertiser avatar (or a customer avatar).

Alternatively, the connection provider may obtain the status and/or location information of an avatar from the operator of the virtual reality environment after the avatar permits the disclosure of such information to the connection provider. For example, the connection provider may have an entity (e.g., avatar representation) in the virtual world; and the advertiser may specify that the connection provider is a friend of the advertiser avatar and is entitled to obtain the information such as the online status and location of the advertiser avatar.

In one embodiment, the connection provider offers a virtual object to the advertiser to facilitate the collection of information such as online status, location, etc. When the virtual object is accepted by the advertiser avatar, the virtual object is attached to the advertiser avatar. The virtual object is configured to report its location to the connection provider. Since the virtual object is attached to the advertiser avatar, the location of the virtual object in the world can be considered the location of the advertiser avatar.

For example, the virtual object may have a virtual representation resembles a mobile phone. The virtual object may obtain the online status information from the advertiser avatar. Alternatively, the virtual object may have its own status indicator. For example, the advertiser avatar may switch the virtual mobile phone to off, on, busy, etc.

In one embodiment, the virtual object is also configured to report whether the virtual object is currently attached to an avatar. Thus, the virtual object can be attached to an avatar to allow the connection provider to obtain the status and/or location of the avatar in the virtual reality world, and be detached from the avatar for privacy when needed.

In one embodiment, the availability of the advertiser for real time communication with a customer is determined based at least in part on whether the virtual object is attached to the advertiser avatar. For example, when the virtual mobile phone is not attached to the advertiser avatar, the advertiser avatar may be considered not available for a call for real time communications via the virtual reality environment.

In one embodiment, a connection provider has a number of avatars. The connection provider may provide the avatars to advertisers and/or customers to facilitate communications between the advertisers and the customers.

For example, the connection provider may log an advertiser avatar into the virtual reality system. After an advertiser is authenticated with the connection provider, the connection provider may teleport the advertiser avatar into a location in the virtual world that has a virtual environment for the advertiser. The connection provider redirects the visual feedback for the advertiser avatar to the advertiser and redirects the input received from the advertiser to the virtual reality system. Thus, the connection provider servers as a gateway between the virtual reality system and the advertiser. Since the connection provider owns the advertiser avatar, the connection provider can obtain the location and status information of the advertiser avatar. Similarly, the connection provider can provide access to a separate avatar to a customer.

In one embodiment, the connection provider dynamically "rents" an avatar to an advertiser/customer for accessing the virtual world. Thus, the connection provider offers anonymous access to an advertiser by a customer and anonymous access to customers by an advertiser. For example, an advertiser may obtain access to an anonymous advertiser avatar from the connection provider when the advertiser is available for meeting in the virtual world; and a customer may obtain access to an anonymous customer avatar from the connection provider when the customer requests for a virtual meeting with an advertiser in the virtual world.

In one embodiment, the connection provider redirects the visual feedback for the customer avatar to the customer while allowing the advertiser to at least partially control the movement of the customer avatar in the virtual world. Thus, the advertiser may operate the customer avatar to provide an improved demonstration to the customer via the visual feedback to the customer avatar.

For example, when a customer is not familiar with the virtual reality environment, the customer may not be able to control the customer effectively to obtain a good view of the virtual environment. The customer may simply want to view the virtual environment as being presented by the advertiser. Thus, the advertiser may control the customer avatar to provide an improved result of the virtual meeting, in which the customer is released from the burden of controlling the customer avatar.

Similarly, the connection provider may provide the customer with partial or complete control of the advertiser avatar in some cases. Thus, the customer and advertiser may cooperate to achieve an improved virtual meeting experience.

In one embodiment, the connection provider may alter the visual feedback from the virtual reality environment for the customer and the advertiser. For example, the connection provider may add virtual objects to the scene presented to the customer and/or advertiser and remove virtual objects to the scene presented to the customer and/or advertiser.

For example, when multiple customer avatars are teleported to meet an advertiser avatar, the connection provider may filters out other customer avatars from the scene presented to a customer avatar. In response to the request from the advertiser, the connection provider may selectively hide the customer avatars waiting for a communication session with the advertiser, or hide the customer avatars who are currently in communication with the advertiser, from the scene presented to the advertiser.

For example, when the virtual reality environment is based on video image capturing a portion of the reality, the connection provider may provide differently augmented environment to the advertiser and to the customer. For example, a virtual environment can be provided based on the real time video images of a representative demonstrating a product. The scene presented to the representative may include the video image of the representative and the product overlaid on the virtual environment, including one or more customer avatar, while the scene presented to a customer may not include the real time image of the representative.

In one embodiment, a representative may present a virtual product in a real world setting in the office of the advertiser. A view of the reality can be augmented with a virtual product displayed to the representative via a semi-transparent LCD display. The representative can control an input device (e.g., a data grove or a cursor controlling device) to manipulate the virtual product. Further, the video image of the customer, or an avatar representation of the customer can be displayed on the LCD display based on the viewing angle of the reprehensive and the imaginary position of the customer relative to the reprehensive. Thus, to the representative the customer or the customer avatar and the product appear to be virtually in the office of the advertiser.

The video images of representative in the real office can be provided to the customer as part of the virtual environment. The video images may be interpolated to generate a view according to the imaginary position of the customer or customer avatar relative to the real office. The video images can be augmented with the virtual product, which is displayed according to the manipulation of the representative. This arrangement allows the representative to present a variety of products in real world settings with the capability to easily modify the virtual products, customize the products for the customer, switch products being presented, etc.

Figure 26:
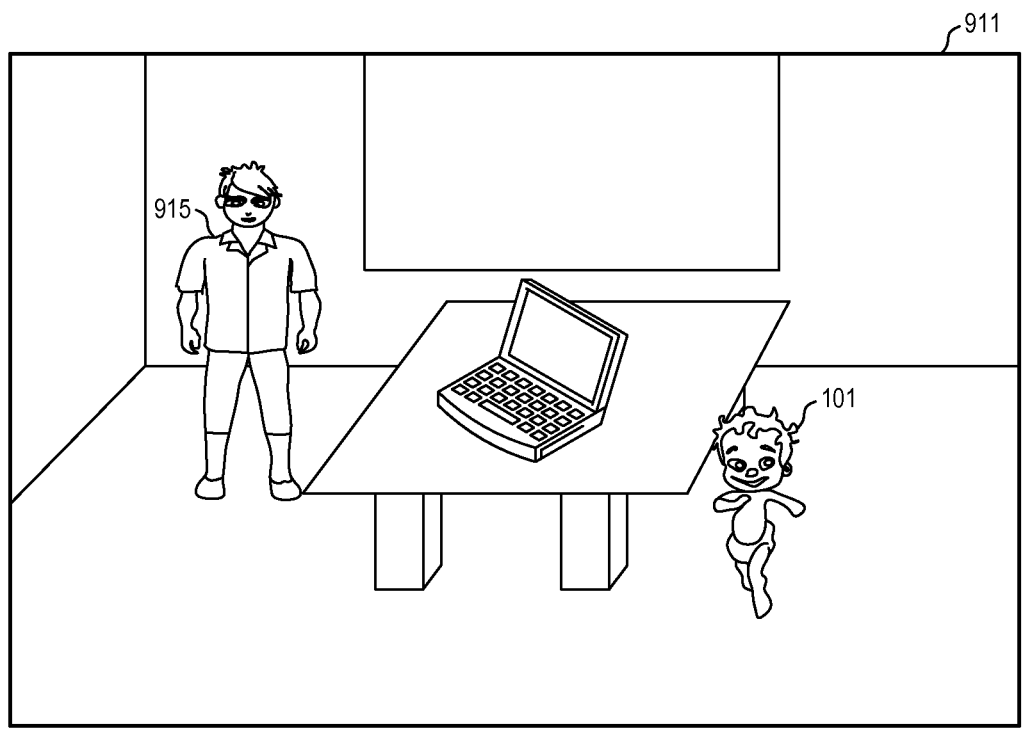
FIGS. 26-27 illustrate examples of making connections for real time communications according to some embodiments.
Figure 27:
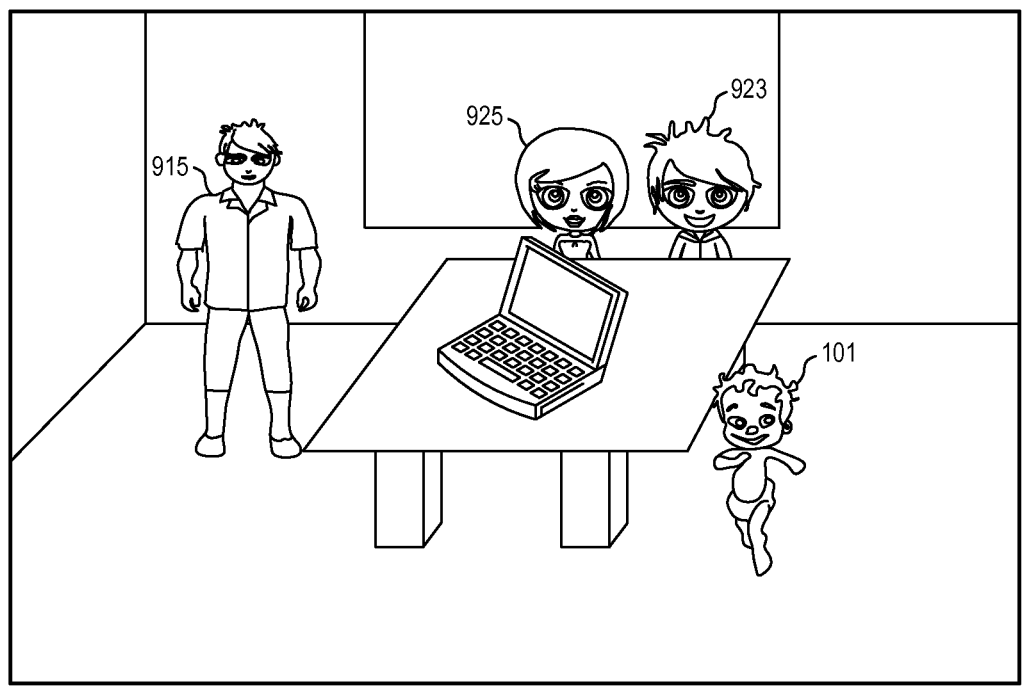

FIGS. 26-27 illustrate examples of making connections for real time communications according to some embodiments.

In FIG. 26, the customer avatar (101) is teleported into the vicinity of the current location of the advertiser avatar (915) for real time communications.

In one embodiment, teleporting the customer avatar (101) to the vicinity of the advertiser avatar (915) provides the advertiser the opportunity to initiate a communication session. For example, since the customer avatar (101) is within the viewable region of the advertiser avatar (915), the advertiser may select the customer avatar (101) to request an instant messaging session, which may support text, voice and/or video chat. Similarly, since the advertiser avatar (915) is in the view of the customer avatar (101), the customer may select the advertiser avatar (915) to initiate a session for real time communications.

In one embodiment, the advertiser is charged an advertisement fee for the opportunity provided by teleporting the customer avatar (101) to the vicinity of the advertiser avatar (915). The advertisement fee may be a flat fee for each such opportunity provided by the connection provider, or a bid price offered by the advertiser, or determined based on a maximum bid offered by the advertiser and a bid price of a competitor of the advertiser.

In some embodiments, repeated teleporting of the same customer within a predetermined time period (e.g., an hour, a day, a week) may be considered as the same opportunity (e.g., the same lead to the customer).

In one embodiment, offers for multiple opportunities are bundled with a subscription for a time period and/or with access to the virtual reality environment.

In one embodiment, the customer avatar (101) is teleported to the vicinity of the current location of the advertiser avatar (915) after a real time communication connection, such as a telephone connection or an instant messaging connection, is established between the customer and the advertiser. For example, the customer may used communication session to determine whether or not to be teleported to the advertiser.

FIG. 27 illustrates an embodiment in which multiple customer avatars (e.g., 101, 925 and 923) can be teleported to the vicinity of the advertiser avatar (915). For example, the customer avatars (e.g., 101, 925 and 923) may be in the same area of the virtual world but choose to have private communications with the advertiser avatar (915). For example, each of the customer avatars (e.g., 101, 925 and 923) may separately initiate an instant messaging session with the advertiser avatar (915) by selecting the advertiser avatar (915) in the view. Alternatively, the advertiser avatar (915) may initiate separate instant messaging session with the advertiser avatar (915) by selecting the customer avatars (e.g., 101, 925 and 923).

Figure 38:
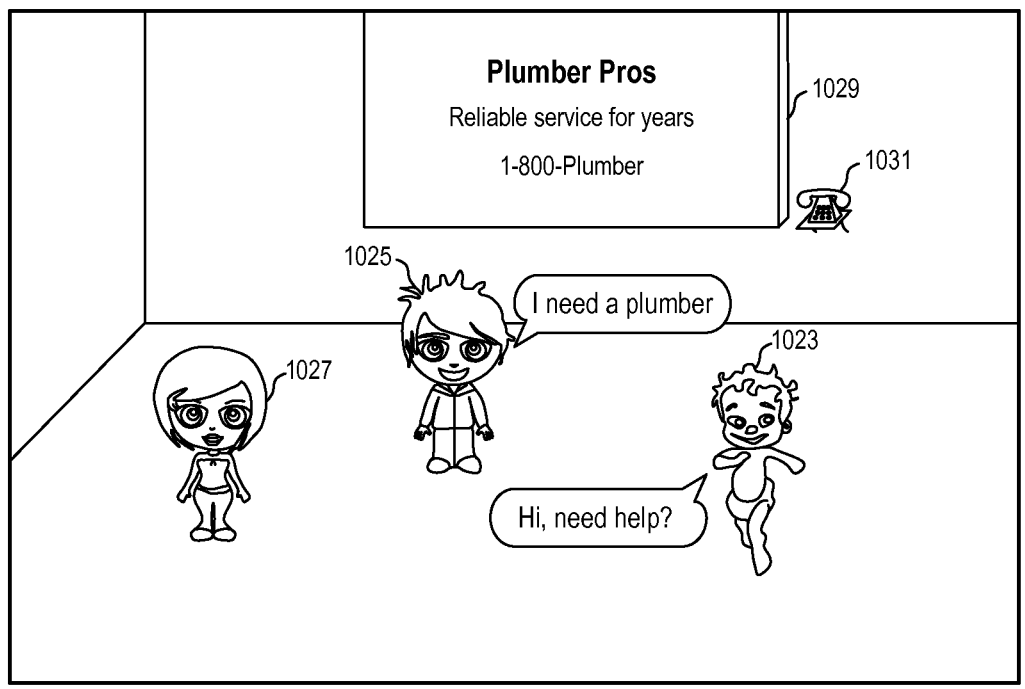
FIG. 38 illustrates a virtual object configured to present context sensitive advertisements based on public conversations in a virtual reality environment according to one embodiment.

In one embodiment, the customer avatars (e.g., 101, 925 and 923) and the advertiser avatar (915) may join a public chat session, in which the communications from one party is also presented to other parties in the session. For example, the text messages sent by an avatar may be depicted via a balloon nearby the corresponding avatar, as illustrated in FIG. 38.

In one embodiment, a combination of the public chat session and private messaging sessions can be used. An avatar may selectively transmit a message as a public message viewable to any avatar in the vicinity, or a private message to a specific avatar in the view.

In one embodiment, the advertiser avatar (915) communicates with the customer avatars via a private messaging session, one at a time. The presence of the customer avatars in the vicinity of the advertiser avatar represents a queue of customers waiting for a real time communication session with the advertiser. Thus, the customers may decide to wait, or talk to one another while waiting.

In one embodiment, the connection provider owns the advertiser avatar and/or the customer avatar. The connection provider can associate information about the customers with the respective customer avatars such that the information are viewable to the advertiser avatar when needed. For example, a time window the customer is willing to wait for a session, a bid price for priority in the queue, prior transaction history, prior notes of the advertiser avatar about the customer, etc., can be associated with the customer avatar as the note of the advertiser avatar about the respective customer. The advertiser avatar can select the customer to view such information which is not accessible to other avatars nor to the customer. Such information allows the advertiser to determine a priority for selecting the next customer for a real time communication session.

In one embodiment, the advertiser avatar (915) provides services (e.g., entertainment, amusement, advice, information, consultation, etc.) via the communication connections provided by the connection provider. On behalf of the advertiser/seller, the connection provider charges the customer based on a price specified by the advertiser and/or the duration of the communication session. In another embodiment, the connection provider rewards the customer on behalf of the advertiser for communicating with the advertiser. In one embodiment, the connection provider rewards the customer with a portion of the advertisement fee collected from the advertiser.

In one embodiment, in response to a request for a virtual meeting in the virtual reality, both the advertiser avatar and the customer avatar are teleported to a predetermined meeting location in the virtual world. For example, the advertiser may specify a virtual office in the virtual world as the location for the virtual meetings with customer avatars interested in a particular advertisement. Alternatively, the advertiser avatar may be teleported to the vicinity of the customer avatar, or to a location specified by the customer avatar.

Figure 28:
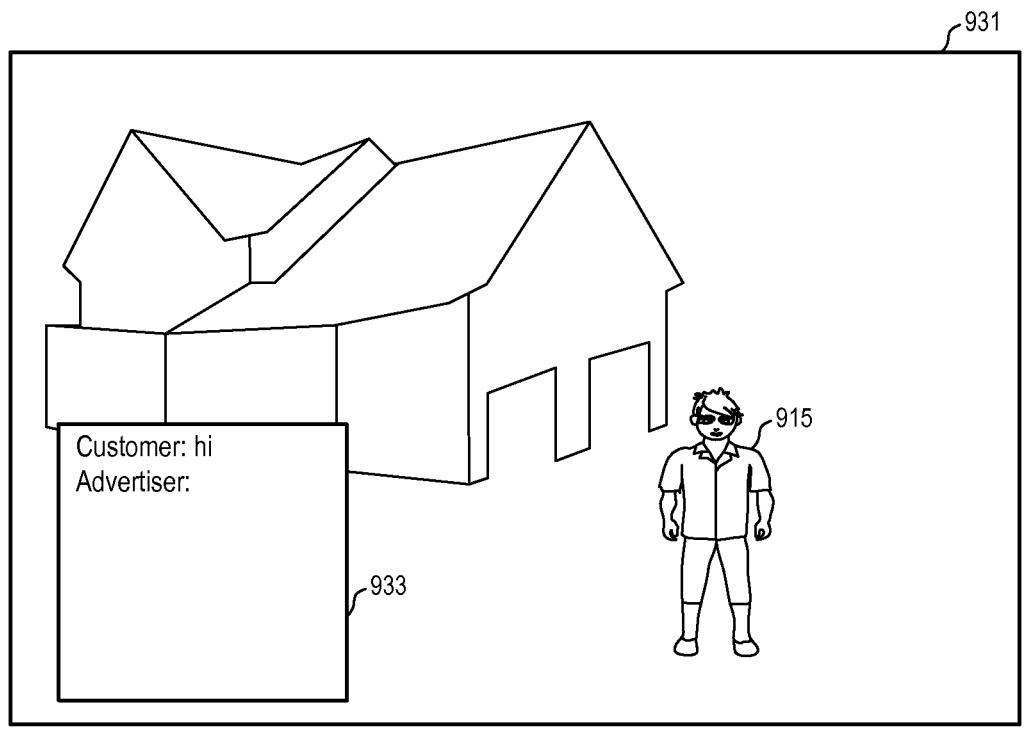
FIGS. 28-30 illustrate scenarios of teleporting avatars for real time communications according to some embodiments.
Figure 29:
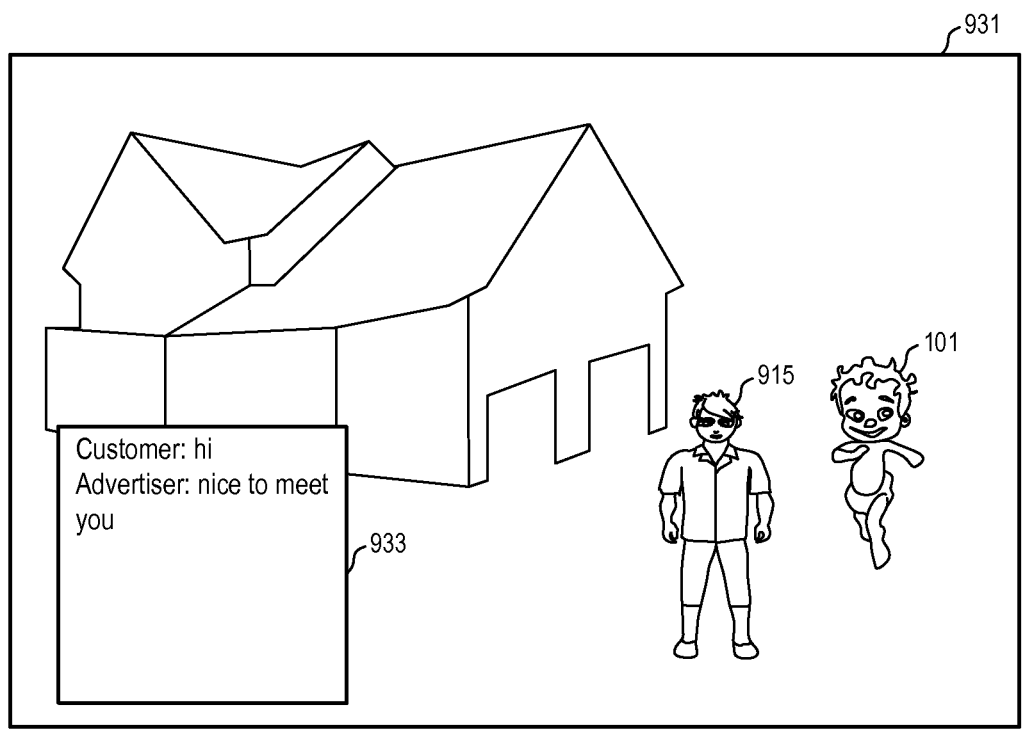
Figure 30:
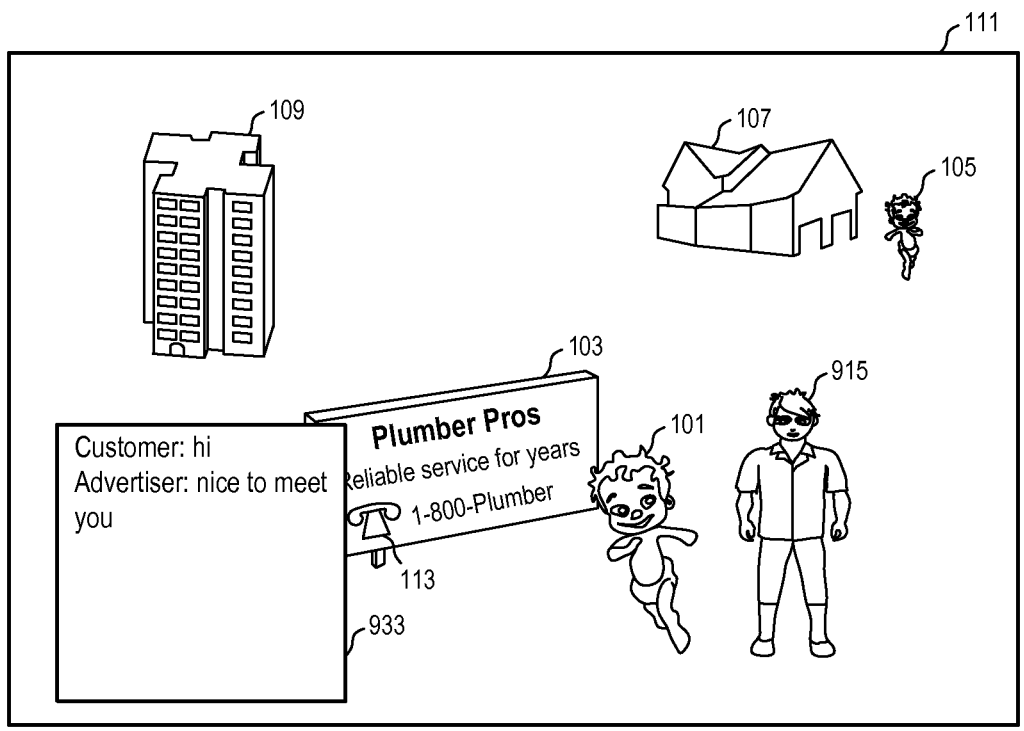

FIGS. 28-30 illustrate scenarios of teleporting avatars for real time communications according to some embodiments.

FIG. 28 illustrates a screen (931) that is displayed to an advertiser. The screen (931) shows the advertiser avatar (915) and a communication session (933) that is established before the virtual meeting. The communication session allows the advertiser avatar and the customer avatar to communicate remotely over a distance in the virtual world before the advertiser avatar and the customer avatar meet in the virtual world.

FIG. 29 shows a scenario in which the customer avatar (101) is teleported into the view of the advertiser avatar (915). The teleporting operation does not interrupt the prior established communication session (933). The advertiser avatar (915) and the customer avatar (101) can continue the conversation after the customer avatar (101) is teleported.

In one embodiment, the communication session (933) can be used as a communication channel for the advertiser avatar (915) and the customer avatar (101) to negotiate the options for teleporting. For example, the window of the instant messaging session may provide the customer avatar with an option to be teleported to the vicinity of the advertiser avatar; and the window of the instant messaging session may provide the advertiser avatar with the option to be teleported to the vicinity of the customer avatar. For example, the customer avatar or the advertiser avatar may specify a location in the virtual world as the location of the meeting.

In one embodiment, the communication session is provided via a connection providers separate from the operator of the virtual reality environment. The customer avatar and/or the advertiser avatar are teleported via the communication session. After the customer avatar and the advertiser avatar are within the view of each other in the virtual world, the communication session provided via the connection provider can be closed; the customer avatar and the advertiser avatar may initiate a communication connection via the virtual reality environment (e.g., the advertiser avatar may call the customer avatar by selecting the customer avatar that is within the view of the advertiser avatar).

Alternatively, after the customer avatar and/or the advertiser avatar are teleported into the view of each other, the connection provider may cause the communication session be reconnected such that subsequent communications (e.g., the media stream and/or the control signal) do not go through the connection provider.

In one embodiment, the virtual object that presents the advertisement offers the customer avatar the opportunity to be teleported to the vicinity of the advertiser avatar, as illustrated in FIG. 24.

FIG. 30 shows a scenario in which the advertiser avatar (915) is teleported into the view (111) of the customer avatar (101). In FIG. 30, the teleporting operation does not interrupt the prior established communication session (933). Thus, after the advertiser avatar (915) and the customer avatar (101) are within the view of each other, the advertiser avatar (915) and the customer avatar (101) can continue to use the communication session (933) that was established prior to the teleporting operation.

In one embodiment, before the teleporting operation, an instant messaging window is displayed to show the text messages sent by the advertiser avatar (915) and the customer avatar (101); after the advertiser avatar (915) and the customer avatar (101) are teleported via the connection provider to be within the view of each other, the text messages from the advertiser avatar (915) and the customer avatar (101) are shown within separate balloons or windows that float near the corresponding avatars (e.g., in a way as the balloons illustrated in FIG. 38). In one embodiment, the balloons are shown privately to the advertiser avatar and the customer avatar but not other avatars. For example, the connection provider may modify the scene data for the view of the customer and the view of the advertiser by inserting the balloons and transmit the modified scene to the customer and the advertiser. Alternatively, the balloons may be shown to other avatars who are in the vicinity of the advertiser avatar and the customer avatar (e.g., as a public discussion/meeting at the location in the virtual world). Alternatively, the advertiser and/or the customer may selectively transmitting some messages as public messages and others as private messages.

In another embodiment, before the teleporting operation, text messages sent by the advertiser avatar and the customer avatar are shown in separate windows/balloons. For example, in a view displayed to the customer, the messages sent by the customer avatar can be shown in a balloon near the customer avatar; and the messages sent by the advertiser avatar can be shown in a balloon near the board of the view, indicating that the advertiser avatar is not in the view. After the advertiser avatar is teleported into the view of the customer avatar, the balloon containing the messages from the advertiser avatar is attached to the advertiser avatar.

In one embodiment, the window of the instant messaging session (or the balloon to show the messages from the customer avatar) that is displayed to advertiser avatar includes a button or link which can be selected to teleport the advertiser avatar to the vicinity of the customer avatar; and the window of the instant messaging session (or the balloon to show the messages from the advertiser avatar) that is displayed to customer avatar includes a button or link which can be selected to teleport the customer avatar to the vicinity of the advertiser avatar.

In one embodiment, a telephone/voice connection between the customer and the advertiser prior to the teleporting operation of bringing the customer avatar and the advertiser avatar together at a location in the virtual world.

In one embodiment, a telephone connection between the advertiser and the customer is established via the advertisement in response to the advertiser avatar and/or the customer avatar being teleported to a location in the virtual world for a meeting.

Figure 31:
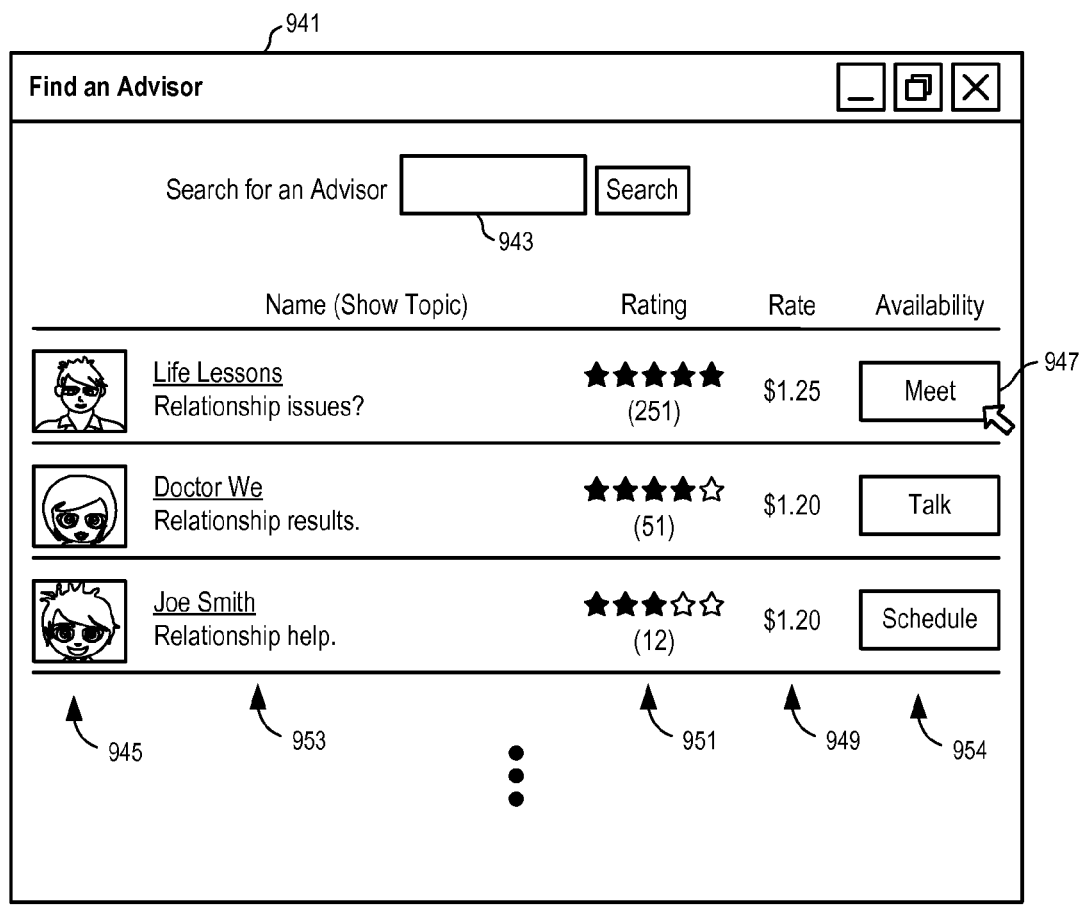
FIG. 31 illustrates an interface to present advisors for real time communications with customers in a virtual reality environment according to one embodiment.

FIG. 31 illustrates an interface to present advisors for real time communications with customers in a virtual reality environment according to one embodiment. In FIG. 31, a browser (941) is used to presented a list of advisors, in response to a search (e.g., received via the entry box (943)), or in response to the user browsing a hierarchy of categories. The browser (941) may be a general purpose web browser, or a special purpose application program, or a virtual browser in a virtual world (e.g., a virtual browser running on a virtual computer in a virtual reality environment).

In one embodiment, the browser (941) is used to present traditional web pages that generally contain 2D information. A separate browser is used to present the view of a virtual reality world that generally contain 3D information.

In FIG. 31, the browser (941) displays the image/icon (945) of the advisor, the rating (951) of the advisor determined based on the feedback from prior customers of the advisor, the brief description (953) of the services offered by the advisor, the rate (949) specified by the advisor for charging the customers for services rendered by the advisor over the communication connections provided by the connection provider, and the indication of availability of the advisor for real time communications at the time the list is presented. For example, the advisor may be available for a virtual meeting in the virtual world; and the icon (e.g., 947) may be provided to teleport the customer to a location in the virtual world for the meeting in avatar form.

In one embodiment, when the icon (947) is selected by the customer, the customer is assigned a customer avatar by the connection provider and teleported to the virtual world. The customer can then interact anonymously with the advisor in an avatar form. Alternatively, the customer may used his or her own avatar to meet the advertiser avatar in the virtual world.

When the advisor is not available for a meeting in the virtual world, the advisor may be available for a discussion via a telephone link, or an instant messaging session. If the advisor is not currently available for real time communications with the customer, the customer may request the connection provider to arrange an appointment for a real time communication session with the advertiser, or for a meeting with the advertiser in the virtual world.

Figure 32:
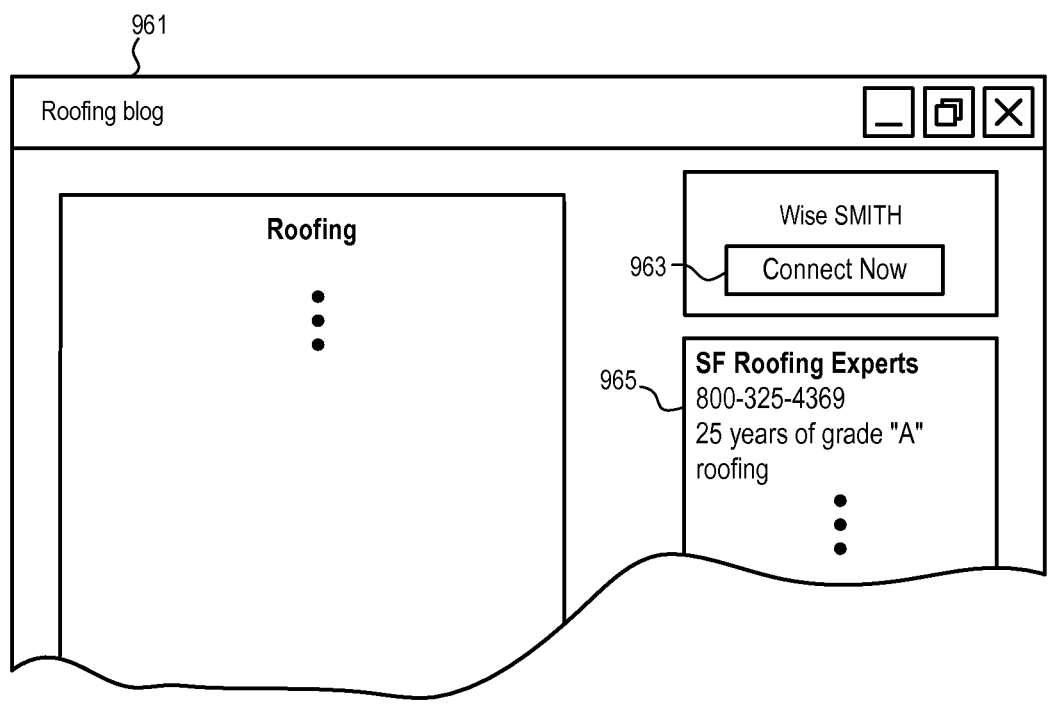
FIG. 32 illustrates an interface which allows users to request connections to an advisor for real time communications in a virtual reality environment according to one embodiment.

FIG. 32 illustrates an interface which allows users to request connections to an advisor for real time communications in a virtual reality environment according to one embodiment. In FIG. 32, a browser (961) is used to present a blog (weblog) of an advisor. The website may include advertisements (965) for other advertisers and an icon (963) that is assigned by the connection provider to the advisor. The icon (963) can be used by a viewer of the website to request a communication connection with the advisor.

For example, the icon (963) may include a reference to a web location in the server of the connection provider, which when requested, provides the image of the icon (963) according to the availability status of the advisor. The reference to the icon can also be embedded in other documents, such as emails, word processing documents, etc.

In one embodiment, when the icon (963) is selected, an interface as illustrated in FIG. 33 is displayed. FIG. 33 illustrates an interface to connect users to an advisor for real time communications in a virtual reality environment according to one embodiment.

In FIG. 33, the interface (971) includes an entry (973) which allows the user to specify a time window during which the user is available for the requested real time communication session.

The interface (971) shows the user a variety of options (975) to make voice/text connections for real time communications. For example, the user may provide a traditional phone number to allow the connection provider to call back the user to establish the voice connection, a SIP address for a VoIP based voice connection, an IM identifier for an instant messaging session. Alternatively, the user may choose to use the virtual reality to establish the voice/text connection.

The interface (971) also provides the user with a variety of options (977) for specifying a meeting location in the virtual world. For example, the user may choose to be teleported to the location of the advisor for a meeting, or to a location specified by the user. Alternatively, the user may ask that the advisor be teleported to a location near the avatar of the user for the meeting, or decline the offer of a virtual meeting.

In one embodiment, when selection of the user is stored as a preference of the user, which is used for subsequent requests for connections with advisors until the user changes the preference.

In one embodiment, the user may further specify the expected time duration for the real time communication session, a note for the advisor, etc. (not shown in FIG. 33) The expected time duration specified by the user can be used to estimate the customer spending for the request. In one embodiment, the user is charged at least for the expected time duration, even if the actual communication period is shorter than the specified duration. When the expected time duration expires, the communication session may be terminated, or be extended on a per minute based, or be extended according to another time period specified by the user or the advisor.

Figure 34:
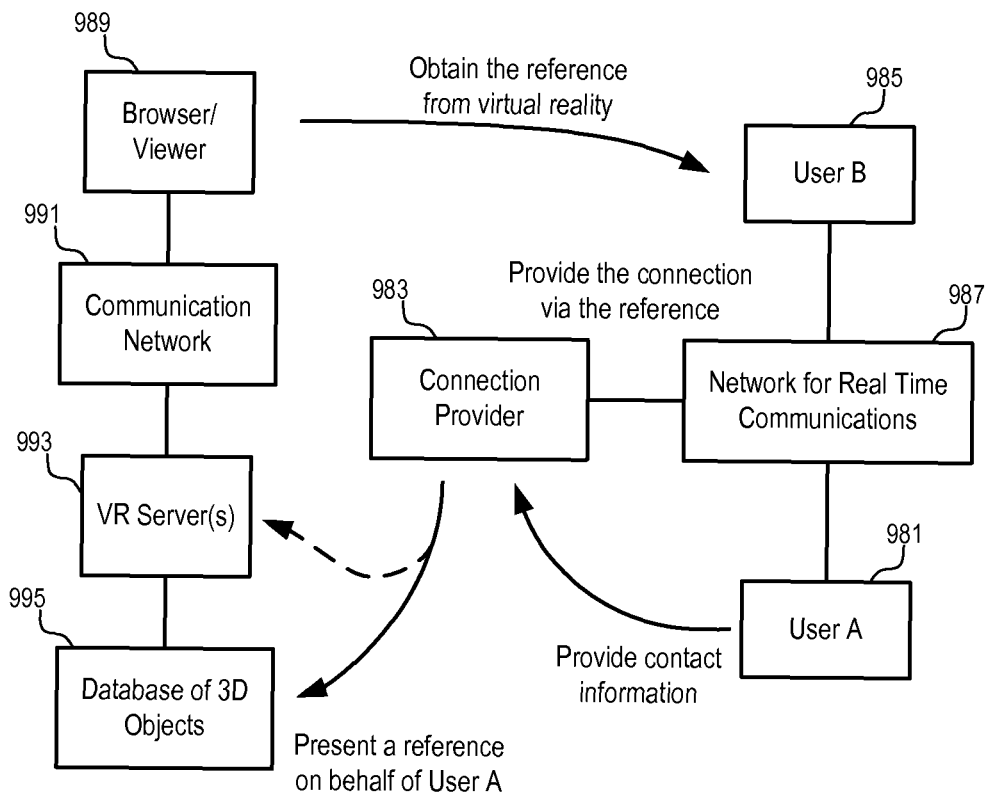
FIG. 34 illustrates a system with a connection provider to connect users via a virtual reality environment according to one embodiment.

FIG. 34 illustrates a system with a connection provider to connect users via a virtual reality environment according to one embodiment.

In FIG. 34, a virtual reality (VR) server (993) is used to host the data of the virtual reality environment, such as the 3D geometric data of various virtual objects of the environment, the ownership of virtual objects, the appearance of the virtual objects, the presence status and/or location information of the avatars that represent the residence of the virtual world, etc. The virtual reality server (993) may further provide software tools that can be used to facilitate the creation and modification of virtual objects of the virtual world. In one embodiment, the virtual reality server (993) also provides a marketplace for virtual economy in the virtual world. For example, the virtual reality server (993) manages a virtual currency which can be used in the virtual world for the purchases of virtual objects and services provided in the virtual world. The virtual reality server (993) may further provide an interface for currency exchange between the virtual currency and one or more real world currency.

The virtual reality server (993) may be a single computer, or a cluster of computers interconnected with a high speed network (e.g., a local area network), or a set of computers interconnected via a wide area network (e.g., Internet). In one embodiment, the virtual reality server (993) is operated by a single entity. Alternatively, the virtual reality server (993) may be a set of computers operated by a number entities according to a set of published communication standards. In one embodiment, the virtual reality server (993) represents a 3D portion of the Internet.

In FIG. 34, a set of 3D virtual objects are stored in the database (995) accessible via the virtual reality server (993) by a remote browser/viewer (980) over the communication network (991). A user B (985) experiencing the virtual world may be interested in establishing a communication connection with another user A (981). To provide the opportunity for a communication connection between user A (981) and user B (985), the connection provider (983) obtains the contact information from user A (981), assigns a reference to represent the contact information, and presented the reference as part of the 3D objects.

In one embodiment, the virtual reality server (993) dynamically informs the connection provider (983) the advertising opportunity. For example, some virtual objects can be configured to show dynamic advertisements on various surfaces of the objects. When such surfaces become visible in the browser viewer (989), or when the virtual objects come into the view of the browser (989), the virtual reality server (993) may inform the connection provider the opportunity to advertise. In one embodiment, the virtual reality server (993) may further provide the information describing the context of the opportunity to enable the connection provider to select advertisements relevant to the context. For example, the virtual reality server (993) may provide the connection provider with the preferences, wishes, conversation topics of the avatars that are in the vicinity of the virtual objects, the content or topics of the virtual objects, or the topics, keywords, suggestions, restrictions specified by the owner of the virtual objects for the advertisement, etc. Based on the information received from the virtual reality server (993), the connection provider (983) may select an advertisement for the user A (981) for presentation at the given opportunity. The advertisement may be presented in a visual form, or in an audio form, or in a combination.

In one embodiment, the connection provider (983) provides advertisements that are pre-associated with the virtual objects in the database (995). When these virtual objects are being viewed, the advertisements are presented as part of the appearance of the virtual objects. For example, an advertisement containing the reference assigned to represent the contact information of the user A (981) can be defined as the static appearance of a surface of a virtual object.

In one embodiment, the user B (985) obtains the reference from the virtual reality presented to the user B (985) via the browser (989) and uses the reference to request the connection provider (983) to establish a connection over the network (987) for real time communications between the user A (981) and user B (985).

For example, the reference may be a telephone number (e.g., a traditional local or toll free telephone number for a plain old telephone system, a SIP phone number for VoIP based telephony, or a phone number with an extension). The user B (985) can make a call to the telephone number to reach the connection provider (983), which identifies the contact information of user A (981) based on the telephone number used to reach the connection provider (983).

In one embodiment, the connection provider may further obtain other input from the user B (985) to identify the user A (981). For example, the telephone number may be associated with a set of advertisements of different categories or subcategories; and the user A (981) may be connected to an interactive voice response (IVR) system, or a human operator, to select the category and/or a subcategory to identify the user A (981). In one embodiment, after the search criteria are received from the user B (985), over the telephone connection between the user B (985) and the connection provider (983), the connection provider (983) searches and determines the user A (981) based the search criteria and the bid price the user A (981) is willing to pay for the lead to the user B (985). In one embodiment, from the candidates that satisfy the search criteria the one offers the highest price for the lead is selected. In another embodiment, the system computes the estimated earning potential based on the advertisement income and commission fees from transactions resulted from the advertisement; and from the candidates that satisfy the search criteria the one has the highest earning potential is selected.

In one embodiment, the connection provider provides the telephonic connection between the user A (981) and the user B (985) and further provides references for teleporting the users A (981) and B (985) to a same area in the virtual reality for improved visual experience.

For example, the connection provider (983) may assign one avatar to the user A (981) and another avatar to the user B and teleporting the users to a preferred location in the virtual world that provides a visual environment for the conversation. Thus, the user B (985) may keep his/her own avatar the current location in the virtual world, and use the anonymous avatar assigned by the connection provider (983) to meet the user A in the virtual world. During or after the meeting, the user B (985) can conveniently return back to the his/her own avatar.

In one embodiment, the user B (985) can give part of the control of the anonymous avatar assigned by the connection provider (983) to the user A (981) to allow the user A (981) to arrange a better demonstration.

In another embodiment, the user B (985) obtains the reference for teleporting without using the browser/viewer (989). For example, the user B (985) may use a traditional 2D web page to obtain the reference for teleporting. After the user B (985) selects the reference, the connection provider (983) assigns an anonymous avatar to the user B (985) and teleporting the avatar to the meeting location.

In one embodiment, the user A (981) is initially provided with the control of the anonymous avatar assigned to the user B (985). Thus, if the user B (985) does not know how to control the anonymous avatar, the user A (981) may teach the user B (985), or operate the anonymous avatar on behalf of the user B (985).

In some embodiments, the user A (981) and/or user B (985) may use their own avatars for meeting in the virtual world. When the connection provider (983) does not have control of and/or access to the avatars owned by the users (e.g., 981 and 985), virtual objects can be distributed to facilitate the collection of information about the user avatars, such as location and online status, teleporting of the user avatars, etc.

Figure 35:
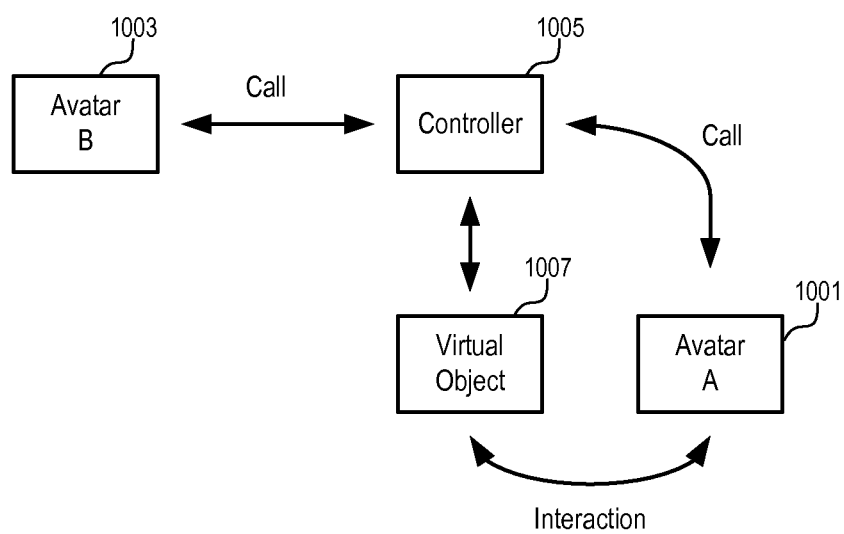
FIGS. 35-36 illustrate methods to use one or more virtual objects to facilitate communication connections via a virtual reality environment according to some embodiments.
Figure 36:
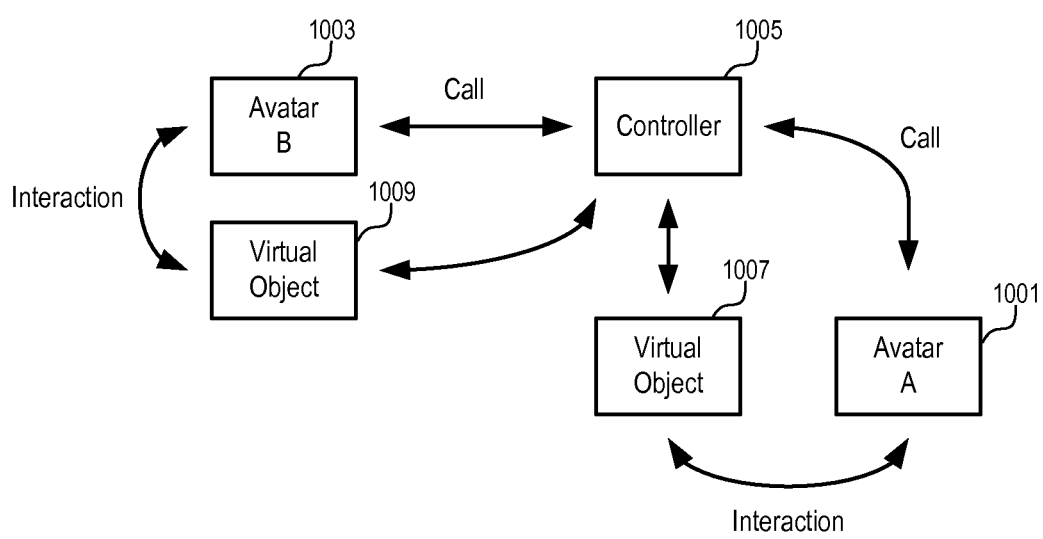

FIGS. 35-36 illustrate methods to use one or more virtual objects to facilitate communication connections via a virtual reality environment according to some embodiments.

In FIG. 35, a virtual object (1007) is configured to communicate with a controller (1005) which may be part of the connection provider or an avatar representation of the connection provider in the virtual world. The virtual object (1007) can be provided to the avatar A (1001) to allow the collection of information about the avatar (1001). For example, the virtual object (1007) can be configured to report to the controller (1005) whether the virtual object (1007) is currently attached to the avatar A (1001). When the virtual object (1007) is attached to the avatar A (1001), the location of the virtual object (1007) in the virtual world can be considered as the location of the avatar A (1001).

In one embodiment, when the virtual object (1007) is attached to the avatar A (1001), the virtual object (1007) can automatically obtain the online status information from the avatar A (1001). Alternatively, when the security setting of the virtual world prevents the virtual object (1007) from obtaining the online status information from the avatar A (1001), the user of the avatar A (1001) may manually set the online status of the virtual object according to the online status of the avatar A (1001). Alternatively, the virtual object may have its own online status, separate from the online status of the avatar A (1001); and the online status of the virtual object can be set by the avatar A (1001) to indicate the preference of the avatar A (1001).

In one embodiment, after the controller (1005) obtains the desired location of the meeting between the avatar A (1001) and avatar B (1003), the controller (1005) can provide the location information to the virtual object (1007). The location may be the current location of the avatar B (1003), or a location specified in the advertisement. The virtual object (1007) then presents to the avatar A (1001) an option of being teleported to the location. In response to a selection of the option, the avatar A (1001) is teleported to the location.

In one embodiment, the controller (1005) provides a reference to the avatar B (1003) to the virtual object (1007). The virtual object (1007) then presents to the avatar A (1001) an option to establish a text, voice and/or video connection to the avatar B (1003) (e.g., via an instant messaging network). In response to a selection of the option, the virtual object sends to the controller (1005) the reference to the avatar B (1003) and the identity of the avatar A (1001); and the controller (1005) the initiates a conference call to the avatar A (1001) and the avatar B (1003) to establish the connection, or initiates separate calls to the avatar A (1001) and the avatar B (1003) and bridges the calls (e.g., by directing the avatar A (1001) and the avatar B (1003) to make a direct media stream connection that does not go through the controller while forcing the control signal stream to go through the controller).

In one embodiment, the virtual object (1007) is callable. When the virtual object (1007) is called (e.g., a request for a connection is sent to the virtual object), the virtual object (1007) may be animated to indicate that the virtual object is being called. Alternatively or in combination, the virtual object (1007) may present a public visual prompt, such as a text message, a dialog box, and/or a public audio prompt (e.g., an audio clip) to avatars with a predetermined distance of the virtual object to indicate that the virtual object is being called.

In one embodiment, the virtual object (1007) is callable when the virtual object (1007) is in the view of at least one active avatar in the virtual world. In one embodiment, when the virtual object (1007) is called, any of the avatars that are viewing the virtual object (1007) can pick up the call. When the virtual object (1007) is called, the visual and/or audio indication showing that the virtual object (1007) is being called is transmitted to the user terminals of various different avatars who are viewing the virtual object (1007) from the separate, different user terminals.

In one embodiment, when an avatar selects or picks up the virtual object (1007) that is being called, the connection is redirected to the user of the avatar. In one embodiment, after the avatar picks up the incoming, the virtual object (1007) is temporally attached to the avatar (or placed under the control of the avatar); and upon the disconnection of the call, the virtual object (1007) is detached from the avatar.

For example, an advertisement may include a callable virtual object (1007). When it is detected that the user is interested in the advertisement, the callable virtual object (1007) may be called. If the user picks up the call, the virtual object is temporarily attached to the avatar; and the connection is redirected to the user of the avatar. Thus, the call can be dynamically directed to a user who is interested in the advertisement.

In one embodiment, the callable virtual object (1007) is called by the controller (1005). When the call is picked up by the avatar A (1001), the controller (1003) further connects the call to the avatar B (1003). The controller (1003) may initiate the call when the advertisement is being presented, or after an indication that the user has been watching the advertisement for a period of time, or after the user selecting the advertisement.

In another embodiment, in response to an indication that the avatar A (1001) is interested in the advertisement, the controller (1005) calls both the virtual object (1007) and the avatar B (1003).

In a further embodiment, in response to a determination that the avatar A (1001) is interested in the advertisement, the controller (1005) may identify the virtual object (1007) to the avatar B (1003), which if interested and available, may initiate a call to the virtual object (1007).

The call connected to the avatar A (1001) may be a call for an instant messaging session, or a call to a mobile phone of the user as specified by the avatar A (1001), or a call to a plain old telephone set connected to a landline of the user of the avatar A (1001). In one embodiment, the avatar A (1001) includes data specifying the contact reference(s) for connecting the call to the avatar A (1001). When the avatar A (1001) picks up the call to the virtual object (1007), the contact references are read to facilitate automated transfer of the call to the avatar A (1001). Alternatively, a user interface can be presented to collect the contact reference of the avatar A (1001) to facilitate automated transfer of the call to the avatar A (1001).

In one embodiment, the virtual object (1007) can also be used to place a call. For example, the virtual object (1007) can be picked up by the avatar A (1001), causing the virtual object (1007) to be temporality attached to the avatar A (1001) or be placed under the control of the avatar A (1001). When the virtual object is selected to place a call according to the reference assigned to represent the avatar B (1003), the call made from the virtual object is redirected to the avatar (1001).

In one embodiment, the virtual object (1007) is configured with access to contact information of the avatar, such as avatar A (1001). The contact information is generally private to the avatar A (1001) and not accessible to other avatars or virtual objects.

In one embodiment, when the virtual object (1007) is temporarily attached to the avatar A (1001), the virtual object (1007) gains the access to the contact information of the avatar A (1001), such as the identity of the avatar A (1001), a preferred telephone number of the avatar A (1001), an instant messaging identifier of the avatar A (1001), etc. The contact information includes the preferred way of contacting the avatar A (1001). When the virtual object (1007) is detached from the avatar A (1001), the virtual object (1007) releases access to the contact information of the avatar A (1001).

In one embodiment, the contact information is stored with a separate virtual object that can be attached to the avatar A (1001). Alternatively, the contact information may be configured as part of the avatar (1001).

The virtual object is configured to protect the contact information from unauthorized access. For example, the virtual object is configured to provide the contact information to the controller (1007) over a secure communication channel (e.g., via encrypted data packet) for the purpose of make a call to the avatar (1001) without revealing the contact information to other entities. In one embodiment, the virtual object (1007) is limited to have the possession of the contact information for the duration in which the virtual object (1007) is attached to the avatar A (1001). In one embodiment, the virtual object (1007) does not provide the contact information to entities other then the controller (1005).

Thus, once the virtual object (1007) is attached to the avatar A (1001), the avatar A (1001) can place and/or receive calls via callbacks using the controller (1005).

In one embodiment, the virtual object (1007) has a visible representation in the virtual world and occupies a finite 3D space in the virtual world. The virtual object (1007) can be attached to a single avatar (e.g., 1001) for a private conversation. Alternatively, the virtual object (1007) can be attached to a set of avatars (e.g., within a distance in the virtual world) for a conference.

In one embodiment, the virtual object (1007) can also be used to teleport the avatar A (1001) to a location specified by the controller (1005). For example, the virtual object (1007) may show a user interface element which can be selected to cause the avatar who selects the displayed interface element be teleported to a location specified by the controller (1005).

The virtual object may be teleported with the avatar (1001) to the destination. For example, the virtual object (1007) may represent a virtual mobile phone owned by the avatar A (1001); and the virtual object (1007) can be teleported with the avatar A (1001) to the destination. Alternatively, the virtual object is detached from the avatar (1001) prior to the teleporting the avatar (1001). For example, if the virtual object represents a telephone associated with an advertisement, the virtual object is not to be teleported away from the advertisement.

FIG. 36 illustrates an example in which both the avatar A (1001) and the avatar B (1003) uses virtual objects (e.g., 1007 and 1009) to facilitate the establishing of a communication link via the controller (1005). The virtual objects (1007 and 1009) can be attached to the avatar A (1001) and the avatar B (1003) respectively to determine their current locations in the virtual world, the online status of the avatars (1001 and 1003), and the availability of the avatars (1001 and 1003) for real time communications. The controller can use the contact information retrieved by the virtual objects (1007 and 1009) to establish a communication connection between the avatars (1001 and 1003).

Figure 37:
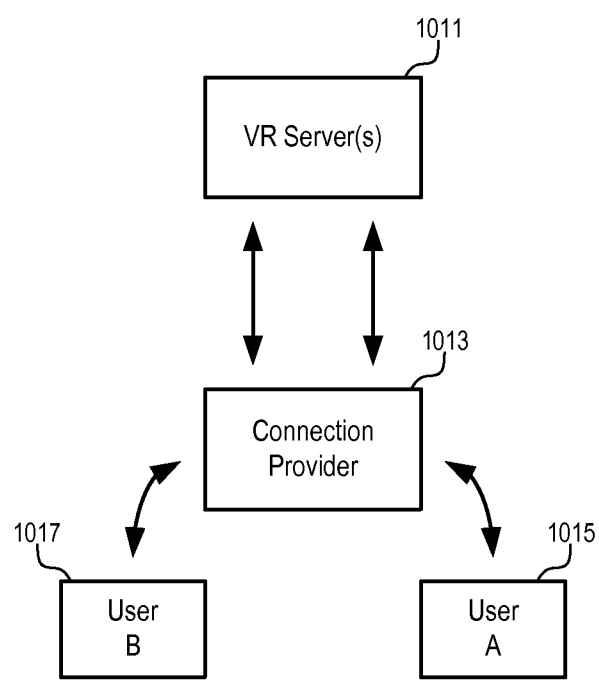
FIG. 37 illustrates a system with a connection provider to connect users via a virtual reality environment according to one embodiment.

FIG. 37 illustrates a system with a connection provider to connect users via a virtual reality environment according to one embodiment. In FIG. 37, the connection provider (1013) provides the user A (1015) and the user B (1017) with access to the virtual reality server(s) (1011). The connection provider (1013) can take the ownership of the avatars that are assigned to the user A (1015) and user B (1017). Since the connection provider (1013) owns the avatars, the connection provider (1013) can retrieve the location and/or online status information of the avatars, teleport the avatars to desired locations, limit the areas where the avatars can visit, etc., as if the connection provider is part of the virtual reality server(s) (1011).

For example, the connection provider (1013) may receive the input from the users and relay the input to the virtual reality server(s) (1011) with or without modification. The connection provider (1013) may receive the virtual objects from the virtual reality server(s) (1011) and relay the objects to the browsers of the users for rendering and display, with or without modification. Alternatively, the connection provider may render the scenes for the users and transmit the rendered still images or video images to the users.

FIG. 38 illustrates a virtual object configured to present context sensitive advertisements based on public conversations in a virtual reality environment according to one embodiment.

In FIG. 38, a virtual object (1029) is configured to observe nearby public conversations. For example, the virtual object (1029) may be configured to receive public statements made by avatars presented within a predetermined distance from the object (1029).

For example, in FIG. 38, avatars (1023, 1025 and 1027) are in the vicinity of the virtual object (1029). When the avatars (1023 and 1025) make public statements, the balloons enclosing the text of the statements are displayed to nearby avatars. The virtual object (1029) can also be configured to receive such statement. In one embodiment, the text are sent directly to the virtual object (1029) based on the request from the virtual object (1029) to listen to the nearby public discussions. Alternatively, a virtual camera may be set to watch the conversations and derived the topic from the change view as seen by the virtual camera associated with the virtual object (1029). Alternatively, an avatar may be sent to observe the area and determine the topics for the advertisements to be presented on the virtual object (1029).

In other examples, an avatar may be giving a speech and the object (1029) may receive the text of the speech to determine advertisements that are relevant.

In other examples, the avatars may hold a meeting or conference in the vicinity of the object (1029); and the object (1029) is configured to monitor the conversations in the meeting or conference.

The virtual object (1029) may send the information to a centralized agent to determine advertisements appropriate for the context, or analyze the information and determine a query for an advertisement that is appropriate for the context.

In one embodiment, the advertisement displayed via the virtual object (1029) contains a telephone number, which can be used to establish a voice connection with the advertiser without going through the virtual reality environment.

In one embodiment, the virtual object (1029) may determine whether any of the avatars has any interest in the advertisement. For example, the virtual object (1029) may offer a reward to an avatar who is interested in the advertisement; and an avatar may express the interest by selecting the virtual object (1029) to claim the reward.

In response to the determination that an avatar is interested in the advertisement, the connection provider may call the avatar to establish a communication connection, or offer a link to teleport the avatar to a location specified by the advertiser, or teleport an advertiser avatar to the vicinity of the advertisement, etc. For example, the connection provider may call the virtual telephone (1031) which may be picked up by any of the avatars (e.g., 1023, 1025 and 1027) whose view includes the virtual telephone (1031).

In another embodiment, after an avatar who may be interested in an advertised service is identified, an advisor avatar may be teleported to the vicinity of the avatar to join the activity there. Alternatively, the avatar may be connected to a remote advisor avatar for a private conversation without leaving the current location.

In one embodiment, an avatar may initiate a chat with the virtual object (1029) to search for specific information. For example, after the avatar opens an instant text messaging session with the virtual object (1029), the avatar may ask questions. The questions can be routed to a human for an answer, or to a search engine. Advertisements may be presented based on such a conversation.

Similarly, an advisor avatar may also engage in a conversation, in voice or text, with a customer avatar to provide help, comfort, entertainment, advice, information, etc. An indicator of content of the conversation may be routed to a connection provider to determine opportunities for serving appropriate advertisements that are relevant to the interest of the customer avatar.

For example, an advisor avatar (e.g., 1027) may engage in a private conversation with a customer avatar (e.g., 1023). The advisor avatar (1027) can make an arrangement to have the private conversation monitored for the selection of advertisements. When an advertisement topic is determined, the connection provider may be informed to search and presented related advertisements on the virtual object (1029).

In one embodiment, the advertisements of certain categories are randomly presented on the virtual object (1029).

Figure 39:
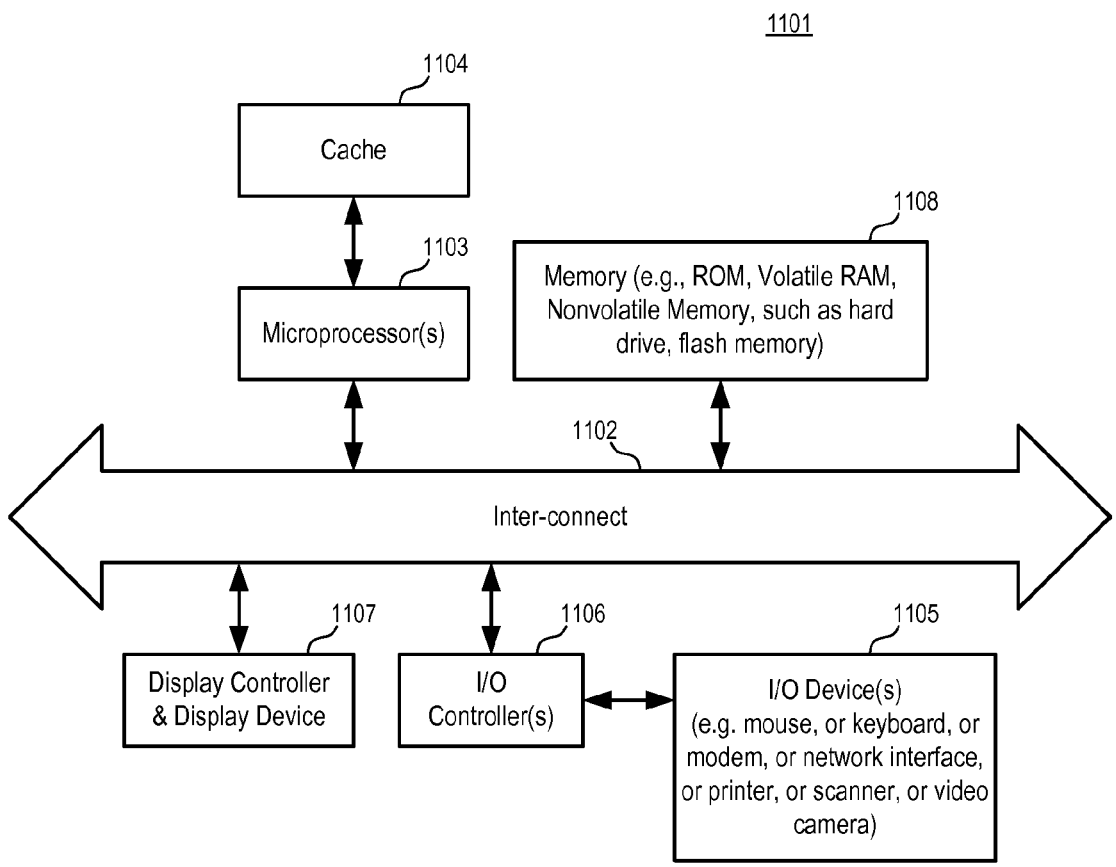
FIG. 39 shows a block diagram example of a data processing system which may be used in various embodiments.

FIG. 39 shows a block diagram example of a data processing system which may be used in various embodiments. While FIG. 39 illustrates various components of a computer system, it is not intended to represent any particular architecture or manner of interconnecting the components. Other systems that have fewer or more components may also be used.

In FIG. 39, the communication device (1101) is a form of a data processing system. The system (1101) includes an inter-connect (1102) (e.g., bus and system core logic), which interconnects a microprocessor(s) (1103) and memory (1108). The microprocessor (1103) is coupled to cache memory (1104) in the example of FIG. 39.

The inter-connect (1102) interconnects the microprocessor(s) (1103) and the memory (1108) together and also interconnects them to a display controller and display device (1107) and to peripheral devices such as input/output (I/O) devices (1105) through an input/output controller(s) (1106). Typical I/O devices include mice, keyboards, modems, network interfaces, printers, scanners, video cameras and other devices which are well known in the art.

The inter-connect (1102) may include one or more buses connected to one another through various bridges, controllers and/or adapters. In one embodiment the I/O controller (1106) includes a USB (Universal Serial Bus) adapter for controlling USB peripherals, and/or an IEEE-1394 bus adapter for controlling IEEE-1394 peripherals.

The memory (1108) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a server data processing system as illustrated in FIG. 39 is used as one of the communication server(s), virtual reality server(s), connection server(s), database server(s), media server(s), controller(s), router(s), gateway(s), etc.

A user terminal as a client system can be a data processing system similar to the system of FIG. 39. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone.

In one embodiment, a user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. Other types of traditional communication client(s) may be used in some embodiments.

Figure 40:
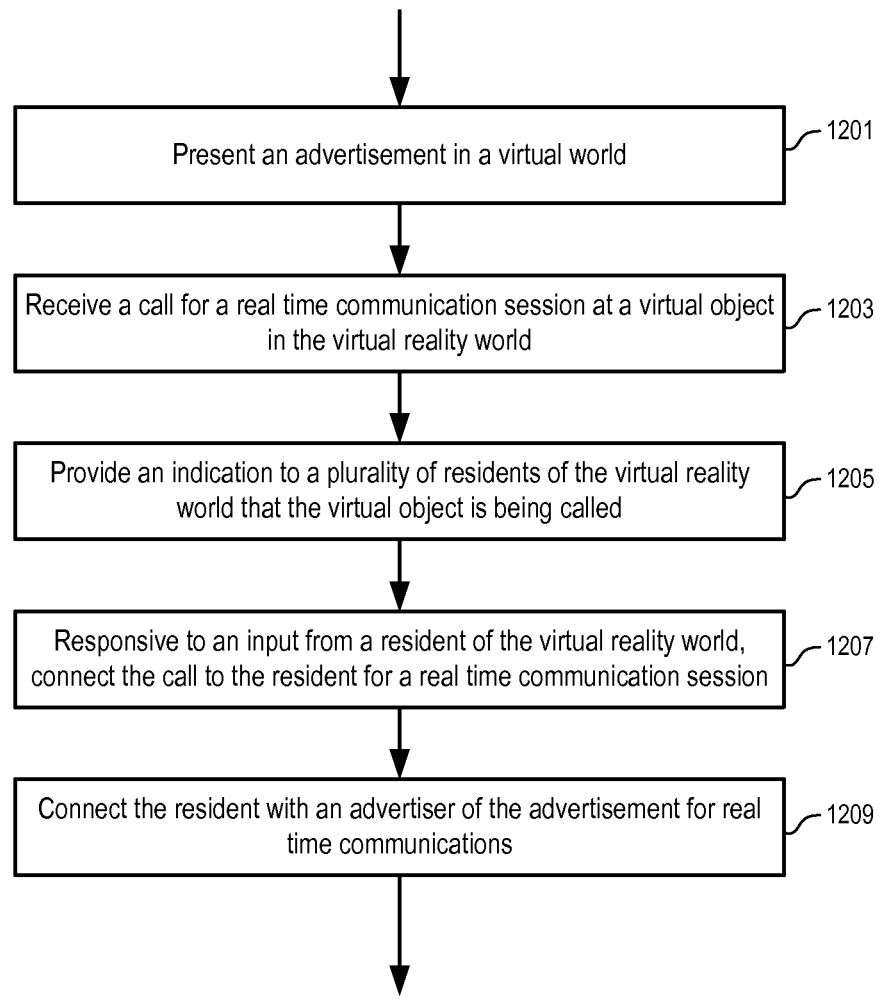
FIG. 40 shows a method to connect people via a virtual reality environment according to one embodiment.

FIG. 40 shows a method to connect people via a virtual reality environment according to one embodiment. In FIG. 40, an advertisement is presented (1201) in a virtual world. After a call for a real time communication session is received (1203) at a virtual object in the virtual reality world, an indication that the virtual object is being called is provided (1205) to a plurality of residents of the virtual reality world. Responsive to an input from a resident of the virtual reality world, the call is connected (1207) to the resident for a real time communication session.

In one embodiment, the virtual object automatically obtains contact information from the resident via a data packet configured with the resident to connect the call to the resident. The contact information may be a telephone number, such as a VoIP user identifier, a SIP URL, a traditional phone number without an extension, or a phone number with an extension.

In one embodiment, the access to the data packet is limited to authorized entities, such as a connection provider, or virtual objects provided by the connection provider. For example, the data packet may be encrypted to provide access to the contact information to authorized virtual objects and to prevent unauthorized access. For example, the data packet can be encrypted using a public key of a connection provider such that the contact information is accessible to the connection provider who has the private key to decrypt the data packet, but not to other entities. In one embodiment, the virtual objects forward the encrypted data packet to the connection provider to allow the call to be reconnected to the resident. Alternatively, the virtual objects may decrypt the data package and transfer the call to the resident.

In another embodiment, the virtual object can be used to initiate a call for a real time communication session by a resident of the virtual reality world. For example, the resident may be represented by an avatar which can be configured with an encrypted data package that includes the contact information and/or preferences for communication channels or methods. When the avatar selects the virtual object (e.g., a virtual telephone), the encrypted data packet is automatically obtained by the virtual object from the avatar. The connection provider can then connect the avatar via a callback to the avatar.

In one embodiment, the virtual object can be configured to call an advertiser (e.g., the advertiser of the advertisement that is presented via the virtual object). When an avatar selects the virtual object, virtual object obtains the contact information from the encrypted data packet from the avatar and transmits the contact information with an identification of the advertiser or the advertisement to the connection provider for a connection between the advertiser and the avatar. Alternatively, the virtual object can be configured to run on the virtual reality server and connect the advertiser and the avatar.

In FIG. 40, the resident is connected (1209) with an advertiser of the advertisement for real time communications, such as telephone conversation, instant messaging with text, voice and/or video, common whiteboarding, application sharing, screen sharing, etc.

In one embodiment, the plurality of residents correspond to a plurality of users of the virtual reality world connected via a network; the plurality of residents are represented by a plurality of avatars presented in the virtual reality world; and the plurality of avatars are located in a vicinity of the virtual object in the virtual reality world.

In one embodiment, a visual cue is displayed on the virtual object; and the plurality of avatars are in the virtual reality world at positions where the virtual objects are visible to the users of the plurality of avatars. Thus, the users can obtain the indication that the virtual object is being called via viewing the visual cue displayed on the virtual object. For example, the virtual object may be animated to provide the visual cue that the virtual object is being called.

In one embodiment, an audio cue is delivered to residents who are within a predetermined distance from the virtual object in the virtual reality world. The distance criterion may be specified by the virtual object, or by the virtual reality world, or by the individual residents. For example, the virtual object may specify how far away the audio cue can be propagated in the virtual reality world (e.g., via a volume parameter for the audio cue). For example, the residents may specify the distance limit within which public audio signals generated from various sources can reach them (e.g., via a sensitivity parameter for receiving public audio signals). In one embodiment, a combination of parameters specified by the virtual objects and parameters specified by the residents resident can be used to determine who may received the audio cue. Alternatively, the virtual reality world may specify the conditions for the broadcasting of the public audio cue. For example, the audio cue may delivered to residents to whom the virtual object is visible and not delivered to residents from whose view the virtual object is absent.

In one embodiment, the virtual reality world includes a three dimensional model including the virtual object; and the virtual reality world is presented to residents of the virtual reality world based on respective view points of residents in the virtual reality world. In one embodiment, the virtual object occupies a visible three-dimensional volume in the virtual reality world.

In one embodiment, the advertisement is presented in the virtual reality world via the virtual object; and a call from an advertiser of the advertisement is connected to the virtual object to reach potential customers.

In one embodiment, the advertisement is presented in the virtual reality world via the virtual object; and the advertiser of the advertisement is alerted to call the virtual object for an opportunity to reach a customer. For example, the virtual object can be used to monitor activities surrounding the virtual object and detect an opportunity to reach a customer. For example, the virtual object may receive public messages from residents located within a threshold distance away from the virtual object to monitor the activities surrounding the virtual object. For example, the virtual object may receive displayed messages from residents within the view of the virtual object to monitor the activities surrounding the virtual object. For example, the virtual object may be used to detecting an opportunity through interaction with a resident.

In one embodiment, an advertisement is presented in the virtual reality world via the virtual object; a call is placed to the virtual object by a connection provider or the advertiser; and after the call is connected to the resident, the call is bridged to the advertiser of the advertisement. For example, if the advertiser is not already connected, a separate call to the advertiser can be placed and bridged to the resident of the virtual reality world. For example, a connection provider can place a call to the virtual object to reach the resident; and the connection provider can place a Voice over Internet Protocol (VoIP) call to a telecommunication carrier which bridges the second VoIP call to a public switched telephone network (PSTN) to the advertiser. The connection provider can then bridge the connections to connect the resident and the advertiser. Alternatively, the connection provider can connect the advertiser first before calling the virtual object.

In one embodiment, a connection provider establishes a first connection with the resident and a second connection with the advertiser and bridges the first connection and the second connection to connect the resident and the advertiser. The connection provider may provide language translation and/or format conversion to bridge the connections. For example, the connection provider may translate a message from a first spoken language to a second spoken language for transferring the message from the first connection to the second connection. For example, the connection provider may convert a message between text and voice to bridge the first connection and the second connection.

From this description, it will be appreciated that certain aspects are embodied in the user devices, certain aspects are embodied in the server systems, and certain aspects are embodied in a system as a whole. Embodiments disclosed can be implemented using hardware, programs of instruction, or combinations of hardware and programs of instructions.

In general, routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects disclosed may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although the disclosure has been provided with reference to specific exemplary embodiments, it will be evident that the various modification and changes can be made to these embodiments without departing from the broader spirit as set forth in the claims. Accordingly, the specification and drawings are to be regarded in an illustrative sense rather than in a restrictive sense.

What is claimed is:

1. A method, comprising:
   providing, by a computing device, a virtual object inside a virtual reality world, wherein the virtual object is visible to residents of the virtual reality world when the residents are in vicinity of the virtual objects, and existence of the virtual object in the virtual reality world is independent of any resident of the virtual reality world;
   receiving, via the computing device, a call for a real time communication session, wherein the call is directed at the virtual object provided in the virtual reality world;
   in response to the call directed at the virtual object, changing, by the computing device, a presentation of the virtual object to provide a cue perceivable to one or more residents of the virtual reality world in vicinity of the virtual object in the virtual reality world, the cue indicating that the call is being directed at the virtual object;
   receiving, in the computing device, an input from one resident located in vicinity of the virtual object in the virtual reality world; and
   in response the input received from the resident while the cue is being presented, connecting by the computing device, the call directed at the virtual object to the resident for the real time communication session.

2. The method of claim 1, wherein the one or more residents include a plurality of residents of the virtual reality world corresponding to a plurality of users of the virtual reality world connected via a network.

3. The method of claim 2, wherein the plurality of residents are represented by a plurality of avatars presented in the virtual reality world; and the plurality of avatars are located in a vicinity of the virtual object in the virtual reality world.

4. The method of claim 3, wherein the cue includes a visual cue on the virtual object; and the plurality of avatars are in the virtual reality world at positions where the virtual object is visible to the plurality of avatars.

5. The method of claim 3, wherein the cue includes an audio cue which is delivered to residents who are within a predetermined distance from the virtual object in the virtual reality world.

6. The method of claim 3, wherein the cue includes an audio cue which is delivered to residents to whom the virtual object is visible.

7. The method of claim 1, wherein the virtual reality world comprises a three dimensional model including the virtual object; and the virtual reality world is presented to residents of the virtual reality world based on respective view points of residents in the virtual reality world.

8. The method of claim 7, wherein the virtual object has a visible volume in the virtual reality world.

9. The method of claim 1, further comprising:
   presenting an advertisement in the virtual reality world via the virtual object; and
   connecting a call from an advertiser of the advertisement to the virtual object.

10. The method of claim 1, further comprising:
    presenting an advertisement in the virtual reality world via the virtual object; and
    alerting an advertiser to call the virtual object for an opportunity to reach a customer.

11. The method of claim 10, further comprising:
    detecting an opportunity to reach a customer through monitoring activities surrounding the virtual object.

12. The method of claim 11, wherein the monitoring comprises the virtual object receiving public messages from residents located within a threshold distance away from the virtual object.

13. The method of claim 11, wherein the monitoring comprises the virtual object receiving displayed messages from residents within a view of the virtual object.

14. The method of claim 10, further comprising:
    detecting an opportunity to reach a customer through interaction with a resident via the virtual object.

15. The method of claim 1, further comprising:
    presenting an advertisement in the virtual reality world via the virtual object;
    placing a call to the virtual object; and
    after the call is connected to the resident, bridging the call to an advertiser of the advertisement.

16. The method of claim 15, wherein the bridging the call to the advertiser comprises placing a separate call to the advertiser.

17. The method of claim 15, wherein the bridging the call to the advertiser comprises a connection provider placing a Voice over Internet Protocol (VoIP) call to a telecommunication carrier which bridges the VoIP call to a public switched telephone network (PSTN) to the advertiser.

18. The method of claim 1, wherein the connecting of the call to the resident for a real time communication session comprises the virtual object automatically obtaining contact information from the resident via a data packet configured with the resident.

19. A non-transitory machine readable media embodying instructions, the instructions causing a computing device to perform a method, the method comprising:
   providing, by the computing device, a virtual object inside a virtual reality world, wherein the virtual object is visible to residents of the virtual reality world when the residents are in vicinity of the virtual objects, and existence of the virtual object in the virtual reality world is independent of any resident of the virtual reality world;
   receiving a call for a real time communication session, wherein the call is directed at the virtual object a provided in the virtual reality world;
   in response to the call directed at the virtual object, changing, by the computing device, a presentation of the virtual object to provide a cue perceivable to one or more residents of the virtual reality world in vicinity of the virtual object in the virtual reality world the cue indicating that the call is being directed at the virtual object;
   receiving, in the computing device, an input from one resident located in vicinity of the virtual object in the virtual reality world; and
   in response the input received from the resident while the cue is being presented, connecting the call directed at the virtual object to the resident for the real time communication session.

20. A data processing system, comprising:
   at least one microprocessor; and
   memory coupled with the at least one microprocessor and storing instructions configured to instruct the at least one microprocessor to perform at least:
   providing a virtual object inside a virtual reality world, wherein the virtual object is visible to residents of the virtual reality world when the residents are in vicinity of the virtual objects, and existence of the virtual object in the virtual reality world is independent of any resident of the virtual reality world;
   receiving a call for a real time communication session, wherein the call is directed at the virtual object provided in the virtual reality world;
   in response to the call directed at the virtual object, changing a presentation of the virtual object to provide a cue perceivable to one or more residents of the virtual reality world in vicinity of the virtual object in the virtual reality world, the cue indicating that the call is being directed at the virtual object;
   receiving an input from one resident located in vicinity of the virtual object in the virtual reality world; and in response the input received from the resident while the cue is being presented, connecting the call directed at the virtual object to the resident for the real time communication session.

\* \* \* \* \*